United States Patent
Brant et al.

(10) Patent No.: US 7,589,145 B2
(45) Date of Patent: Sep. 15, 2009

(54) SYNDIOTACTIC RICH POLYOLEFINS

(75) Inventors: Patrict Brant, Seabrook, TX (US); Mun Fu Tse, Seabrook, TX (US); Caiguo Gong, Pearland, TX (US); Peijun Jiang, League City, TX (US); Hideaki Wakabayashi, Kanagawa (JP)

(73) Assignee: ExxonMobil Chemical Patents Inc., Houston, TX (US)

( * ) Notice: Subject to any disclaimer, the term of this patent is extended or adjusted under 35 U.S.C. 154(b) by 537 days.

(21) Appl. No.: 11/220,114

(22) Filed: Sep. 6, 2005

(65) Prior Publication Data

US 2006/0020067 A1 Jan. 26, 2006

Related U.S. Application Data

(63) Continuation-in-part of application No. 10/825,348, filed on Apr. 15, 2004.

(60) Provisional application No. 60/622,964, filed on Oct. 28, 2004.

(51) Int. Cl.
*C08K 5/00* (2006.01)

(52) U.S. Cl. .................. 524/515; 524/528; 525/191; 525/240; 526/348

(58) Field of Classification Search .......... 526/348; 524/515, 528; 525/191, 240
See application file for complete search history.

(56) References Cited

U.S. PATENT DOCUMENTS

| | | | |
|---|---|---|---|
| 4,822,688 A | 4/1989 | Nogues | |
| 5,231,126 A | 7/1993 | Shi et al. | |
| 5,326,824 A | 7/1994 | Asanuma et al. | |
| 5,373,059 A | 12/1994 | Asanuma et al. | |
| 5,374,685 A | 12/1994 | Asanuma et al. | |
| 5,476,914 A | 12/1995 | Ewen et al. | |
| 6,184,326 B1 | 2/2001 | Razavi et al. | |
| 6,245,870 B1 | 6/2001 | Razavi | |
| 6,448,349 B1 | 9/2002 | Razavi | |
| 6,627,723 B2 | 9/2003 | Caito Lu | |
| 6,653,385 B2 | 11/2003 | Wang et al. | |
| 6,730,754 B2 | 5/2004 | Resconi et al. | |
| 6,747,114 B2 | 6/2004 | Karandinos | |
| 6,858,767 B1 | 2/2005 | DiMaio et al. | |
| 7,276,557 B2 | 10/2007 | Macedo et al. | |
| 2002/0147286 A1 | 10/2002 | Resconi et al. | |
| 2003/0096896 A1 | 5/2003 | Wang et al. | |
| 2003/0181554 A1 | 9/2003 | Faissat et al. | |
| 2004/0127614 A1 | 7/2004 | Jiang | |
| 2004/0138392 A1 | 7/2004 | Jiang | |
| 2004/0249046 A1 | 12/2004 | Abhari | |

FOREIGN PATENT DOCUMENTS

| | | |
|---|---|---|
| DE | 69704356 | 8/2001 |
| DE | 60109680 | 2/2006 |
| EP | 0 604 917 | 7/1994 |
| EP | 0 697 436 | 2/1996 |
| EP | 0 818 475 | 1/1998 |
| EP | 1 295 926 | 3/2003 |
| EP | 1 375 543 | 1/2004 |
| JP | 01-152448 | 6/1989 |
| JP | 2824082 | 2/1990 |
| JP | 04-080214 | 3/1992 |
| JP | 04-348114 | 12/1992 |
| WO | WO 01/46277 | 6/2001 |
| WO | WO 02/36651 | 5/2002 |
| WO | WO 03/008496 | 1/2003 |
| WO | WO 03/083003 | 10/2003 |
| WO | WO 2004/037872 | 5/2004 |
| WO | WO 2004/046214 | 6/2004 |
| WO | WO 2005/010051 | 10/2005 |

*Primary Examiner*—Edward J Cain
(74) *Attorney, Agent, or Firm*—Catherine L. Bell

(57) ABSTRACT

Disclosed herein is a polymer comprising an amorphous syndiotactic rich polyolefin comprising greater than about 50 wt % $C_3$-$C_{40}$ alpha olefins and having about 50% to less than about 80% r dyads, based on the total number of r and m dyads present in the polymer; a heat of fusion of 10 joules/g or less according to the procedure described in ASTM E 794-85; and an ash content of 1 wt % or less. A functionalized amorphous syndiotactic rich polyolefin is also disclosed, along with methods to produce and a method to use the inventive polymer.

127 Claims, No Drawings

SYNDIOTACTIC RICH POLYOLEFINS

RELATED APPLICATION

This application claims the benefit of Provisional Application No. 60/622,964 filed Oct. 28, 2004. This application also is a Continuation in Part of U.S. patent application Ser. No. 10/825,348, filed Apr. 15, 2004.

FIELD OF THE INVENTION

This invention relates to a polymer, to a polymer composition, to an adhesive composition, and/or an adhesion additive, and a process of making the same comprising an amorphous syndiotactic rich polyolefin and/or a functionalized amorphous syndiotactic rich polyolefin. In particular, the polymer comprises amorphous syndiotactic rich polypropylene, and/or maleated amorphous syndiotactic rich polypropylene, which may be in combination with one or more additives.

BACKGROUND OF THE INVENTION

Olefin based polymers (polyolefins) are widely used in various applications due to their being chemically inert, having low density, and low cost. Common applications include those related to adhesives, tie layers, films, fibers, articles, laminates, and combinations thereof.

Polyolefins may be formed into various films, which may be laminated to, coated on, or co-extruded with various substrates. The film and the substrate may be combined with other materials to form a structure having a plurality of layers, each layer having a specific purpose. Packaging laminates, for example, may comprise a plurality of layers, such as a configurationally rigid core layer of paper or paperboard, an outer liquid-tight layer, an oxygen gas barrier such as a midlayer of aluminum foil, and/or other layers depending on application needs.

To provide effective adhesion, it may be preferable that good bonding strength or intimate integrity between the layers be achieved for most applications. However, relatively non-polar olefin based polymers do not normally adhere well to substrates which are more polar than they.

Thus, there is a need for an adhesive that will intimately bond to both polar and non-polar substrates, preferably one that exhibits a superior durability of bond strength under various temperature conditions and in the presence of aggressive products.

In addition, to function as a tie layer or other adhesive, an adhesive composition may need to demonstrate adhesion between various polar and non-polar substrates within a "relatively cold" temperature range of about −20° C. to about 10° C. However, polyolefins typically lack adhesion characteristics in this relatively cold temperature range. Also, an adhesive composition may need to be soluble in various solvents to facilitate application of the adhesive to the substrate. However, most polyolefins which demonstrate adhesive characteristics have a level of crystallinity which prevents their being solubilized in typical hydrocarbon solvents. Accordingly, adhesion promoters may be utilized with various adhesive compositions to improve aspects of bonding, adhesion, and other properties of an adhesive.

For example, U.S. Pat. No. 6,656,385 to Wang et al. (Wang) is directed to a hot melt adhesive comprising about 15 to about 70% syndiotactic polypropylene and amorphous poly(alpha-olefin) along with a tackifier, optionally a plasticizer and/or a stabilizer. Wang defines syndiotactic polypropylene to have greater than 70% r dyads. As such, Wang does not disclose a syndiotactic polypropylene which is essentially soluble in hydrocarbon solvents.

U.S. Pat. No. 4,822,688 to Nogues is directed to an adhesive composition comprising polypropylene modified by grafting with an acid anhydride which is further reacted with a compound bearing at least two groups such as a polyol or a polyamine. While Nogues discloses functionalized polyolefins, the reference does not disclose functionalized amorphous syndiotactic rich polyolefin adhesion promoters that improve adhesion, solubility, and processability.

Numerous references are directed to compositions comprising syndiotactic polypropylene as an adhesion promoter. Examples include Japanese Patent Application 01-152448, Japanese Patent no. JP2824082, U.S. Pat. Nos. 5,476,914, 6,184,326, and 6,245,870 which are directed to vanadium catalysts capable of producing compositions comprising syndiotactic polypropylene having greater than 80% r dyads. However, the crystallinity of the syndiotactic rich polypropylene according to the references prevents the material from being soluble in hydrocarbon solvents, thus limiting the use of the material. In addition, these references are directed to syndiotactic specific propagation under "catalytic site control", resulting in "rmmr" segments being present in the polymer produced. This is in contrast to "chain end control" of the present invention, wherein "rrmr" segments are produced and essentially no " rmmr" segments are produced.

U.S. Pat. Nos. 5,326,824, 5,373,059, 5,374,685, and Japanese Patent Nos. JP3025553 are directed to compositions comprising functionalized syndiotactic polypropylene. However, the functionalized syndiotactic polypropylene disclosed in these references has greater than about 50% crystallinity, (e.g., [rrrr]>50%, more preferably [rrrr]>70%), and thus, the polymers so produced are not soluble in organic solvents.

The Japanese reference JP2837246 is directed to syndiotactic polypropylene having [rrrr]>80%, an intrinsic viscosity of about 0.01 to 10 dl/g, a Mw/Mn of 1.5 to about 20, a melting temperature Tm of about 130 to 170° C., and a t½=2 minutes. The polymers produced according to JP2837246 are thus crystalline, have a melting temperature, and are not soluble in organic solvents.

In addition, syndiotactic polypropylene produced using vanadium based catalysts result in materials having an ash content, when determined as described herein, of greater than about 1 weight %, due to residual materials from the catalyst being present.

Accordingly, there remains a need for polymers, and polymer compositions comprising a syndiotactic rich polyolefin and/or a functionalized syndiotactic rich polyolefin, which is essentially soluble in various hydrocarbon solvents at room temperature, preferably having an ash content of less than 1 weight %. As such, there remains a need for syndiotactic rich polyolefins of low crystallinity e.g., [rrrr]<50%, along with functionalized syndiotactic rich polyolefins that do not have a defined melting temperature, and/or a heat of fusion of less than about 10 joules/g.

SUMMARY OF THE INVENTION

In one aspect of the present invention, a polymer comprises an amorphous syndiotactic rich polyolefin comprising greater than about 50 wt % C3-C40 alpha olefins and having about 50% to less than about 80% r dyads, based on the total number of r and m dyads present in the polymer; a heat of fusion of 10 joules/g or less according to the procedure described in ASTM E 794-85; and an ash content of 1 wt % or less.

In another aspect of the present invention, a polymer blend comprises an amorphous syndiotactic rich polyolefin having greater than about 50 wt % C3-C40 alpha olefins, about 50% to less than about 80% r dyads, based on the total number of r and m dyads present in the polymer, a heat of fusion of 10 joules/g or less according to the procedure described in ASTM E 794-85, and an ash content of 1 wt % or less; and at least one additive comprising a C2-C40 polymer, a C2-C40 copolymer, an elastomer, a random copolymer, an impact copolymer, a fluctional polymer, a tackifier, a crosslinking agent, an antioxidant, a neutralizing agent, a nucleating agent, a filler, an adhesion promoter, an oil, a plasticizer, a wax, an ester polymer, a rubber toughened composition, a recycled polymer, a block, an antiblock, a pigment, a dye, a processing aid, a UV stabilizer, a lubricant, an adjuvant, a surfactant, a color masterbatch, a flow improver, a crystallization aid, or a combination thereof.

In yet another aspect of the present invention, a polymer comprises an amorphous syndiotactic rich polyolefin that has been functionalized with a functional group; wherein prior to being functionalized, the amorphous syndiotactic rich polyolefin comprises greater than about 50 wt % C3-C40 alpha olefins, about 50% to less than about 80% r dyads, based on the total number of r and m dyads present in the polymer; a heat of fusion of 10 joules/g or less according to the procedure described in ASTM E 794-85; and an ash content of 1 wt % or less.

In still another aspect of the present invention, a polymer blend comprises an amorphous syndiotactic rich polyolefin that has been functionalized with a functional group; wherein prior to being functionalized, the amorphous syndiotactic rich polyolefin comprises greater than about 50 wt % C3-C40 alpha olefins, about 50% to less than about 80% r dyads, based on the total number of r and m dyads present in the polymer, a heat of fusion of 10 joules/g or less according to the procedure described in ASTM E 794-85, and an ash content of 1 wt % or less; and at least one additive comprising a C2-C40 polymer, a C2-C40 copolymer, an elastomer, a random copolymer, an impact copolymer, a fluctional polymer, a tackifier, a crosslinking agent, an antioxidant, a neutralizing agent, a nucleating agent, a filler, an adhesion promoter, an oil, a plasticizer, a wax, an ester polymer, a rubber toughened composition, a recycled polymer, a block, an antiblock, a pigment, a dye, a processing aid, a UV stabilizer, a lubricant, an adjuvant, a surfactant, a color masterbatch, a flow improver, a crystallization aid, or a combination thereof.

In another aspect of the present invention is the contact product of an amorphous syndiotactic rich polyolefin, a functional group, and a functionalization catalyst, wherein the amorphous syndiotactic rich polyolefin comprises greater than about 50 wt % C3-C40 alpha olefins, about 50% to less than about 80% r dyads, based on the total number of r and m dyads present in the polymer; a heat of fusion of 10 joules/g or less according to the procedure described in ASTM E 794-85; and an ash content of 1 wt % or less.

In another aspect of the present invention, a polymer comprises amorphous syndiotactic rich polypropylene functionalized with maleic anhydride, wherein the functionalized polypropylene comprises about 50% to less than about 80% r dyads, based on the total number of r and m dyads present in the polymer; a heat of fusion of 10 joules/g or less according to the procedure described in ASTM E 794-85; and an ash content of 1 wt % or less.

In still another aspect of the present invention, a polymer blend comprises amorphous syndiotactic rich polypropylene functionalized with maleic anhydride, and at least one additive, wherein the functionalized polypropylene comprises about 50% to less than about 80% r dyads, based on the total number of r and m dyads present in the polymer; a heat of fusion of 10 joules/g or less according to the procedure described in ASTM E 794-85; and an ash content of 1 wt % or less, and wherein the additive is selected from the group consisting of a C2-C40 polymer, an elastomer, a random copolymer, an impact copolymer, a fluctional polymer, a tackifier, a crosslinking agent, an antioxidant, a neutralizing agent, a nucleating agent, a filler, an adhesion promoter, an oil, a plasticizer, a wax, an ester polymer, a block, an antiblock, a pigment, a dye, a processing aid, a UV stabilizer, a lubricant an adjuvant, a surfactant, a color masterbatch, a flow improver, a crystallization aid, and a combination thereof.

In another aspect of the present invention, an adhesive composition comprises an amorphous syndiotactic rich polyolefin, an amorphous syndiotactic rich polyolefin that has been functionalized with a functional group, or a combination thereof, wherein the amorphous syndiotactic rich polyolefin comprises greater than about 50 wt % C3-C40 alpha olefins; about 50% to less than about 80% r dyads, based on the total number of r and m dyads present in the polymer; a heat of fusion of 10 joules/g or less according to the procedure described in ASTM E 794-85; and an ash content of 1 wt % or less, and wherein the functional group, when present, comprises a compound having a weight average molecular weight of 1000 or less, and a carbon-carbon double bond, a carbon-carbon triple bond, and/or a heteroatom; the adhesive composition having a peel strength to isotactic polypropylene of greater than about 3.5 lb/in, and a peel strength to polyester film of greater than about 0.5 lb/in, wherein peel strength is measured according to ASTM D-1876 modified to use a 0.5 inch wide sample, and a 2" per minute separation speed.

In yet another aspect of the present invention, a polymer comprises an amorphous syndiotactic rich polyolefin that has been functionalized with a functional group; wherein the functionalized amorphous syndiotactic rich polyolefin comprises greater than about 50 wt % C3-C40 alpha olefins about 50% to less than about 80% r dyads, based on the total number of r and m dyads present in the polymer; and a heat of fusion of 10 joules/g or less according to the procedure described in ASTM E 794-85.

In another aspect of the present invention, a process to make a polymeric material comprises the steps of melt blending an amorphous syndiotactic rich polyolefin and at least one additive under high shear conditions to produce a concentrate containing from 10 to 90 wt. % of the polyolefin, and subsequently blending the concentrate with at least one additional material to produce a final product, wherein the amorphous syndiotactic rich polyolefin comprises greater than about 50 wt % C3-C40 alpha olefins; about 50% to less than about 80% r dyads, based on the total number of r and m dyads present in the polyolefin; a heat of fusion of 10 joules/g or less according to the procedure described in ASTM E 794-85; and an ash content of 1 wt % or less.

In another aspect of the present invention, a method to produce a functionalized amorphous syndiotactic rich polyolefin comprises the steps of:

A. providing an olefin monomer, metallocene catalyst, and an activator to a reactor in an aliphatic solvent;

B. catalytic solution polymerization of said olefin monomer in said reactor to produce an amorphous syndiotactic rich polyolefin;

C. monomer stripping to remove unreacted olefin monomer;

D. solvent based functionalization; comprising combining said amorphous syndiotactic rich polyolefin with a functional group and with a free radical initiator in said aliphatic solvent, at a temperature and for a period of time sufficient to produce said functionalized amorphous syndiotactic rich polyolefin; and optionally E. removal of said aliphatic solvent, wherein the amorphous syndiotactic rich polyolefin comprises greater than about 50 wt % $C_3$-$C_{40}$ alpha olefins; about 50% to less than about 80% r dyads, based on the total number of r and m dyads present in the polyolefin; a heat of fuision of 10 joules/g or less according to the procedure described in ASTM E 794-85, and an ash content of 1 wt % or less.

In another aspect of the present invention, a method to produce a functionalized amorphous syndiotactic rich polyolefin comprises the steps of:

A. providing a melt comprising an amorphous syndiotactic rich polyolefin, a functional group, and a free radical initiator to a mixing device;

B. contacting said melt within said mixing device at a temperature and for a period of time sufficient to produce said functionalized amorphous syndiotactic rich polyolefin, wherein the amorphous syndiotactic rich polyolefin comprises greater than about 50 wt % $C_3$-$C_{40}$ alpha olefins; about 50% to less than about 80% r dyads, based on the total number of r and m dyads present in the polyolefin; a heat of fusion of 10 joules/g or less according to the procedure described in ASTM E 794-85, and an ash content of 1 wt % or less.

Blends of the above polymers, along with various articles comprising the above polymers are also disclosed.

Definitions

For the purposes of this invention and the claims thereto, and for ease of reference herein, when a polymer and/or oligomer is referred to as including, containing, comprising, or the like, an olefin, the olefin present in the polymer and/or oligomer is the polymerized form of the olefin. For ease of reference, an amorphous polyolefin polymer is abbreviated aPP, an isotactic rich polyolefin polymer is abbreviated irPP, a syndiotactic rich polyolefin polymer is abbreviated srPP, an amorphous syndiotactic rich polyolefin polymer is abbreviated a-srPP, a semi-crystalline polyolefin polymer is abbreviated scPP, and "X-g-FG" indicates that the component X is grafted (-g-) with a functional group "FG".

For purposes of this disclosure, the term oligomer refers to compositions having 2-40 mer units and the term polymer refers to compositions having 41 or more mer units. A mer is defined as a unit of an oligomer or polymer that originally corresponded to the monomer(s) used in the oligomerization or polymerization reaction. For example, the mer of polyethylene would be ethylene. For simplicity, when polymers are referred to, the reference may also apply to oligomers, unless specifically specified otherwise. Accordingly, the term polymer and oligomer may be referred to interchangeably herein, unless otherwise specified. In addition, unless otherwise stated, the term "polymer" may include both homopolymers (i.e., a polymer comprising essentially one monomer), and/or a copolymer (i.e., a polymer comprising more than one monomer).

By "functionalized polymer" it is meant that the polymer and/or oligomer is contacted with a functional group, and optionally a catalyst, heat, initiator, or free radical source to cause all or part of the functional group to incorporate, graft, bond to, physically attach to, and or chemically attach to the polymer. In addition, "functionalized component" is also defined to include a polymer directly polymerized from monomers (or using an initiator having a functional group) where the polymer has a functional group at a chain end.

By "functionalized oligomer" is meant that the oligomer is contacted with a functional group, and optionally a catalyst, heat, initiator, or free radical source to cause all or part of the functional group to incorporate, graft, bond to, physically attach to, and or chemically attach to the oligomer. In addition, "functionalized oligomer" is also defined to include an oligomer directly oligomerized from monomers (or using initiator having a functional group) where the oligomer has a functional group at a chain end.

By "functional group" is meant any compound having a weight average molecular weight of 1000 or less, and a carbon-carbon double bond, a carbon-carbon triple bond, and/or a heteroatom. Preferably, the functional group comprises a heteroatom, wherein the heteroatom is B, N, O, Si, P, F, Cl, Br, I, S, or a combination thereof.

Preferably the functional group is a compound containing a heteroatom and unsaturation, such as maleic anhydride. Preferred functional groups include organic acids, organic amides, organic amines, organic esters, organic anhydrides, organic alcohols, organic acid halides (such as acid chlorides, acid bromides, etc.), organic peroxides, and salts thereof.

Polyolefin Tacticity

Olefin polymers and oligomers ("polyolefins" or "polyolefin polymers"), in general, and in particular poly-alpha-olefin polymers comprising propylene or other C3 or higher alpha-olefin monomers, comprise hydrocarbyl groups that are pendant from the polymer backbone chain. The pendant hydrocarbyl groups may be arranged in different stereochemical configurations determined relative to the polymer backbone chain. These arrangements include atactic, isotactic, and/or syndiotactic configurations.

The degree and type of tacticity of a polyolefin polymer may determine the physical properties of a composition comprising such a polymer. Other determinants of such a composition may include the type and relative concentration of monomers, comonomers, oligomers, the weight average molecular weight (Mw) of the polymer(s) present, the molecular weight distribution (MWD) of the polymer(s) present, the crystallinity of the polymer(s), and the like.

Tacticity may be related to the degree of crystallinity that an olefin polymer, in particular a poly-alpha-olefin polymer, is capable of obtaining. As used herein, the tacticity of a polymer reflects the stereochemical regularity of hydrocarbyl groups, which are pendent to the polymer molecule backbone (i.e., the tacticity of the polymer).

Four types of tacticity have been described in poly-alpha-olefins: atactic, normal isotactic, isotactic stereoblock, and syndiotactic. Although all of these tacticity configurations have been primarily demonstrated in the case of polypropylene, in theory each is equally possible for polymers comprised of one or more C3 or higher alpha-olefin, cyclic olefin, and/or internal olefin.

Atactic poly-olefins are those wherein the hydrocarbyl groups pendent to the polymer molecule backbone assume no regular order with reference to the backbone. This random, or atactic, structure is represented by a polymer backbone of alternating methylene and methine carbons, with randomly oriented branches substituting the methine carbons. The methine carbons randomly have R and S configurations, creating adjacent pairs either of like configuration (a "meso" or "m" dyad) or of unlike configuration (a "racemic" or "r" dyad). The atactic form of a polymer contains approximately equal fractions of meso and racemic dyads. Importantly, atactic poly-alpha-olefins, particularly atactic polypropylene, may be characterized by being soluble in aliphatic and aromatic solvents at ambient temperature. Since atactic polymers exhibit no regular order or repeating unit configurations in the polymer chain, such atactic polymers may be referred to as amorphous materials. As an amorphous material, atactic polymers tend to lack a molecular lattice structure and may have poorly defined melting points. Accordingly, atactic poly-alpha-olefins are amorphous, typically have no measurable melting point, and thus exhibit little if any crystallinity.

Isotactic poly-olefins are characterized as having pendent hydrocarbyl groups ordered in space to the same side or plane of the polymer backbone chain. Using isotactic polypropylene as an example, the isotactic structure is typically described as having the pendent methyl groups attached to the ternary carbon atoms of successive monomeric units on the same side of a hypothetical plane through the carbon backbone chain of the polymer, e.g., the methyl groups are all above or below the plane as shown below:

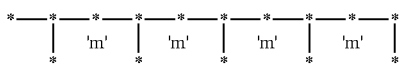

The degree of isotactic regularity may be measured by NMR techniques. Bovey's NMR nomenclature for an isotactic pentad is . . . mmmm . . . with each "m" representing a "meso" dyad or successive methyl groups on the same side in the plane.

In an isotactic poly-alpha-olefin, all of the monomer units have the same stereochemical configuration, with the exception of random errors, which appear along the polymer. Such random errors almost always appear as isolated inversions of configuration that may be corrected in the very next alpha-olefin monomer insertion to restore the original R or S configuration of the propagating polymer chain. Single insertions of inverted configuration give rise to rr triads, which distinguish this isotactic structure in its NMR from the isotactic stereoblock form shown below:

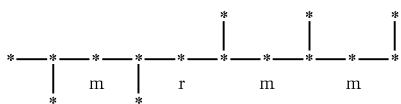

This isotactic stereoblock form of poly-olefin may result from "site chirality exchange" and/or "chain end control" mechanisms during formation of an isotactic stereoblock poly-alpha-olefin polymer. Deviation or inversion in the regularity of the structure of the chains lowers the degree of isotacticity and hence the crystallinity of which the polymer is capable.

Syndiotactic poly-alpha-olefins are those wherein the hydrocarbyl groups pendent to the polymer molecular backbone alternate sequentially in order from one side or plane to the opposite side or plane relative to the polymer backbone, as shown below:

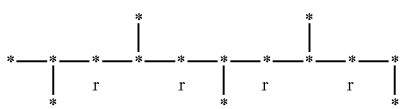

In NMR nomenclature, this pentad is described as . . . rrrr . . . in which each r represents a "racemic" dyad, i.e., successive methyl groups on alternate sides of the plane (see J. A. Ewen, "Catalytic Polymerization of Olefins", (the Ewen method); and Eds. T. Keii, K. Soga; Kodanska Elsevier Pub.; Tokyo, 1986, P 271) The percentage of r dyads in the chain determines the degree of syndiotacticity of the polymer, and is related to the crystallinity of the polymer.

The molecular chain backbone of a syndiotactic polymer can be considered to be a copolymer of olefins with alternating stereochemical configurations. Highly syndiotactic polymers may be highly crystalline and thus may have defined melting points similar to their isotactic polymorphs and thus may be characterized in part by their melting point temperature.

Polyolefin Crystallinity

The amount or purity of tacticity in a polymer is related to the crystallinity of that polymer. Both isotactic and syndiotactic polyolefins may possess various levels of crystallinity. For purposes herein, a crystalline polyolefin has greater than 35% crystallinity, preferably greater than about 50% crystallinity. As used herein, both isotactic poly-alpha-olefins and syndiotactic poly-alpha-olefins having a "high" amount of crystallinity have at least 35 weight % that is not soluble in xylene at room temperature. Poly-alpha-olefins having a "high" amount of crystallinity may also be characterized, at least in part, by a defined melting point temperature or temperature range. Poly-alpha-olefins having a "high" amount of crystallinity may also be characterized, at least in part, by a percent crystallinity of 65% or more, preferably 75% or more.

Contrary to crystalline polyolefins, amorphous poly-olefins have less than about 35% crystallinity. An essentially amorphous polyolefin, and in particular essentially amorphous poly-alpha-olefin (e.g., essentially amorphous polypropylene) may be characterized as being essentially soluble in xylene, toluene at room temperature. A preferred essentially amorphous polyolefin polymer, copolymer, and/or oligomer, or blend thereof (collectively referred to as an amorphous polyolefin), is one where at least about 95 wt %, preferably at least about 96 wt %, preferably at least about 97 wt %, preferably at least about 98 wt %, preferably at least about 99 wt %, preferably at least about 99.5 wt % of the amorphous polyolefin is soluble in xylene or toluene at room temperature, based on the total weight of the amorphous polyolefin present. Amorphous polyolefins may also be characterized as having no, or little discernable melting point or melting point range.

Heat of fusion (Hf) may also be used to determine the crystallinity of a polymer, according to the procedure described in ASTM E 794-85. For example, samples weighing approximately 7-10 mg may be sealed in sample pans. The differential scanning calorimetric data (DSC) is then recorded by first cooling the sample to about −50° C., and then gradually heating it to about 200° C. at a rate of about 10° C./minute. The sample may then be kept at about 200° C. for about 5 minutes before a second cooling-heating cycle is applied. Both the first and second cycle thermal events are recorded. Areas under the melting peaks may then be measured and used to determine the heat of fusion and the degree of crystallinity. The percent crystallinity is preferably calculated using the formula, [area under the curve (Joules/gram)/B(Joules/gram)]*100, where B is the heat of fusion for the homopolymer of the major monomer component in the sample. These values for B may be obtained from the literature, e.g., Polymer Handbook, Fourth Edition, published by John Wiley and Sons, New York 1999. As a matter of convention, if a polymer displays multiple melting or crystallization peaks, the sum of area under each peak was used to calculate the crystallinity.

Amorphous Syndiotactic Rich Polyolefins

A syndiotactic rich polyolefin polymer (srPP) may comprise at least about 50% r-dyads as determined according to the Ewen method. In a preferred embodiment, a srPP may include about at least about 55% r dyads, preferably at least about 60% r dyads, preferably at least about 65% r dyads, preferably at least about 70% r dyads, preferably at least about 75% r dyads, more preferably less than about 80% r-dyads, based on the total number of r and m dyads present in the polymer.

An amorphous syndiotactic rich polyolefin polymer (a-srPP) may include a syndiotactic rich polyolefin polymer, essentially all of which is soluble in hexane, cyclohexane, toluene or xylene at room temperature.

An amorphous syndiotactic rich polyolefin polymer (a-srPP) may comprise about 50% r-dyads to less than about 80% r-dyads, based on the total number of r and m dyads present in the polymer. In a preferred embodiment, an amorphous srPP may include about 55% r dyads to about 75% r dyads, preferably about 60% r dyads to about 75% r dyads, preferably about 60% r dyads to about 70% r dyads, preferably about 65% r dyads to about 70% r dyads, based on the total number of r and m dyads present in the polymer.

An amorphous syndiotactic rich polyolefin polymer (a-srPP) may comprise about 6.25% to about 31.6% r-pentads, based on the total number of r and m pentads present in the polymer. In a preferred embodiment, an amorphous srPP may include about 9.15% r-pentads to about 31.6% r-pentads, preferably about 13.0% r-pentads to about 31.6% r-pentads, preferably about 13.0% r-pentads to about 24.0% r-pentads, preferably about 17.9% r-pentads to about 24.0% r-pentads, based on the total number of r and m pentads present in the polymer.

In a preferred embodiment, the amorphous syndiotactic rich polyolefin polymer is amorphous syndiotactic rich polypropylene (a-srPPr). The a-srPPr preferably has a weight average molecular weight (Mw) of 5,000,000 or less, a number average molecular weight (Mn) of about 3,000,000 or less, a z-average molecular weight (Mz) of about 10,000,000 or less, and a g' index of 1.5 or less measured at the weight average molecular weight (Mw) of the polymer using isotactic polypropylene as the baseline, all of which may be determined by size exclusion chromatography, e.g., 3D SEC, also referred to as GPC-3D as described herein.

In a preferred embodiment, the a-srPPr of the present invention, may have a Mw of about 5,000 to about 5,000,000 g/mole, more preferably a Mw of about 10,000 to about 1,000,000, more preferably a Mw of about 20,000 to about 500,000, more preferably a Mw of about 50,000 to about 300,000, wherein Mw is determined as described herein.

In a preferred embodiment, the a-srPPr of the present invention may have a Mn of about 5,000 to about 3,000,000 g/mole, more preferably a Mn of about 10,000 to about 1,000,000, more preferably a Mn of about 30,000 to about 500,000, more preferably a Mn of about 50,000 to about 200,000, wherein Mn is determined as described herein.

In a preferred embodiment, the a-srPPr of the present invention may have a Mz of about 10,000 to about 10,000,000 g/mole, more preferably a Mz of about 50,000 to about 1,000,000, more preferably a Mz of about 80,000 to about 500,000, more preferably a Mz of about 100,000 to about 300,000, wherein Mw is determined as described herein.

In a preferred embodiment, the a-srPPr of the present invention may have a g' index value of about 1 to about 1.5, more preferably a g' of about 1.25 to about 1.45, when measured at the Mw of the polymer using the intrinsic viscosity of isotactic polypropylene as the baseline, wherein g' is defined, and is determined as described herein.

In a preferred embodiment, the a-srPPr of the present invention may have a crystallization temperature (Tc) measured with differential scanning calorimetry (DSC) of about 200° C. or less, more preferably, 150° C. or less, more preferably no crystallization temperature is discernable.

In a preferred embodiment, the a-srPPr of the present invention may have a density of about 0.85 to about 0.95 g/ml, more preferably, about 0.87 to 0.92 g/ml, more preferably about 0.88 to about 0.91 g/ml at room temperature as measured per the ASTM D-1505 test method.

In a preferred embodiment, the a-srPPr of the present invention may have a melt flow rate (MFR), which is inversely related to weight average molecular weight Mw, equal to or greater than 0.2 g/10 min., preferably between 2-500 g/10 min. and more preferably between 20-200 g/10 min., as measured according to the ASTM D-1238 (190 c,2.16 kg)test method.

The amorphous syndiotactic rich polyolefin may include alpha olefins within the base polymer such that the amorphous syndiotactic rich polyolefin may have greater than about 50 wt % C3-C20 alpha olefins, preferably greater than about 50 wt % C3-C12 alpha olefins, and more preferably greater than about 50 wt % C3-C10 alpha olefins.

Preferably, the amorphous syndiotactic rich polyolefin may include greater than about 60 wt % propylene, preferably greater than about 70 wt % propylene, preferably greater than about 80 wt % propylene, preferably greater than about 90 wt % propylene, preferably greater than about 95 wt % propylene, preferably greater than about 99 wt % propylene, based on the total weight of the polymer.

The amorphous syndiotactic rich polyolefin of the present invention may further include greater than about 0.5 wt % ethylene, preferably greater than about 1 wt % ethylene, preferably greater than about 2 wt % ethylene, preferably greater than about 3 wt % ethylene, preferably greater than about 4 wt % ethylene, preferably greater than about 5 wt % ethylene, based on the total weight of the polymer.

For example, a-srPPr may include at least about 50 wt % propylene (C3) as the base polymer, along with ethylene (C2) and from C4 to C40 alpha olefins, preferably C4 to C20 alpha olefins, more preferably C4 to C12 alpha olefins, with C2 and C4 to C10 alpha olefins being still more preferred.

Examples of preferred alpha olefins include butene-1, pentene-1, hexene-1, heptene-1, octene-1, nonene-1, decene-1, undecene-1, dodecene-1, tridecene-1, penetdecene-1, hexadecene-1, heptadecene-1, octadecene-1, and branched olefins including 3-methylbutene-1,4-methylepentene-1, and 4,4-dimethylepentene-1.

The amount of alpha olefins in addition to the base polymer, when present in the a-srPP, may be greater than about 0.001% by weight (wt %), based on the total weight of the polymer. Preferably, the amount of the alpha olefins is greater than or equal to about 0.1 wt %, more preferably greater than or equal to about 1 wt %. The other alpha olefins may also be present in the base polymer at about 50 wt % or less. Preferably, the amount of the other alpha olefins is less than or equal to about 20 wt %, more preferably less than or equal to about 10 wt %.

In a preferred embodiment, essentially all of the a-srPP (preferably a-srPPr) of the present invention is essentially amorphous, by which it is meant that essentially all of the a-srPP is soluble in hexane, cyclohexane, xylene or toluene at room temperature. As used herein, by essentially all of the s-srPP it is meant that at least about 95 wt %, preferably at least about 96 wt %, preferably at least about 97 wt %, preferably at least about 98 wt %, preferably at least about 99 wt %, preferably at least about 99.5 wt % of the a-srPP is soluble in hexane, cyclohexane, xylene or toluene at room temperature (i.e., 25° C.), based on the total weight of the a-srPP present.

In a preferred embodiment, the a-srPP, more preferably the a-srPPr, of the present invention may have a heat of fusion (Hf) determined according to the procedure described in ASTM E 794-85, which is less than or equal to about 10 Joules/g, preferably less than or equal to about 9 Joules/g, preferably less than or equal to about 8 Joules/g, preferably less than or equal to about 7 Joules/g, preferably less than or equal to about 6 Joules/g, preferably less than or equal to about 5 Joules/g, preferably less than or equal to about 4 Joules/g, preferably less than or equal to about 3 Joules/g, preferably less than or equal to about 2 Joules/g, preferably less than or equal to about 1 Joule/g, , still more preferably, a heat of fusion which is not detectable according to the procedure described in ASTM E 794-85.

In a preferred embodiment, the a-srPP, more preferably the a-srPPr, of the present invention may have an ash content, determine according to the procedure described in ASTM D 5630, which is less than or equal to about 1 wt %, based on the total amount of the polymer present, more preferably less than or equal to about 0.9 wt %, more preferably less than or equal to about 0.8 wt %, more preferably less than or equal to about 0.7 wt %, more preferably less than or equal to about 0.6 wt %, more preferably less than or equal to about 0.5 wt %, more preferably less than or equal to about 0.4 wt %, more preferably less than or equal to about 0.3 wt %, more preferably less than or equal to about 0.2 wt %, more preferably less than or equal to about 0.1 wt %, more preferably less than or equal to about 0.05 wt %, more preferably less than or equal to about 0.01 wt %, more preferably less than or equal to about 0.005 wt %, with an ash content, as determined according to ASTM D-5630 of less than or equal to about 0.001 wt % ash content being still more preferred.

Preparation of Amorphous Syndiotactic Rich Polyolefin Polymers

Catalyst capable of producing amorphous syndiotactic rich polyolefins, and in particular amorphous syndiotactic rich polypropylene include those disclosed in U.S. Pat. Nos. 5,476,914, 6,184,326, 6,245,870, 5,373,059, 5,374685, and 5,326824. Preparation of srPP polymers, in particular srPPr polymers have been disclosed in U.S. Pat. Nos. 3,305,538 and 3,258,455 to Natta et al, U.S. Pat. No. 4,892,851 to Ewen et al, U.S. Pat. No. 5,270,410 to Job, U.S. Pat. No. 5,340,917 to Eckman et al, U.S. patent and U.S. Pat. No. 5,476,914 to Ewen et al., the entire disclosures of which are hereby incorporated by reference.

In addition to the selection of the catalyst, the concentration of the reactants, and the pressure of the reaction used for the preparation of the amorphous syndiotactic rich polyolefins of the present invention, temperature control of the reaction may also be critical. The temperature of the reaction is preferably controlled to within about 10° C. to a set point, more preferably within about 9° C., more preferably within about 8° C., more preferably within about 7° C., more preferably within about 6° C., more preferably within about 5° C., more preferably within about 4° C., more preferably within about 3° C., more preferably within about 2° C.

Polymers prepared by using the method disclosed in U.S. Pat. No. 5,476,914 with a metallocene catalyst system are preferred. Compared with other methods, the a-srPPr prepared with metallocene catalyst will have a narrower molecular weight distribution and/or more uniform comonomer distribution, as compared to the polymers produced using other catalysts, such as vanadium catalysts as disclosed in, which tend to produce polymers having ash contents greater than those of the present invention. Thus, metallocene produced a-srPP may have better physical and mechanical properties and superior processability, compared to other a-srPP. The most preferred type of a-srPP polymers is metallocene catalyzed copolymer of propylene with ethylene or butene-1 having ethylene or butene-1 comonomer content ranging from about 2 to 20 wt %.

In general, a-srPP may by produced in a liquid filled, single-stage reactor such as a continuous reactor using an appropriate catalyst such as di(p-triethylsilylphenyl)methylene(cyclopentadienyl)(3,8-di-t-butylfluorenyl) zirconium dichloride, di(p-triethylsilylphenyl)methylene(cyclopentadienyl)(3,8-di-t-butylfluorenyl) hafnium dichloride, di(p-triethylsilylphenyl)methylene(cyclopentadienyl)(3,8-di-t-butylfluorenyl) zirconium dimethyl, di(p-triethylsilylphenyl)methylene(cyclopentadienyl)(3,8-di-t-butylfluorenyl) hafnium dimethyl, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl) zirconium dichloride, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl) hafnium dichloride, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl) zirconium dimethyl, and di(p-triethylsilylphenyl)methylene(cyclopentadienyl)(3,3,6,6,9,9,12,12-octamethyl-4,4,5,5,8,8,9,9-octahydrodibenzyl[b,h]fluorenyl) hafnium dimethyl.

The catalyst may be activated (or pre-activated) with an appropriate activator (cocatalyst) including alumoxane compounds, modified alumoxane compounds, and ionizing anion precursor compounds that abstract one reactive, σ-bound, metal ligand making the metal complex cationic and providing a charge-balancing noncoordinating or weakly coordinating anion such as methylalumoxane (MAO) and N,N-dimethylanilinium tetrakis(pentafluorophenyl) borate. Additional preferred activators are those described at paragraphs [00121] to [00151] of WO 2004/026921]. Particularly preferred activators include those listed on page 77-78 at paragraph [00135] of WO 2004/026921.

The catalysts and catalyst systems described above are suitable for use in a solution, bulk, gas or slurry polymerization process or a combination thereof, preferably solution phase or bulk phase polymerization process.

In one embodiment, this invention is directed toward the solution, bulk, slurry or gas phase polymerization reactions involving the polymerization of one or more of monomers having from 3 to 30 carbon atoms, preferably 3-12 carbon atoms, and more preferably 3 to 8 carbon atoms. Preferred monomers include one or more of propylene, butene-1, pentene-1, 4-methyl-pentene-1, hexene-1, octene-1, decene-1, 3-methyl-pentene-1, and cyclic olefins or a combination thereof. Other monomers can include vinyl monomers, diolefins such as dienes, polyenes, norbornene, norbornadiene, vinyl norbornene, ethylidene norbornene monomers. Preferably a homopolymer or copolymer of propylene is produced. In another embodiment, both a homopolymer of propylene and a copolymer of propylene and one or more of the monomers listed above are produced.

One or more reactors in series or in parallel may be used in the present invention. Catalyst component and activator may be delivered as a solution or slurry, either separately to the reactor, activated in-line just prior to the reactor, or preactivated and pumped as an activated solution or slurry to the reactor. A preferred operation is two solutions activated in-line. For more information on methods to introduce multiple catalysts into reactors, please see U.S. Pat. No. 6,399,722, and WO0130862A1. While these references may emphasize gas phase reactors, the techniques described are equally applicable to other types of reactors, including continuous stirred tank reactors, slurry loop reactors and the like. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors.

In one embodiment 500 ppm or less of hydrogen may be added to the polymerization, or 400 ppm or less, or 300 ppm or less. In other embodiments at least 50 ppm of hydrogen may be added to the polymerization, or 100 ppm or more, or 150 ppm or more.

Functionalized Amorphous Syndiotactic Rich Polyolefins

The present invention may comprise the contact product of the above described amorphous syndiotactic rich polyolefin, a functional group, and a functionalization catalyst, which may result in a functionalized amorphous syndiotactic rich polyolefin. Preferably, the amorphous syndiotactic rich polyolefin is amorphous syndiotactic rich polypropylene, the functional group is maleic anhydride, and a functionalization catalyst is an organic peroxide, which may result in a contact product comprising a amorphous syndiotactic rich polypropylene functionalized with maleic anhydride.

Accordingly, the present invention may comprise the above described amorphous syndiotactic rich polyolefin which has been further functionalized with one or more additional compounds to impart one or more functionalities into the polyolefin. This functionalized amorphous syndiotactic rich polyolefin is preferably amorphous syndiotactic rich polypropylene, functionalized with maleic anhydride. Accordingly, the amorphous syndiotactic rich polyolefin may be functionalized with an unsaturated compound (e.g., compounds comprising a carbon-carbon double bond, a carbon-carbon triple bond, and/or a compound comprising a heteroatom (e.g., B, N, O, Si, P, halogens (e.g., F, Cl, Br, I), and/or S). The functional group may comprise an aromatic compound, a vinyl compound, an organic acid, an organic amide, an organic amine, an organic ester, an organic di-ester, an organic imide, an organic anhydride, an organic alcohol, an organic acid halide, an organic-peroxide, and/or salts or derivatives thereof.

For ease of reference, unless otherwise stated, unsaturated compound(s) and/or compound(s) comprising a heteroatom are collectively referred to herein as "a functional group or functional groups, (abbreviated FG)". By fuictionalized (or grafted) it is meant that one or more functional group(s) are incorporated, grafted, bonded to, physically and/or chemically attached to the amorphous syndiotactic rich polyolefin (a-srPP) of the present invention, to produce an amorphous syndiotactic rich polyolefin functionalized with a functional group (abbreviated "a-srPP-g-FG", where "-g-FG" represents the grafted functional group). Functionalization of the polyolefin preferably occurs at or on the polymer backbone, but may also occur at the polymer ends, and on portions of the polymer which are pendant to the polymer backbone. Functionalization may also occur at other functional groups, and between various polymer chains.

In a preferred embodiment the functionalized syndiotactic rich polyolefin is essentially amorphous in that essentially all of the a-srPP-g-FG of the present invention is soluble in hexane, cyclohexane, xylene or toluene at room temperature. As such, at least about 95 wt %, preferably at least about 96 wt %, preferably at least about 97 wt %, preferably at least about 98 wt %, preferably at least about 99 wt %, preferably at least about 99.5 wt % of the a-srPP-g-FG is soluble in hexane, cyclohexane, xylene or toluene at room temperature, based on the total weight of the a-srPP-g-FG present.

As an exemplary embodiment, functional groups (i.e., compounds comprising a functional group) may be grafted onto an amorphous syndiotactic rich polypropylene (a-srPPr) utilizing radical copolymerization as described in detail herein, which may include use of a free radical initiator. Such a process is referred to herein as graft copolymerization. The end result being a functionalized amorphous syndiotactic rich propylene polymer or blend of functionalized polymers. Accordingly, the present invention comprises the result of contacting a polyolefin, preferably an amorphous syndiotactic rich polyolefin, with a functional group in the presence of a free radical initiator.

Preferred examples of functional groups include unsaturated carboxylic acids and salts thereof, along with acid derivatives including, but are not limited to, maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride and 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo (2.2.2)oct-5-ene-2,3-dicarboxylic acid anhydride, 1,2,3,4,5, &g, lo-octahydronaphthalene-2,3-dicarboxylic acid anhydride, 2-oxa-1,3-diketospiro(4.4)non-7-ene, bicyclo(2.2.1) hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and/or x-methyl-bicyclo(2.2.1)hept-5-ene-2,3-dicarboxylic acid anhydride (XMNA).

Examples of the esters of the carboxylic acids include esters of unsaturated carboxylic acids including methyl acrylate, ethyl acrylate, butyl acrylate, methyl methacrylate, ethyl methacrylate and butyl methacrylate.

Hydrolyzable unsaturated silane compounds may include radical polymerizable unsaturated group and an alkoxysilyl group or a silyl group in its molecule, such that the compound has a hydrolyzable silyl group bonded to a vinyl group and/or a hydrolyzable silyl group bonded to the vinyl group via an alkylene group, and/or a compound having a hydrolyzable silyl group bonded to an ester or an amide of acrylic acid, methacrylic acid or the like. Examples thereof include vinyltrichlorosilane, vinyltris(beta-methoxyethoxy)silane, vinyltriethoxysilane, vinyltrimethoxysilane, gamma-methacryloxypropyltrimethoxysilane monovinylsilane and monoallylsilane.

Examples of unsaturated halogenated hydrocarbons include vinyl chloride and vinylidene chloride.

Preferable examples of the radical initiator used in the graft copolymerization include organic peroxides such as benzoyl peroxide, methyl ethyl ketone peroxide, cyclohexanone peroxide, t-butylperoxyisopropyl carbonate, di-ti-butyl per-phthalate, 2,5-dimethyl-2,5-di(t-butylperoxy)hexene (Lupersol 101, ElfAtochem), 2,5-dimethyl-2,5-di(t-butylperoxy) hexene-3, di-t-butyl peroxide, cumene hydroperoxide, t-butyl hydroperoxide, dilauryl peroxide and dicumyl peroxide.

In a preferred embodiment, a-srPPr may be grafted with maleic anhydride (MA), to produce the functionalized amorphous syndiotactic rich polypropylene grafted with maleic anhydride (a-srPPr-g-MA), wherein the maleic anhydride may be covalently bonded to any one of the polymer chains of which the a-srPPr is comprised. The anhydride functionality grafted onto the polymer may remain as an anhydride, may be oxidized into acid and/or aldehyde functional groups, and/or may be further reacted by processes known in the art to induce other derivatives of the functional group such as amides, amines, esters, acid salts, and the like.

In a preferred embodiment the functional group is present in the functionalized polymer (e.g., a-srPP-g-FG) at about 0.005 to 99 wt %, based on the total weight of the functionalized polyolefin present. In a preferred embodiment, the functional group is present at about 0.01 to 99 wt %, preferably 0.05 to 90 wt %, preferably at 0.1 to 75 wt %, more preferably at 0.5 to 60 wt %, more preferably at 0.5 to 50 wt %, more preferably at 0.5 to 40 wt %, more preferably at 0.5 to 30 wt %, more preferably at 0.5 to 20 wt %, more preferably at 0.5 to 15 wt %, more preferably at 0.5 to 10 wt %, more preferably at 0.5 to 5 wt %, more preferably at 0.5 to 3 wt %, more preferably at 0.5 to 2 wt %, more preferably at 0.5 to 1 wt %, based upon the total weight of the functionalized polyolefin or blend thereof present.

In a still more preferred embodiment, the functionalized amorphous polyolefin is amorphous syndiotactic rich polypropylene grafted maleic anhydride (a-srPPr-g-MA). In yet a more preferred embodiment, the functional group maleic anhydride, is present in the polymer or polymer blend comprising amorphous syndiotactic rich polypropylene at a concentration of about 0.005 to 10 wt % MA, more preferably 0.01 to 10 wt % MA, more preferably at 0.5 to 10 wt % MA, more preferably at 0.5 to 5 wt % MA, more preferably at 1 to 5 wt % MA, more preferably at 1 to 2 wt % MA, more preferably at 1 to 1.5 wt % MA, as determined as described herein and based upon the weight of the functionalized amorphous syndiotactic rich polypropylene or blend thereof present.

The functionalized amorphous syndiotactic rich polyolefin of the present invention (a-srPP-FG), preferably amorphous syndiotactic rich polypropylene functionalized with maleic anhydride (a-srPPr-g-MA) may comprise at least about 50% r-dyads, and less than about 80% r-dyads, as determined according to the Ewen method. In a preferred embodiment, a-srPPr-g-MA may include at least about 55% r dyads, preferably at least about 60% r dyads, preferably at least about 65% r dyads, preferably at least about 70% r dyads, preferably at least about 75% r dyads, more preferably less than about 80% r-dyads, based on the total number of r and m dyads present in the polymer.

A functionalized amorphous syndiotactic rich polyolefin polymer (a-srPP-g-FG), preferably amorphous syndiotactic rich polypropylene functionalized with maleic anhydride (a-srPPr-g-MA) may comprise about 6.25% to about 31.6% r-pentads, based on the total number of r-pentads present in the polymer. In a preferred embodiment, a-srPP-g-FG may include about 9.15% r-pentads to about 31.6% r-pentads, preferably about 13.0% r-pentads to about 31.6% r-pentads, preferably about 13.0% r-pentads to about 24.0% r-pentads, preferably about 17.9% r-pentads to about 24.0% r-pentads, based on the total number of r-pentads present in the polymer.

In a preferred embodiment, the functionalized amorphous syndiotactic rich polyolefin polymer is a functionalized amorphous syndiotactic rich polypropylene (a-srPPr-g-FG), preferably amorphous syndiotactic rich polypropylene functionalized with maleic anhydride (a-srPPr-g-MA). The a-srPPr-g-FG, preferably amorphous syndiotactic rich polypropylene functionalized with maleic anhydride (a-srPPr-g-MA), preferably has a weight average molecular weight (Mw) of 5,000,000 or less, preferably about 5000 to about 5,000,000; a number average molecular weight (Mn) of about 3,000,000 or less, preferably about 5000 to about 3,000,000; and a z-average molecular weight (Mz) of about 10,000,000 or less, preferably about 5000 to about 10,000,000; all of which may be determined by size exclusion chromatography, e.g., 3D SEC, also referred to as GPC-3D as described herein.

In a preferred embodiment, the a-srPPr-g-FG of the present invention, preferably amorphous syndiotactic rich polypropylene functionalized with maleic anhydride (a-srPPr-g-MA), may have a Mw of about 5,000 to about 1,000,000 g/mole, more preferably a Mw of about 10,000 to about 500,000, more preferably a Mw of about 20,000 to about 300,000, more preferably a Mw of about 50,000 to about 200,000, wherein Mw is determined as described herein.

In a preferred embodiment, the a-srPPr-g-FG of the present invention, preferably amorphous syndiotactic rich polypropylene functionalized with maleic anhydride (a-srPPr-g-MA), may have a Mn of about 2,000 to about 500,000 g/mole, more preferably a Mn of about 5,000 to about 300,000, more preferably a Mn of about 10,000 to about 200,000, more preferably a Mn of about 20,000 to about 150,000, wherein Mn is determined as described herein.

In a preferred embodiment, the a-srPPr-g-FG of the present invention, preferably amorphous syndiotactic rich polypropylene functionalized with maleic anhydride (a-srPPr-g-MA), may have a Mz of about 10,000 to about 10,000,000 g/mole, more preferably a Mz of about 20,000 to about 1,000,000, more preferably a Mz of about 40,000 to about 500,000, more preferably a Mz of about 100,000 to about 400,000, wherein Mz is determined as described herein.

In a preferred embodiment, the a-srPPr-g-FG of the present invention, preferably amorphous syndiotactic rich polypropylene functionalized with maleic anhydride (a-srPPr-g-MA), may have a crystallization temperature (Tc) measured with differential scanning calorimetry (DSC) of about 120° C. or less, more preferably, 100° C. or less, more preferably no crystallization temperature is not discernable.

In a preferred embodiment, the a-srPPr-g-FG of the present invention, preferably amorphous syndiotactic rich polypropylene functionalized with maleic anhydride (a-srPPr-g-MA), may have a melt flow rate (MFR), which is inversely related to weight average molecular weight Mw, equal to or greater than 0.2 g/10 min., preferably between 2-500 g/10 min. and more preferably between 20-200 g/10 min., as measured per the ASTM D-1238 (190 c,2.16 kg)test method.

The amorphous syndiotactic rich polyolefin of the a-srPPr-g-FG, preferably amorphous syndiotactic rich polypropylene functionalized with maleic anhydride (a-srPPr-g-MA), may include alpha olefins within the base polymer. For example, a-srPPr-g-FG may include propylene (C3) as the base polymer, along with ethylene (C2) and from C4 to C40 alpha olefins, preferably C4 to C20 alpha olefins, more preferably C4 to C12 alpha olefins, with C2 and C4 to C10 alpha olefins being still more preferred.

Examples of preferred alpha olefins include butene-1, pentene-1, hexene-1, heptene-1, octene-1, nonene-1, decene-1, undecene-1, dodecene-1, tridecene-1, penetdecene-1, hexadecene-1, heptadecene-1, octadecene-1, and branched olefins including 3-methylbutene-1, 4-methylepentene-1, and 4,4-dimethylepentene-1.

The amount of alpha olefins in addition to the base polymer, when present in the a-srPPr-g-FG, preferably amorphous syndiotactic rich polypropylene functionalized with maleic anhydride (a-srPPr-g-MA), may be greater than about 0.001% by weight (wt %), based on the total weight of the polymer. Preferably, the amount of the alpha olefins is greater than or equal to about 0.1 wt %, more preferably greater than or equal to about 1 wt %. The other alpha olefins may also be present in the base polymer at about 50 wt % or less. Preferably, the amount of the other alpha olefins is less than or equal to about 20 wt %, more preferably less than or equal to about 10 wt %.

In a preferred embodiment, the a-srPP-g-FG, more preferably the a-srPPr-g-FG, still more preferably amorphous syndiotactic rich polypropylene functionalized with maleic anhydride (a-srPPr-g-MA) of the present invention may have a heat of fusion (Hf) determined according to the procedure described in ASTM E 794-85, which is less than or equal to about 10 Joules/g, preferably less than or equal to about 9 Joules/g, preferably less than or equal to about 8 Joules/g, preferably less than or equal to about 7 Joules/g, preferably less than or equal to about 6 Joules/g, preferably less than or equal to about 5 Joules/g, preferably less than or equal to about 4 Joules/g, preferably less than or equal to about 3 Joules/g, preferably less than or equal to about 2 Joules/g, preferably less than or equal to about 1 Joule/g, still more preferably, a heat of fusion which is not detectable according to the procedure described in ASTM E 794-85.

In a preferred embodiment, the a-srPP, more preferably the a-srPPr, prior to functionalization into a-srPP-g-FG of the present invention, preferably amorphous syndiotactic rich polypropylene functionalized with maleic anhydride (a-srPPr-g-MA), may have an ash content, determine according to the procedure described in ASTM D 5630, which is less than or equal to about 1 wt %, based on the total amount of the polymer present, more preferably less than or equal to about 0.9 wt %, more preferably less than or equal to about 0.8 wt %, more preferably less than or equal to about 0.7 wt %, more preferably less than or equal to about 0.6 wt %, more preferably less than or equal to about 0.5 wt %, more preferably less than or equal to about 0.4 wt %, more preferably less than or equal to about 0.3 wt %, more preferably less than or equal to about 0.2 wt %, more preferably less than or equal to about 0.1 wt %, more preferably less than or equal to about 0.05 wt %, more preferably less than or equal to about 0.01 wt %, more preferably less than or equal to about 0.005 wt %, with an ash content, as determined according to ASTM D 5630 of less than or equal to about 0.001 wt % ash content being still more preferred.

In a preferred embodiment, the functionalized amorphous syndiotactic rich polyolefin, preferably amorphous syndiotactic rich polypropylene functionalized with maleic anhydride (a-srPPr-g-MA), is heat stable, by which is meant that the Gardner color of the a-srPP-g-FG (as determined by ASTM D-1544-68) that has been heat aged (e.g., maintained) at or 180° C. for 48 hours, does not change by more than 7 Gardner units when compared to the Gardner color of the initial composition. Preferably, the Gardner color of the functionalized polymer or composition comprising the functionalized polymer, after heating above its melting point for 48 hours, does not change by more than 6, more preferably 5, still more preferably 4, still more preferably 3, still more preferably 2, still more preferably 1 Gardner color unit, as compared to the initial functionalized polymer prior to being heated (e.g., prior to heat aging).

In the case of amorphous syndiotactic rich polypropylene functionalized (e.g. grafted) with maleic anhydride (a-srPPr-g-MA) it has been discovered that free acid groups present in the composition may result in reduced heat stability. Accordingly, in a preferred embodiment, the amount of free acid groups present in the a-srPPr-g-MA, or blend comprising a-srPPr-g-MA, is less than about 1000 ppm, more preferably less than about 500 ppm, still more preferably less than about 100 ppm, based on the total weight of the a-srPPr-g-MA present.

It has also been discovered that various phosphites may contribute to instability. Accordingly, in yet another preferred embodiment, the a-srPP-g-FG, more preferably the a-srPPr-g-MA, is essentially free from phosphites, by which it is meant that phosphites are present at 100 ppm or less, based on the weight of a-srPP-g-FG, more preferably the a-srPPr-g-MA.

Functionalization of an Amorphous Syndiotactic Rich Polyolefin

Functionalization of an amorphous syndiotactic rich polyolefin (a-srPP) with a functional group (FG) to produce a functionalized amorphous syndiotactic rich polyolefin (a-srPP-g-FG), preferably amorphous syndiotactic rich polypropylene functionalized with maleic anhydride (a-srPPr-g-MA) of the present invention, may be obtained by contacting the polymer to be functionalized along with the functional group, preferably in the presence of the radical initiator. In an preferred embodiment, the combination is heated to a temperature at, near, or above the decomposition temperature of one or more of the radical initiator(s) being used.

In some embodiments, no particular restriction need be put on the amount of functional group to be used, accordingly, conventional conditions such as may be utilized for functionalizing an isotactic polypropylene may be used to produce the functionalized amorphous syndiotactic rich polyolefin, preferably amorphous syndiotactic rich polypropylene functionalized with maleic anhydride (a-srPPr-g-MA) of the present invention. Since in some cases the efficiency of the copolymerization is relatively high, the amount of the functional group may be small (i.e., less than or equal to about 1 wt % functional group, based on the total weight of the functionalized polymer.

The radical initiator is preferably used in a ratio of from 0.00001 to 10 wt %, based on the weight of the functional group. When applicable, the heating temperature depends upon whether or not the contact (e.g., the reaction) of the polymer, the functional group, and the radical initiator when used, is carried out in the presence of a solvent. The contact temperature is preferably greater than about 0° C. and less than about 500° C., with from about 50° C. to 350° C. being more preferred. When the heating temperature is less than 50° C., the reaction may be slow and thus efficiency may be low. When it is more than 350° C., decomposition of the polymer or other components may occur. Accordingly, the a-srPP, preferably the a-srPPr of the present invention may be functionalized with a functional group utilizing a solvent based functionalization process and/or utilizing a melt based functionalization process without a solvent.

In the solvent based process, the reaction may be carried out using the a-srPP, preferably the a-srPPr in solution, or as a slurry having a concentration of from 0.1 to 50 wt % in the presence of a halogenated hydrocarbon compound having 2 to 20 carbon atoms, an aromatic compound, a halogenated aromatic compound, and/or an alkyl substituted aromatic hydrocarbon which is stable to the radicals.

Importantly, it has been discovered herein that, amorphous polyolefins, more preferably amorphous syndiotactic rich polyolefins, still more preferably amorphous syndiotactic rich polypropylene of the present invention, may functionalized in aliphatic solvents including cyclic hydrocarbons, and/ or hydrocarbons having 6 to 20 carbon atoms. Preferred aliphatic solvents include cyclohexane, hexane, and mixtures comprising cyclohexane and/or hexane.

Accordingly, this unexpected discovery thus may avoid use of aromatic and/or halogenated solvents and thus the present invention may by utilized to reduce environmental issues and restraints that may be associated with the use of aromatic and/or halogenated solvents, especially in mass production. This discovery also provides for direct use of a polymer solution from a polymerization reactor for functionalization, thus avoiding an added finishing and/or re-dissolving step(s), as described in more detail herein. Further, this discovery also allows for the advantages associated with the use of solvents having lower boiling points than those associated with aromatic solvents. Use of solvents in functionalization having boiling points below that of benzene, toluene, xylene, or the like, for example, will facilitate removal of solvent from the functionalized polymer at a lower temperature and/or higher pressure relative to a particular aromatic solvent. Lower temperature removal may thus result in less degradation of the polymer, more efficient solvent removal, and an increase in productivity/lower cost of solvent removal resultant from operation at a lower temperature and/or a higher pressure relative to operational conditions required for solvent removal of an aromatic solvent.

In the functionalization process utilizing a melt based functionalization process the reaction may be carried out with little or no solvent present, preferably in the absence of the solvent, in a device such as an extruder, a mixer, or the like, which can produce sufficient physical contact between what may be highly viscous components to affect contact and thus functionalization of the amorphous syndiotactic rich polyolefin. In the melt based functionalization process, the functionalization reaction may be effected at a relatively high temperature as compared to the same reaction a solution or solvent based functionalization process.

Other methods for functionalizing the a-srPP, preferably the a-srPPr of the present invention may include, but are not limited to, selective oxidation, ozonolysis, epoxidation, and the like, both in solution or slurry (i.e., with a solvent and/or diluent), or in a melt or mixer (i.e., without a solvent).

In the present invention, the functionalization (e.g., graft polymerization) may also be carried out in an aqueous medium. In this case one or more dispersants may be used. Examples of suitable dispersants include: saponified polyvinyl acetate, modified celluloses such as hydroxyethyl cellulose and hydroxypropyl cellulose, and compounds containing an OH group such as polyacrylic acid and polymethacrylic acid. In addition, compounds which are used in a usual aqueous suspension polymerization can also be widely employed.

The aqueous functionalization may be carried out by suspending the polymer, the functional group, the water-insoluble radical initiator and/or the dispersant in water, and then heating the mixture. Here, a ratio of water to the sum of the functional group is preferably 1:0.1 to 1:200, more preferably 1:1 to 1:100. The heating temperature is such that the half-life of the radical initiator is preferably from 0.1 to 100 hours, more preferably from 0.2 to 10 hours, and it is preferably from 30° to 200° C., more preferably from 40° to 150° C. In the heating step, it is preferred that the mixture is stirred sufficiently so as to become in a suspension state. In this way, the grafted polyolefin may be obtained in granular form.

A weight ratio of the functional group to the polyolefin or blend comprising the polyolefin to be functionalized may preferably be from 1:01 to 1:10000, and a weight ratio of the radical initiator to the functional group may be from 0.00001 to 0.1.

As stated above, the presence of free acid groups and phosphites in functionalized srPP may affect heat stability of the a-srPP-g-FG, in particular with respect to a-srPPr-g-MA. The concentration of free acid groups and other moieties which may negatively affect heat stability in a-srPPr-g-MA may be reduced and/or controlled by:

1. Reaction control, wherein the materials are contacted at a temperature, and for a period of time sufficient to insure an essentially complete reaction and thus essentially complete consumption of the added functional group (e.g., maleic anhydride) during the functionalization process;
2. Post washing, wherein the functionalized polymer is contacted (e.g., washed) at least once with a solvent, with water, with a dilute acid, with a dilute base, or a combination thereof, after the functionalization reaction;
3. Master batching, wherein a master batch of functionalized polymer is produced and/or processed to be essentially free from free acid groups and/or other moieties, and wherein the master batch has a concentration of maleic anhydride functional groups above that required in the final composition, and wherein the master batch is blended in the final blend (also referred to as being "let down") in an amount sufficient to produce the desired level of a-srPP-FG, preferably a-srPPr-MA, in the final blend; or
4. Moisture control, wherein moisture (e.g., water) level in the functionalized polymer is kept at a level which maintains the anhydride functionality of the anhydride (e.g., MA).

Solution functionalization utilizing an aliphatic solvent is a preferred functionalization method to improve heat stability of a-srPP-FG, preferably a-srPPr-g-MA.

For reaction in solution, the a-srPP may be dissolved in an appropriate solvent (e.g., an aromatic solvent such as benzene, toluene, or xylene, or an aliphatic solvent such as hexane or cyclohexane). After the solution containing a-srPP is heated to the desired temperature (e.g., from about 60 to 150° C.), a free radical initiator and a functional group (e.g., a reactive amide and/or maleic anhydride) may be added to initiate the grafting process. After stirring for about 30 min. to about 5 hr or more, the solution is precipitated into a second solvent such as acetone, to separate functionalized polymer from unreacted modifier. The filtered product may then be dried under vacuum (e.g., at 120° C.) to afford the final functionalized amorphous polyolefin product.

Accordingly, in one embodiment, functionalization process may comprise the steps of:

1) providing olefin monomer (e.g., propylene), catalyst, activator and the like to a reactor in hexane or a mixture of aliphatic solvents;
2) catalytic solution polymerization;
3) monomer stripping;
4) solvent removal and product drying to produce polymer;
5) redissolution of polymer in non-aliphatic solvent (e.g., benzene, toluene, or non-hydrocarbon solvent) for solution functionalization;
6) solvent based functionalization; and
7) removal of solvent used in solvent based functionalization.

In a preferred embodiment, functionalization process may comprise the steps of:

1) providing olefin monomer (e.g., propylene), catalyst, activator and the like to a reactor in hexane or a mixture of aliphatic solvents;

2) catalytic solution polymerization;
3) monomer stripping;
4) solvent based functionalization; and
5) separation of the functionalized polyolefin (e.g., via precipitation upon addition of a solvent, temperature control, and/or removal of solvent used in solvent based functionalization. Such a preferred process can be realized by a continuous stirred tank reactor or sequential reactor tank.

Accordingly, a method to produce the functionalized amorphous syndiotactic rich polyolefin of the present invention may comprise the steps of:
1) providing an olefin monomer, metallocene catalyst, and an activator to a reactor in an aliphatic solvent;
2) catalytic solution polymerization of the olefin monomer in the reactor to produce an amorphous syndiotactic rich polyolefin;
3) monomer stripping to remove unreacted olefin monomer;
4) solvent based functionalization; comprising contacting the amorphous syndiotactic rich polyolefin with a functional group in the presence of a free radical initiator in the aliphatic solvent utilized in the solution polymerization step, at a temperature and for a period of time sufficient to produce the functionalized amorphous syndiotactic rich polyolefin; and optionally,
5) precipitation of functionalized amorphous syndiotactic rich polyolefin via addition of a solvent such as acetone, and/or the removal of the aliphatic solvent.

It is desirable to functionalized propylene-based homopolymers and copolymers in solution for best control of the functionalization chemistry. It is further desirable in some applications that the functionalized polymer can be delivered to target application—such as primer for a TPO bumper—in solution.

Functionalization in a melt involves a process similar to that in solution, except that no solvent is required, the reaction takes place in a mixing device (e.g., an extruder or Brabender), and the temperature may be higher than that used in the solvent based process. Accordingly, a method to produce the functionalized amorphous syndiotactic rich polyolefin of the instant invention may comprise the steps of:
A. providing a melt comprising an amorphous syndiotactic rich polyolefin, a functional group, and a free radical initiator to a mixing device; and
B. contacting said melt within said mixing device at a temperature and for a period of time sufficient to produce the functionalized amorphous syndiotactic rich polyolefin.

In a preferred embodiment, the method may comprise the steps of:
A. providing a melt comprising an amorphous syndiotactic rich polypropylene, maleic anhydride, and an organic peroxide as a free radical initiator to a mixing device; and
B. contacting the melt within the mixing device at a temperature and for a period of time sufficient to produce a-srPP-g-MA of the present invention.

In a preferred embodiment, wherein a nanoclay may be added to the polymer, a method to produce a functionalized amorphous syndiotactic rich polyolefin may comprise the steps of:
A. providing a melt comprising an amorphous syndiotactic rich polyolefin, a functional group, an optional nanoclay, and a free radical initiator to a mixing device;
B. contacting said melt and optional nanoclay within said mixing device at a temperature and for a period of time sufficient to produce said functionalized amorphous syndiotactic rich polyolefin, wherein the amorphous syndiotactic rich polyolefin comprises greater than about 50 wt % $C_3$-$C_{40}$ alpha olefins;
about 50% to less than about 80% r dyads, based on the total number of r and m dyads present in the polyolefin;
and a heat of fusion of 10 joules/g or less according to the procedure described in ASTM E 794-85.

Preferably, the method includes wherein the amorphous syndiotactic rich polyolefin further comprises an ash content of 1 wt % or less, and/or wherein the functionalized amorphous syndiotactic rich polyolefin is amorphous syndiotactic rich polypropylene functionalized with maleic anhydride, and/or further comprising the addition of an organo-clay after said contacting step B.

Applications Comprising the Inventive Polymers

Both the amorphous syndiotactic rich polyolefin, preferably the amorphous syndiotactic rich polypropylene and the functionalized amorphous syndiotactic rich polyolefin, preferably the functionalized amorphous syndiotactic rich polypropylene, more preferably the amorphous syndiotactic rich polypropylene functionalized with maleic anhydride may be utilized in a number of applications. Examples include, injection molded parts, films, laminates, substrates, other articles of manufacture, and as a compatibilizer in formation of various articles from a combination of recycled materials, neat materials, or both.

Injection molded parts include various articles of manufacture produced through injection molding, as is known to one of skill in the art. Films include melt blown films, extruded films, cast films, and the like. Laminates include one or more layer, with or without additional adhesives and/or other materials disposed between the layers of the laminate. Substrates may be non-polar or polar, and may be affected by incorporation of functional groups within the functionalized amorphous syndiotactic rich polyolefins of the present invention.

The polymer of the present invention may also comprise a master batch. In an embodiment, the master batch may include the above described amorphous syndiotactic rich polyolefin, preferably the amorphous syndiotactic rich polypropylene and/or the above described functionalized amorphous syndiotactic rich polyolefin, preferably the functionalized amorphous syndiotactic rich polypropylene, more preferably the amorphous syndiotactic rich polypropylene functionalized with maleic anhydride. The master batch may also include various other additives and/or other components consistent with the end use, such that the material within the master batch may be "let down" into a particular end use.

The amorphous character of the syndiotactic rich polyolefin, preferably the amorphous syndidtactic rich polypropylene and the functionalized amorphous syndiotactic rich polyolefin, preferably the functionalized amorphous syndiotactic rich polypropylene, more preferably the amorphous syndiotactic rich polypropylene functionalized with maleic anhydride also allows the present invention to be utilized in a liquid form, preferably dissolved in an appropriate solvent. As such, the present invention may be atomized and/or spray applied to a substrate via techniques known to those of skill in the art.

Polymer Formulations

Both the amorphous syndiotactic rich polyolefin, preferably the amorphous syndiotactic rich polypropylene and the functionalized amorphous syndiotactic rich polyolefin, preferably the functionalized amorphous syndiotactic rich polypropylene, more preferably the amorphous syndiotactic rich polypropylene functionalized with maleic anhydride may be utilized as a blend in combination with at least one, preferably one or more additives. The polymer of the present invention may thus be utilized as an additive, as an adhesive, or as a base polymer in an adhesive blend. As used herein, an additive may be any material or combination of materials which facilitate, improve, modifies, or retards physical properties of the polymer blend, or which facilitates the use of the amorphous syndiotactic rich polyolefin, preferably the amorphous syndiotactic rich polypropylene, and/or the functionalized amorphous syndiotactic rich polyolefin, preferably the functionalized amorphous syndiotactic rich polypropylene, more preferably the amorphous syndiotactic rich polypropylene functionalized with maleic anhydride of the present invention.

Additives suitable for use herein may comprise one or more of C2-C40 polymers, elastomers, random copolymers, impact copolymers, fluctional polymers, tackifiers, crosslinking agents, antioxidants, neutralizing agents, nucleating agents, fillers, adhesion promoters, oils, plasticizers, waxes, low molecular weight polymers, ester polymers, and/or other additives.

C2-C40 Polymers

In an embodiment, an additive may include various C2-C40 polyolefin polymers ("polymers") either alone, or in a blend with other polymers and/or additives. Accordingly, the additive may comprise a single discrete polymer, or a blend of discrete polymers. Such blends may include two or more polyolefins such as polypropylene-polyethylene copolymers, two or more polypropylene copolymers, where each of the components of the polymer blend would individually qualify as an additive.

In a preferred embodiment the additive comprises a metallocene polyethylenes (mPE's) and/or metallocene polypropylenes (mPPr's). The mPE and mPPr homopolymers or copolymers are typically produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings by may substituted or unsubstituted. Several commercial products produced with such catalyst/activator combinations are commercially available from ExxonMobil Chemical Company in Baytown, Tex. under the tradenames EXCEED™, ACHIEVE™ and EXACT™. For more information on the methods and catalysts/activators to produce such mPE homopolymers and copolymers see WO 94/26816; WO 94/03506; EPA 277,003; EPA 277,004; U.S. Pat. No. 5,153,157; U.S. Pat. No. 5,198,401; U.S. Pat. No. 5,240,894; U.S. Pat. No. 5,017,714; CA 1,268,753; U.S. Pat. No. 5,324,800; EPA 129,368; U.S. Pat. No. 5,264,405; EPA 520,732; WO 92 00333; U.S. Pat. No. 5,096,867; U.S. Pat. No. 5,507,475; EPA 426 637; EPA 573 403; EPA 520 732; EPA 495 375; EPA 500 944; EPA 570 982; WO91/09882; WO94/03506 and U.S. Pat. No. 5,055,438.

In another embodiment the additive comprises homopolypropylene, propylene copolymerized with up to 50 wt % of ethylene or a C4 to C20 alpha-olefin, isotactic polypropylene, highly isotactic polypropylene (e.g., having greater than about 50% m-pentads), syndiotactic polypropylene, random copolymer of propylene and ethylene and/or butene and/or hexene, polybutene, ethylene vinyl acetate, low density polyethylene (density 0.915 to less than 0.935 g/cm3) linear low density polyethylene, ultra low density polyethylene (density 0.86 to less than 0.90 g/cm3), very low density polyethylene (density 0.90 to less than 0.915 g/cm3), medium density polyethylene (density 0.935 to less than 0.945 g/cm3), high density polyethylene (density 0.945 to 0.98 g/cm3), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, elastomers such as ethylene-propylene rubber (EPR), vulcanized EPR, EPDM, block copolymer elastomers such as SBS, nylons (polyamides), polycarbonates, PET resins, crosslinked polyethylene, copolymers of ethylene and vinyl alcohol (EVOH), polymers of aromatic monomers such as polystyrene, poly-1 esters, graft copolymers generally, polyacrylonitrile homopolymer or copolymers, thermoplastic polyamides, polyacetal, polyvinylidine fluoride and other fluorinated elastomers, polyethylene glycols and polyisobutylene.

Other preferred propylene copolymers useful herein as additives are described in detail as the "Second Polymer Component (SPC)" in co-pending U.S. applications U.S. Ser. No. 60/133,966, filed May 13, 1999, and U.S. Ser. No. 60/342,854, filed Jun. 29, 1999, and described in further detail as the "Propylene Olefin Copolymer" in U.S. Ser. No. 90/346,460, filed Jul. 1, 1999, which are both fully incorporated by reference herein for purposes of U.S. practice.

In a preferred embodiment, the additive may comprise propylene, one or more comonomers (such as ethylene, alpha-olefins having 4 to 8 carbon atoms, and styrenes) and optionally one or more α, ω dienes. The amount of diene is preferably no greater than about 10 wt %, more preferably no greater than about 5 wt %. Preferred dienes include those used for vulcanization of ethylene propylene rubbers, preferably ethylidene norbornene, vinyl norbornene, dicyclopentadiene, and 1,4-hexadiene (available from DuPont Chemicals).

In an embodiment, the additive may comprise two or more polypropylene copolymers, each of which preferably differ in α-olefin content, with one being in the range of 7 to 13 mole % α-olefin while the other is in the range of 14 to 22 mole % α-olefin. The preferred α-olefin is ethylene. It is believed that the use of two-polymer components leads to beneficial improvements in the tensile-elongation properties of the final blends.

Polymers suitable for use herein as additives also include amorphous syndiotactic rich C3-C40 homopolymer or copolymer, and/or an at least partially crystalline syndiotactic rich C3-C40 homopolymer or copolymer. An at least partially crystalline polyolefin being defined as a polyolefin homopolymer or copolymer having at least 10 wt % solubility in xylene or toluene at room temperature. Preferably, the additive comprises a syndiotactic rich polyolefin, having a 15 wt %, preferably a 20 wt %, preferably a 25 wt %, preferably a 30 wt %, preferably a 35 wt %, preferably a 40 wt %, preferably a 45 wt %, preferably a 50 wt %, preferably a 55 wt %, preferably a 60 wt %, preferably a 65 wt %, preferably a 70 wt %, preferably a 75 wt %, preferably an 80 wt %, preferably an 85 wt %, preferably a 90 wt %, preferably a 95 wt % solubility in xylene or toluene at room temperature. Still more preferably, the syndiotactic rich polyolefin of the above additive comprises an at least partially crystalline syndiotactic rich polypropylene (srPPr).

The at least partially crystalline syndiotactic rich polypropylene,(srPPr) may be defined herein to comprise at least about 80% [r] dyads. Preferably at least about 85% [r] dyads, with at least about 90% [r] dyads preferred, with at least about 95% [r] dyads more preferred, with at least about 99% [r] dyads yet still more preferred.

The additive may also include an at least partially crystalline syndiotactic rich polyolefin comprising polypropylene as the base polymer, along with other alpha olefins including ethylene (C2) and from C4 to C40 alpha olefins. Examples of alpha olefins include butene-1, pentene-1, hexene-1, heptene-1, octene-1, nonene-1, decene-1, undecene-1, dodecene-1, tridecene-1, penetdecene-1, hexadecene-1, heptadecene-1, octadecene-1, and branched olefins including 3-methylbutene-1, 4-methylepentene-1, and 4,4-dimethylepentene-1.

The amount of the other alpha olefins, when present in the at least partially crystalline syndiotactic rich polypropylene may be greater than about 0.001% by weight (wt %), based on the total weight of the polymer. Preferably, the amount of the other alpha olefins is greater than or equal to about 0.1 wt %, more preferably greater than or equal to about 1 wt %. The other alpha olefins may also be present in the base polymer at about 50 wt % or less. Preferably, the amount of the other alpha olefins is less than or equal to about 20 wt %, more preferably less than or equal to about 10 wt % in the base polymer.

Elastomers

In another embodiment the additive may comprise an elastomer. Examples of suitable elastomers include one or more polypropylene copolymers having elastic properties. Such preferred propylene copolymers having elastic properties may be prepared according the procedures in WO 02/36651 which is incorporated by reference here. Likewise the additive may comprise polymers consistent with those described in WO 03/040202, WO 03/040095, WO 03/040201, WO 03/040233, and/or WO 03/040442. Additionally, the additive may comprise polymers consistent with those described in EP 1,233,191, and U.S. Pat. No. 6,525,157.

Preferred propylene copolymers having elastomeric properties include those prepared by polymerizing propylene with a C2 or C4-C20 alpha olefin, most preferably propylene and ethylene, in the presence of a chiral metallocene catalyst with an activator and optionally a scavenger. The co-monomer used with propylene may be linear or branched. Preferred linear alpha-olefins include ethylene (C2) and C4 to C8 alpha olefins. Examples of preferred α-olefins include ethylene, 1-butene, 1-hexene, and 1-octene, even more preferably ethylene or 1-butene. Preferred branched α-olefins include 4-methyl-1-pentene, 3-methyl-1-pentene, and 3,5,5-trimethyl-1-hexene.

Preferred additives comprising propylene copolymers having elastomeric properties may have an average propylene content on a molar basis of from about 68% to about 92%, more preferably from about 75% to about 91%, even more preferably from about 78% to about 88%, most preferably from about 80% to about 88%. The balance of the copolymer may be one or more α-olefins as specified above and optionally minor amounts of one or more diene monomers. Preferably, the polypropylene copolymer comprises ethylene as the comonomer in the range of from about 8 to 32 mole % ethylene, more preferably from about 9 to about 25 mole % ethylene, even more preferably from about 12 to about 22 mole % ethylene and most preferably from about 13 to 20 mole % ethylene.

The use of a chiral metallocene catalyst to produce these propylene copolymers having elastomeric properties ensures that the methyl group of the propylene residues have predominantly the same tacticity. Both syndiotactic and isotactic configuration of the propylene are possible, with the isotactic polymers being particularly preferred. The tacticity of the propylene residues leads to crystallinity in the polymers. For the polymers of the additives of the present invention, the low levels of crystallinity in the polypropylene copolymer may be derived from isotactic polypropylene obtained by incorporating alpha-olefin co-monomers as described above.

Particularly preferred additives comprising propylene copolymers having elastomeric properties include semi-crystalline propylene copolymers preferably having:

1. a heat of fusion from about 0.5 J/g to about 25 J/g, more preferably from about 1 J/g to about 20 J/g, and most preferably from about 1 J/g to about 15 J/g; and/or
2. a crystallinity of about 0.25% to about 15%, more preferably from about 0.5% to about 13%, and most preferably from about 0.5% to about 11% (The crystallinity of the polypropylene copolymer is expressed in terms of percentage of crystallinity. The thermal energy for the highest order of polypropylene is estimated for use herein at 189 J/g. That is, for use herein, 100% crystallinity is assumed to be equal to 189 J/g.); and/or
3. a single broad melting point or melting transition (A sample of the polypropylene copolymer may show a secondary melting peak or peaks adjacent to a principal peak, yet for the purposes herein, these are considered together as a single melting point or melting transition.); and/or
4. a melting point of from about 25° C. to about 75° C., preferably in the range of from about 25° C. to about 65° C., more preferably in the range of from about 30° C. to about 60° C. (The highest of melting transition peaks is considered the melting point.); and/or
5. a weight average molecular weight of 10,000 to 5,000,000 g/cc, preferably 80,000 to 500,000; and/or
6. an MWD (Mw/Mn) between 1.5 to 40.0, more preferably between about 1.8 to 5 and most preferably between 1.8 to 3; and/or
7. a Mooney viscosity ML (1+4)@125° C. less than 100, more preferably less than 75, even more preferably less than 60, most preferably less than 30.

Other elastomers suitable for use herein include all natural and synthetic rubbers, including those defined in ASTM D 1566. In a preferred embodiment, elastomers may be rubber toughened compositions. In a particularly preferred embodiment, the rubber toughened composition is a two (or more) phase system where the rubber is a discontinuous phase within a continuous phase comprising the functionalized amorphous syndiotactic rich polyolefin. Examples of preferred elastomers include ethylene propylene rubber, ethylene propylene diene monomer rubber, neoprene rubber, styrenic block copolymer rubbers (including SI, SIS, SB, SBS, SIBS, SEBS, SEPS, and the like (S is styrene, I is isoprene, B is butadiene, EB is ethylenebutylene, EP is ethylenepropylene), butyl rubber, halobutyl rubber, copolymers of isobutylene and para-alkylstyrene, halogenated copolymers of isobutylene and para-alkylstyrene.

Random Copolymers

In another embodiment, the additive may comprise a random copolymer. Random copolymers suitable for use herein may be produced by copolymerizing propylene in a single reactor process with other monomers such as ethylene, butene and higher alpha-olefins, the most common one being ethylene. Ethylene content for these additive copolymers preferably ranges from 3-4 mole %, up to 14-17 mole %, preferably from 1 mole % to 20 mole %.

Examples of suitable random copolymers also include random crystallizable propylene copolymers having a narrow compositional distribution. The intermolecular composition distribution of the polymer may be determined by thermal fractionation in a solvent such as a saturated hydrocarbon e.g., hexane or heptane. By having a narrow compositional distribution, it is meant that approximately 75% by weight and more preferably 85% by weight of the polymer is isolated as one or two adjacent, soluble fraction with the balance of the polymer in immediately preceding or succeeding fractions. Thus in a copolymer having a narrow compositional distribution, each of these fractions may have a composition (wt. % ethylene content) with a difference of no greater than 20% (relative to each other) and more preferably 10% (relative to each other) of the average wt % ethylene content of the polypropylene copolymer.

The length and distribution of stereoregular propylene sequences in preferred random crystallizable polypropylene copolymers is consistent with substantially random statistical copolymerization, in which the sequence length and distribution are related to the copolymerization reactivity ratios. By substantially random, it is meant that the copolymer reactivity ratio is generally 1 or less. In stereoblock structures, the average length of polypropylene sequences may be greater than that of substantially random copolymers with a similar composition, which is unlike polymers with stereoblock structure having a distribution of polypropylene sequences consistent with blocky structures rather than a random substantially statistical distribution. The reactivity ratios and sequence distribution of the polymer may be determined by 13C NMR, which locates the ethylene residues in relation to the neighboring propylene residues. The crystallizable copolymer with the required randomness and narrow composition distribution suitable for use as an additive herein are preferably prepared using (1) a single sited catalyst and (2) a well-mixed, continuous flow stirred tank polymerization reactor which allows only a single polymerization environment for substantially all of the polymer chains of preferred polypropylene copolymers.

Impact Copolymers

In another embodiment the additive may comprise one or more impact copolymers, also called heterophasic copolymers or block copolymers. Impact copolymers suitable for use herein may be defined to be a blend of isotactic PP and an elastomer such as an ethylene-propylene rubber. In a preferred embodiment the impact copolymer blend is present in a two (or more) phase system where the impact copolymer is a discontinuous phase in the adhesive composition and the a-srPP-g-FG, and/or other additives as described above, is the continuous phase.

Fluctional Polymers

In another embodiment the additive may comprise one or more polymers produced with a so-called "fluctional catalyst". Such polymers are referred to herein as "fluctional polymers", which include linear isotactic polymers having a structure of one or several C2 to C20 olefins, of which the isotacticity due to statistic distribution of stereoscopic errors in the polymer chain, is within the range of from 25 to 60% of [mmmm] pentad concentration. Determination of the pentad concentration may be determined using e.g. in J. A. Ewen, "Catalytic Polymerization of Olefins", (the Ewan method); and Eds. T. Keii, K. Soga; Kodanska Elsevier Pub.; Tokyo, 1986, P 271 et seq.

Suitable fluctional polymers for use as additives include those described in U.S. Pat. No. 6,555,643, wherein it is essential that the stereoscopic errors be situated in the polymer chain itself such that a specific pentad concentration results. Preferably, the fluctional polymers comprise an [rmrm] pentad concentration having a maximum of 2.5% of the entire pentad area with an [rmrm] pentad concentration of essentially zero (i.e., completely missing).

The combined concentration of [rrrr] and [rrrm] pentads in suitable fluctional polymers may be greater than the concentration of [rmrm] pentad concentration. In a preferred embodiment, the fluctional polymers are linear, isotactic polymers having a weight average molecular weight of 100,000 to 800,000 g/mol, preferably 110,000 to 500,000 g/mol, and more preferably 120,000 to 300,000 g/mol. The molecular weight distribution Mw/Mn of the polymers according to this preferred embodiment may be about 1.2 to 3.5. Suitable fluctional polymers may have a glass transition temperature Tg of −50° C. to +30° C., preferably −20° C. to +10° C., as determined by DSC.

Preferred fluctional polymers include linear, isotactic polymers comprising one or several C2-C20 olefins. Preferably, the olefin is a C3-C20 alk-1-ene, such as propene, 1-butene, 2-butene, 1-pentene, 1-hexene, 1-octene, 1-nonene, 1-decene, 1-dodecene, 1-hexadecene, 1-octadecene, and 1-eicosene or a C5-C20 cycloolefin, for example, cyclopentene, cyclohexene, norbornadiene and its derivatives, with polypropylene being especially preferred. Also preferred are copolymers prepared from propylene and a C4-C20 olefin or cycloolefin.

Preferred fluctional polymers are essentially soluble in toluene at a 20 to 80° C. In addition, such polymers demonstrate a distinct elastic behavior in a tensile-strength test, showing a distinctive rubber-elastic plateau as compared to a either a flow behavior or breaking of the polymer (see FIG. 1 of U.S. Pat. No. 6,555,643). Suitable fluctional polymers may also possess a crystallization melting temperature, measured by means of the "Differential Scanning Calorimetry" (DSC) within the range of from −50° C. to 150° C. Suitable fluctional polymers clearly differ in regard of their elastic-thermoplastic behavior from the state-of-the-art, i.e. from the polymers disclosed in, for example, EP 0 707 016 A1.

Accordingly, fluctional polymers include those produced utilizing fluctional catalyst of the general formula:

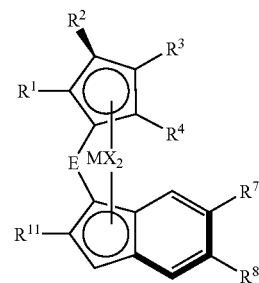

wherein M is a metal selected from the group consisting of titanium, zirconium, hafnium, vanadium, niobium, or tantalum; X is a halogen or a C1-C5 alkyl, aryl, or benzyl group, $R^1$, $R^2$, $R^3$, $R^4$, $R^6$, and $R^7$ are a linear or branched C1-C10 alkyl, a C5-7 cycloalkyl that, in its turn, may carry one or several C1-C6 alkyl residues as substituents, a C6-C18 aryl, aryl alkyl or alkyl aryl, in which case $R^1$, $R^2$, $R^3$, $R^4$, and $R^6$, $R^7$, here again, may be partially or simultaneously integrated into C5-C7 cycloalkyl or aryl rings fused thereto.

In case of the metallocene compound according to the above formula, it is essential that the number 7 indenyl carbon adjacent to the carbon substituted by residue R7 and the number 4 indenyl carbon adjacent to the carbon substituted by residue R6 are only substituted by hydrogen, thereby providing a catalyst that is especially advantageous for preparing isotactic elastomers according to the invention. Suitable bridging structural units E are —CH2 CH2—, —CH2 CH2 CH2—, —CH2 CH2 CH2 CH2—, —CR9 R10—, —SiR9 R10—, or —GeR9 R10—, wherein R9 and R10 are a C1-C8 alkyl, a C4-7 cycloalkyl or aryl, and R9 and R10 are able to join together to form a ring structure.

Tackifiers

Additives may also include tackifiers. Examples of suitable tackifiers may be selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, and hydrogenated rosin esters. In some embodiments the tackifier may be hydrogenated.

In other embodiments, the tackifier may be non-polar, meaning that the tackifier is substantially free of monomers having polar groups. Preferably, the polar groups are not present, however if they are present, they are preferably not present at more that 5 wt %, preferably not more that 2 wt %, even more preferably no more than 0.5 wt %. In some embodiments the tackifier may have a Ring and Ball softening point, as measured by ASTM E-28 of 80° C. to 150° C., preferably 100° C. to 130° C. In another embodiment the resins is liquid and has a Ring and Ball softening point of between 10 and 70° C.

The tackifier may comprise about 1 to about 80 wt %, based upon the weight of the adhesive composition, more preferably 2 to 40 wt %, even more preferably 3 to 30 wt %.

Preferred additives include hydrocarbon resins used as tackifiers or modifiers which include:

1. Resins such as C5/C6 terpene resins, styrene terpenes, alpha-methyl styrene terpene resins, C9 terpene resins, aromatic modified C5/C6, aromatic modified cyclic resins, aromatic modified dicyclopentadiene based resins or mixtures thereof. Additional preferred resins include those described in WO 91/07472, U.S. Pat. Nos. 5,571, 867, 5,171,793 and 4,078,132. These resins may be obtained from the cationic polymerization of compositions containing one or more of the following monomers: C5 diolefins (such as 1-3 pentadiene, isoprene, and the like); C5 olefins (such as 2-methylbutenes, cyclopentene, and the like); C6 olefins (such as hexene), C9 vinylaromatics (such as styrene, alpha methyl styrene, vinyltoluene, indene, methyl indene, and the like); cyclics (such as dicyclopentadiene, methyldicyclopentadiene, and the like); and or terpenes (such as limonene, carene, thujone, and the like).
2. Resins obtained by the thermal polymerization of dicyclopentadiene, and/or the thermal polymerization of dimers or oligomers of cyclopentadiene and/or methylcyclopentadiene, and/or with vinylaromatics (such as styrene, alpha-methyl styrene, vinyl toluene, indene, methyl indene, and the like).

The resins obtained after polymerization and separation of unreacted materials, can be hydrogenated if desired. Examples of preferred resins for use as additives herein include those described in U.S. Pat. No. 4,078,132; WO 91/07472; U.S. Pat. No. 4,994,516; EP 0 046 344 A; EP 0 082 726 A; and U.S. Pat. No. 5,171,793.

Crosslinking Agents

In another embodiment the additive may further comprises a crosslinking agent. Preferred crosslinking agents include those having functional groups that can react with the functional group present on the a-srPP-g-FG, for example, the anhydride group present on the amorphous syndiotactic rich polypropylene grafted with maleic anhydride (e.g., a-srPPr-g-MA). Preferred crosslinking agents include alcohols, multiols, amines, diamines and/or triamines. Particular examples of crosslinking agents useful in this invention include polyamines such as ethylenediamine, diethylenetriamine, hexamethylenediamine, diethylaniinopropylamine, and/or menthanediamine.

Antioxidants

In another embodiment, the additive may comprise one or more phenolic antioxidants. Preferred examples of phenolic antioxidants include substituted phenols such as 2,6-di-t-butylphenol in which a hydrogen atom at 2 and/or 6 position is substituted by an alkyl residue. Typical examples of the phenolic antioxidant include 2,6-di-t-butyl-p-cresol, 2,4,6-tri-t-butylphenol, vitamin E, 2-t-butyl-6-(3'-t-butyl-5'-methyl-2'-hydroxybenzyl)-4-methylphenyl acrylate, 2,2'-methylene-bis(4-methyl-6-t-butylphenyl), 2,2'-methylene-bis(4-ethyl-6-t-butyl-phenol), 2,2'-methylene-bis(6-cyclohexyl-4-methylphenol), 1,6-hexanediol-bis([3-(3,5-di-t-butyl[4-hydroxyphenyl])propionate, and pentaerythrityl-tetrakis-[3-(3,5-di-t-butyl-4-hydroxyphenyl)]propionate. Preferred antioxidants include phenolic antioxidants, such as Irganox 1010, Irganox, 1076 both available from Ciba-Geigy.

Neutralizing Agents/Nucleating Agents

The additive of the present invention may also include a neutralizing agent such as calcium stearate, magnesium hydroxide, aluminum hydroxide or hydrotalcite, and/or a nucleating agent such as a salt of benzoic acid, sodium-2,2'-methylene-bis(4,6-di-t-butylphenyl) phosphate and benzyl sorbitol, and the like.

Fillers

In another embodiment, the additive may comprise fillers. Suitable fillers include titanium dioxide, calcium carbonate, barium sulfate, silica, silicon dioxide, carbon black, sand, glass beads, mineral aggregates, talc, clay, and the like.

Additional embodiments contemplated include a nanoclay, also referred to herein as a nanocomposite, comprising organo-clay, and the polyolefin of the present invention, preferably the polyolefin comprising stabilization functionality, preferably the stabilization functionality being covalent.

The organo-clay may comprise one or more of ammonium, primary alkylammonium, secondary alkylammonium, tertiary alkylammonium, quaternary alkylammonium, phosphonium derivatives of aliphatic, aromatic or arylaliphatic amines, phosphines or sulfides or sulfonium derivatives of aliphatic, aromatic or arylaliphatic amines, phosphines or sulfides.

The organo-clay may be selected from one or more of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite and/or florine mica.

The organo-clay is preferably present in the nanocomposite at from 0.1 to 50 wt %, based on the total weight of the nanocomposite. The stabilization functionality may be selected from one or more of phenols, ketones, hindered amines, substituted phenols, substituted ketones, substituted hindered amines, and combinations thereof.

The nanocomposite may further comprise at least one elastomeric ethylene-propylene copolymer. The at least one elastomeric ethylene-propylene copolymer may be present in the nanocomposite from 1 to 70 wt %, based on the total weight of the nanocomposite. The nanocomposite may further comprise at least one non-functionalized thermoplastic polyolefin.

Preferably, the stabilization functionality is present in the at least one stabilization functionalized thermoplastic, and the organo-clay is present in the nanocomposite, each in an effective amount such that the heat aged failure of a molded sample of the nanocomposite by 10% when compared to a reference nanocomposite made with a thermoplastic polyolefin containing functionality substantially free of covalently-bonded stabilization functionality. In an embodiment, the stabilization functionality may be present in the at least one stabilization functionalized thermoplastic polyolefin from 0.01 to 15 wt % based on the total weight of the at least one stabilization functionalized thermoplastic.

The non-functionalized thermoplastic polyolefin is preferably miscible with the at least one first stabilization functionalized thermoplastic polyolefin. In such an embodiment, the at least one non-functionalized thermoplastic polyolefin may also be present in the nanocomposite from 1 to 40 wt %, based on the total weight of the nanocomposite, and the organo-clay may be present in the nanocomposite from 0.5 to 40 wt %, based on the total weight of the nanocomposite. Preferably, both the at least one first stabilization functionalized thermoplastic polyolefin and the at least one non-functionalized thermoplastic polyolefin each comprise one of polypropylene or polyethylene.

In another embodiment, a nanocomposite suitable for use in the adhesive of the present invention may comprise:

a) at least one first non-functionalized polypropylene present in the nanocomposite from 10 to 98 wt %, based on the total weight of the nanocomposite;

b) at least one second polypropylene comprising stabilization functionality, the stabilization functionality selected from one or more of phenols, ketones, hindered amines, substituted phenols, substituted ketones, substituted hindered amines, or combinations thereof, and the stabilization functionality present in the stabilization functionalized polypropylene from 0.05 to 15 wt %, based on the total weight of the of the polypropylene comprising stabilization functionality, the at least one second polypropylene comprising stabilization functionality present in the nanocomposite from 10 to 90 wt. %, based on the total weight of the nanocomposite;

c) an organo-clay wherein the organo-clay comprises one or more of hexyl ammonium ion, octyl ammonium ion, 2-ethylhexyl ammonium ion, dodecyl ammonium ion, octadecyl ammonium ion, dioctyl dimethyl ammonium ion, trioctyl ammonium ion, distearyl ammonium ion, ammonium salt, pyridinium salt, sulfonium salt, phosphonium salt, or combinations thereof, wherein the organo-clay further comprising a clay selected from one or more of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite or florine mica, and wherein the organo-clay is present in the nanocomposite from 1 to 30 weight %, based on the total weight of the nanocomposite; and d) optionally further comprising one or more of an ethylene-propylene elastomeric copolymer or an isobutylene rubber present in the nanocomposite at 2 to 70 wt %, based on the total weight of the nanocomposite.

Adhesion Promoters

In another embodiment the additive may comprise one or more adhesion promoters including polar acids, polyaminoamides (such as Versamid 115, 125, 140, available from Henkel), urethanes (such as isocyanate/hydroxy terminated polyester systems, e.g. bonding agent TN/Mondur Cb-75 from Miles, Inc.), coupling agents, (such as silane esters (Z-6020 from Dow Corning)), titanate esters (such as Kr-44 available from Kenrich), reactive acrylate monomers (such as sarbox SB-600 from Sartomer), metal acid salts (such as Saret 633 from Sartomer), polyphenylene oxide, oxidized polyolefins, acid modified polyolefins, and anhydride modified polyolefins.

Oils

Preferred oils include aliphatic napthenic oils, white oils, and the like. Particularly preferred oils include paraffinic or napthenic oils such as Primol 352, or Primol 876 available from ExxonMobil Chemical France, S.A. in Paris, France.

Plasticizers

Preferred plasticizers include mineral oils, polybutenes, phthalates and the like. Preferred plasticizers include phthalates such as di-iso-undecyl phthalate (DIUP), di-iso-nonylphthalate (DINP), dioctylphthalates (DOP) combinations thereof, and/or derivatives thereof, and/or the like.

Particularly preferred plasticizers include polybutenes, such as Parapol 950 and Parapol 1300 formerly available from ExxonMobil Chemical Company in Houston Tex.

Preferred plasticizers also include polyalphaolefins (PAO's), high purity hydrocarbon fluid compositions (HPFC's) and Group III basestocks such as those described in WO 2004/014998 at page 16, line 14 to page 24, line 1. Particularly preferred PAO's include oligomers of decene and co-oligomers of decene and dodecene. Preferred PAO's are available under the trade name Supersyn from ExxonMobil Chemical Company in Houston Tex. In a preferred embodiment, the PAO, HPFC or Group III base stock is present at from 0.5 to 60 weight %, based upon the weight of the polymer and the PAO, HPFC or Group III base stock.

Waxes

Preferred waxes include polar or non-polar waxes, polypropylene waxes, polyethylene waxes, and wax modifiers. Particularly preferred waxes may be selected from the group consisting of: polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, amorphous waxes, carnauba waxes, castor oil waxes, microcrystalline waxes, beeswax, carnauba wax, castor wax, spermaceti wax, vegetable wax, candelilla wax, japan wax, ouricury wax, douglas-fir bark wax, rice-bran wax, jojoba wax, bayberry wax, montan wax, peat wax, ozokerite wax, ear wax, ceresin wax, petroleum wax, paraffin wax, polyethylene wax, chemically modified hydrocarbon wax, substituted amide wax, and combinations and derivatives thereof. In some embodiments, the polar and non-polar waxes may be used together in the same composition.

Low Molecular Weight Polymers

Other additives include low molecular weight polymers (i.e., low Mn polymer, where low means below Mn of 5000, preferably below 4000, more preferably below 3000, even more preferably below 2500). Preferred low Mn polymers include polymers of lower alpha olefins such as propylene, butene, pentene, hexene and the like (e.g., a poly alpha olefin comprising propylene, butene, pentene, and/or hexene, having a number average molecular weight below 5000 g/mole). A particularly preferred polymer includes polybutene having an Mn of less than 1000. An example of such a polymer is available under the trade name PARAPOL™ 950 from ExxonMobil Chemical Company. PARAPOL™ 950 is a liquid polybutene polymer having an Mn of about 950 and a kinematic viscosity of 220 centi-Stokes (cSt) at 100° C., as measured by ASTM D 445.

Ester Polymers

In another embodiment the additive may comprise one or more ester polymers (polyesters). In a preferred embodiment the additive comprises a blend of two (or more) phase system, where the polyester is a discontinuous phase and the phase comprising the a-srPP-g-FG is the continuous phase.

Other Additives

Other preferred additives include block, antiblock, pigments, dyes, dyestuffs, processing aids, UV stabilizers, lubricants such as polydimethylsiloxane and calcium sterate, adjuvants, surfactants, color masterbatches, flow improvers, crystallization aids, plasticizers, oils, stabilizers, antioxidants, polymeric additives, defoamers, preservatives, thickeners, rheology modifiers, humectants, fillers, water, and the like.

Polymeric additives may include homo poly-alpha-olefins, copolymers of alpha-olefins, copolymers and terpolymers of diolefins, elastomers, polyesters, block copolymers, ester polymers, acrylate polymers, alkyl acrylate polymers and vinyl acetate polymers.

Adhesive Composition

The adhesive composition (e.g., the polymer blend) of the present invention may comprise one or more amorphous syndiotactic rich polyolefins, and/or one or more functionalized syndiotactic rich polyolefins as defined above. In a preferred embodiment, the adhesive of the present invention comprises an amorphous syndiotactic rich polyolefin, an amorphous syndiotactic rich polyolefin that has been functionalized with a functional group, or a combination thereof, wherein the amorphous syndiotactic rich polyolefin comprises: greater than about 50 wt % C3-C40 alpha olefins; about 50% to less than about 80% r dyads, based on the total number of r and m dyads present in the polymer; a heat of fusion of 10 joules/g or less according to the procedure described in ASTM E 794-85; and an ash content of 1 wt % or less, and wherein the fuinctional group, when present, comprises a compound having a weight average molecular weight of 1000 or less, and a carbon-carbon double bond, a carbon-carbon triple bond, and/or a heteroatom; the adhesive having a peel strength to a non-polar substrate of greater than about 3.5 lb/in, and a peel strength to a polar substrate of greater than about 0.5 lb/in, wherein peel strength is measured according to a modified ASTM D-1876, as described herein.

In addition, the adhesive composition of the present invention may include one or more additives as defined above, which have been combined in a weight to weight ratio of polyolefin to additive of about 1:1000 to 1000:1. Preferably the weight to weight ratio may be about 1:100, about 1:50, about 1:20, about 1:10, about 1:5, about 1:4, about 1:3, about 1:2, or about 1:1. Alternately, the weight to weight ratio may be about 100:1, about 50:1, about 20:1, about 10:1, about 5:1, about 4:1, about 3:1, or about 2:1.

The adhesive composition (e.g., the polymer blend) of the present invention may comprise one or more amorphous syndiotactic rich polyolefins, and/or one or more functionalized syndiotactic rich polyolefins. In addition, the adhesive composition of the present invention may include one or more additives as defined above, which have been combined such that the polymer blend comprises 10 to 90 wt % additive, based upon the weight of the polymer blend. Preferably, the polymer blend comprises from 20 to 80 wt % additive, more preferably from 30 to 80 wt % additive, more preferably from 40 to 80 wt % additive, still more preferably from 50 to 80 wt % additive, more preferably from 60 to 80 wt % additive, still more preferably from 70 to 80 wt % additive, based upon the weight of the polymer blend.

In the process utilized for producing the adhesive composition of the present invention, no particular restriction need be put on a mixing manner. Accordingly, the raw materials may be mixed uniformly by means of a Henschel mixer or the like and then may be melted, mixed and molded into pellets by an extruder or the like. It is also possible to utilize a Brabender mixer by which mixing and melting are carried out simultaneously, and after the melting, the material can be directly molded into films, sheets, or the like. Thus, the blends described herein may be formed using conventional techniques known in the art such that blending may be accomplished using one or more static mixers, in-line mixers, elbows, orifices, baffles, or any combination thereof.

In a preferred embodiment, the adhesive composition comprises a blend which includes amorphous syndiotactic rich polyolefin present at about 1 to about 99 wt %, based upon the total weight of the blend, more preferably the amorphous syndiotactic rich polyolefin is present at greater than about 5 wt %, preferably greater than about 10 wt %, preferably greater than about 20 wt %, preferably greater than about 30 wt %, preferably greater than about 40 wt %, preferably greater than about 50 wt %, preferably greater than about 60 wt %, preferably greater than about 70 wt %, preferably greater than about 80 wt %, preferably greater than about 90 wt %, based on the total weight of the adhesive composition.

In a preferred embodiment, the adhesive composition comprises a blend which includes functionalized amorphous syndiotactic rich polyolefin present at about 1 to about 99 wt %, based upon the total weight of the blend, more preferably the amorphous syndiotactic rich polyolefin is present at greater than about 5 wt %, preferably greater than about 10 wt %, preferably greater than about 20 wt %, preferably greater than about 30 wt %, preferably greater than about 40 wt %, preferably greater than about 50 wt %, preferably greater than about 60 wt %, preferably greater than about 70 wt %, preferably greater than about 80 wt %, preferably greater than about 90 wt %, based on the total weight of the adhesive composition.

In a preferred embodiment, the adhesive composition comprises a blend which includes amorphous syndiotactic rich polypropylene at about 1 to about 99 wt %, based upon the total weight of the blend, more preferably the amorphous syndiotactic rich polyolefin is present at greater than about 5 wt %, preferably greater than about 10 wt %, preferably greater than about 20 wt %, preferably greater than about 30 wt %, preferably greater than about 40 wt %, preferably greater than about 50 wt %, preferably greater than about 60 wt %, preferably greater than about 70 wt %, preferably greater than about 80 wt %, preferably greater than about 90 wt %, based on the total weight of the adhesive composition.

In a preferred embodiment, the adhesive composition comprises a blend which includes amorphous syndiotactic rich polypropylene functionalized with maleic anhydride, which is present at about 1 to about 99 wt %, based upon the total weight of the blend, more preferably the amorphous syndiotactic rich polyolefin is present at greater than about 5 wt %, preferably greater than about 10 wt %, preferably greater than about 20 wt %, preferably greater than about 30 wt %, preferably greater than about 40 wt %, preferably greater than about 50 wt %, preferably greater than about 60 wt %, preferably greater than about 70 wt %, preferably greater than about 80 wt %, preferably greater than about 90 wt %, based on the total weight of the adhesive composition.

In an embodiment the adhesive composition comprises less than 3 wt % anti-oxidant, less than 3 wt % of a low viscosity flow improver, less than 10 wt % wax, and/or less than 3 wt % of a crystallization aid. In some embodiments, however, wax may not be desired and may be present at less than 5 wt %, preferably less than 3 wt %, more preferably less than 1 wt %, more preferably less than 0.5 wt %, based upon the weight of the adhesive composition.

In another embodiment the adhesive composition of this invention comprise amorphous syndiotactic rich polypropylene, and less than 50 wt % total of any combination of the additives described above, preferably less than 25 weight %, preferably less than 20 wt %, preferably less than 15 wt %, preferably less than 10 weight %, preferably less than 5 weight %, based upon the weight of the adhesive composition.

In another embodiment the adhesive composition of this invention comprise amorphous syndiotactic rich polypropylene functionalized with maleic anhydride, and less than 50 wt % total of any combination of the additives described above, preferably less than 25 weight %, preferably less than 20 wt %, preferably less than 15 wt %, preferably less than 10 weight %, preferably less than 5 weight %, based upon the weight of the adhesive composition.

Properties of the Adhesive Composition

The adhesive composition of the present invention preferably has a peel strength, to a non-polar substrate (e.g., isotactic polypropylene) of greater than about 3.5 lb/in as measured according to a modified ASTM D-1876. Preferably, the peel strength to a polar substrate (e.g., Mylar) is greater than about 0.5 lb/in, with greater than about 1.0 lb/in being more preferred.

As demonstrated by fiber tear examples herein, the adhesive composition of the present invention provides excellent adhesion properties to cellulose and other similar materials. The adhesive composition of the present invention preferably has a set time of less than about 10 minutes, with less than about 1 minute being more preferred, with less than about 30 seconds being still more preferred. Set time is defined for use herein as the time it takes for a compressed adhesive substrate construct to fasten together with enough adhesion so as to give substrate fiber tear when pulled apart, and thus the bond is sufficiently strong to remove the compression. The bond will likely still strengthen upon further cooling, however, it no longer requires compression. These set times were measured by placing a molten dot of adhesive on to a file folder substrate taped to a flat table. A file folder tab (1 inch by 3 inch (2.5 cm×7.6 cm)) was placed upon the dot 3 seconds later and compressed with a 500 gram weight. The weight was allowed to sit for about 0.5 to about 10 seconds. The construct thus formed was pulled apart to check for a bonding level sufficient to produce substrate fiber tear. The set time was recorded as the minimum time required for this bonding to occur. Standards of commercially available adhesives were used to calibrate this process.

The adhesive composition of the present invention preferably has a percent substrate fiber tear of from 75% to 100% at 25° C. Adhesive test specimens were created by bonding the substrates together with a portion (e.g., a dot) of molten adhesive and compressing the bond with a 500-gram weight until cooled to room temperature (i.e., about 25° C.). The dot size was controlled by the adhesive volume such that in most cases the compressed disk which formed gave a uniform circle just inside the dimensions of the substrates. Once a construct has been produced, it was be subjected to various insults in order to assess the effectiveness of the bond. For low temperature fiber tear test, the bond specimens were placed in a freezer or refrigerator to obtain the desired test temperature. For substrate fiber tear at room temperature, the specimens were aged at ambient conditions. The bonds were separated by hand and a determination made as to the type of failure observed. The amount of substrate fiber tear is expressed herein as a percentage.

Use of the Adhesive Composition

For any of the above described adhesive compositions, the final properties and the suitability for a particular applications depends on the type of tacticity, (stereoregularity), the melting point, the average molecular weight, the molecular weight distribution, the type and level of monomer and comonomer, the sequence distribution, the presence or absence of any additional functionality, and the type and quantity of adhesion additives utilized therein.

The adhesive composition of this invention can be used in any adhesive application, including but not limited to, disposables, packaging, laminates, pressure sensitive adhesives, tapes, labels, wood binding, paper binding, non-wovens, road marking, reflective coatings, and the like.

Disposables

In a preferred embodiment the adhesive composition of this invention can be used for disposable diaper and napkin chassis construction, elastic attachment in disposable goods converting, packaging, labeling, bookbinding, woodworking, and other assembly applications. Particularly preferred applications include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkin adhesive strip, industrial filtration bonding, industrial filter material lamination, filter mask lamination, surgical gown lamination, surgical drape lamination, and perishable products packaging.

In an embodiment, the adhesive composition of the present invention may be applied to at least a portion of one or more disposable elements including nonwoven fabrics, non-woven webs, non-elastic nonwoven fabrics, elastic nonwoven fabrics, necked-bonded laminates, stretch-bonded laminates, spunbond-meltblown-spunbond laminates, polypropylene spunbonded layers, polyethylene layers, combination polyethylene and polypropylene spunbonded layers, elastic strands, styrene-isoprene-styrene, styrene-butadiene-styrene, styrene-ethylene/propylene-styrene, styrene-co-butadiene-styrene, polyurethane, woven fabrics, polypropylene, polyester, body fluid impermeable backsheets, body fluid impermeable layers, body fluid permeable layers, body fluid permeable covers, absorbents, tissues, elastomeric materials, superabsorbent polymers, polyolefin films, polyester films, polyvinylchloride films, polyvinylidine chloride films, polyvinyl acetate films, elastic attachment tape, frontal tape backing, wood, paper, barrier films, film laminates, nonwoven composites, textile materials, woven materials, durable fabrics, absorbents, elastomeric strands, elastomeric webs, tissues, films, coverstock materials, nonwoven polyethylene, perforated polyethylene, superabsorbent polymers, filaments, porous webs, fibers, loop fastener material, spunbonded nonwoven articles, liners, elastic side panels, fastening tape, elastic bands, rayon, nylon, cellulosic pulp, cellulosic fluff, and superabsorbent batts.

Further, a disposable article consistent with the present invention may comprise the inventive adhesive composition disclosed herein, wherein the adhesive is applied to at least a portion of one or more disposable elements including diapers, training pants, sanitary napkins, panty liners, incontinent wear, bed pads, surgical gowns, surgical drapes, rodent traps, hook and loop fasteners, garments, medical garments, and swimwear. Likewise, a disposable article may include a first element of the disposable article adhered to a second element of the disposable article by the adhesive composition of the present invention.

In an embodiment, the adhesive composition of the present invention may include one or more solvents selected from the group consisting of hexane, heptane, mineral spirits, xylene, toluene, benzene, chlorinated hydrocarbons, and combinations or derivatives thereof.

In an embodiment, a disposable article comprising the adhesive composition of the present invention may further comprise one or more antioxidants including tris(di-t-butyl-p-hydroxybenzyl)-trimethylbenzene, alkylated bisphenol, zinc dibutyl dithiocarbamate, 4,4'-methylene bis(2,6-di-tert-butylphenol), tetrakis[methylene(3,5-di-tert-butyl-4-hydroxyhydrocinnamate)methane], lauryl stearyl thiodipropionate, dilauryl 3,3'-thiodipropionate, 2,6-di-tert-butyl-p-cresol, and combinations or derivatives thereof.

A disposable article comprising the adhesive composition of the present invention may further comprises one or more stabilizers including hindered phenols, sulfur phenols, phosphorous-containing phenols, 1,3,5-trimethyl-2,4,6-tris(3-5-di-tert-butyl-4-hydroxybenzyl) benzene, pentaerythritol tetrakis-3(3,5-di-tert-butyl-4-hydroxyphenyl) propionate, n-octadecyl-3(3,5-di-tert-butyl-4-hydroxyphenyl) propionate, 4,4'-methylenebis(4-methyl-6-tert butylphenol), 4,4'-thiobis(6-tert-butyl-o-cresol), 2,6-di-tert-butylphenol, 6-(4-hydroxyphenoxy)-2,4-bis(n-ocytlthio)-1,3,5-triazine, 2,4,6-tris(4-hydroxy-3,5-di-tert-butyl-phenoxy)-1,3,5-triazine, di-n-octadecyl-3,5-di-tert-butyl-4-hydroxybenzylphosphonate, 2-(n-octylthio)ethyl-3,5-di-tert-butyl-4-hydroxybenzoate, sorbitol hexa-(3,3,5-di-tert-butyl-4-hydroxy-phenyl) propionate, and combinations or derivatives thereof. In a preferred embodiment, a disposable article comprising the adhesive composition of the present invention is a consumer good.

Laminates

In an embodiment, a laminate article comprising two or more layers may be in combination with the adhesive composition of the present invention. A laminate article may comprise two or more layers in combination with the adhesive composition of the present invention, wherein the adhesive composition is present between the layers. In an embodiment, a laminate article comprising two or more layers in combination with the adhesive composition of the present invention may comprise one or more materials including wood, plastic, paper, rubber, thermoplastic, cardboard, metal, metal foil, metallized surfaces, cloth, non-wovens, spun-bonded fibers, stone, plaster, glass, rock, ceramics, films, and foams.

Further, a laminate article comprising two or more layers in combination with the adhesive composition of the present invention, may include a laminate wherein each of the layers are individually selected from wood, plastic, paper, rubber, thermoplastic, cardboard, metal, metal foil, metallized surfaces, cloth, non-wovens, spunbonded fibers, stone, plaster, glass, rock, ceramics, films, and foams.

A laminate article comprising two or more layers in combination with the adhesive composition of the present invention wherein the two or more layers comprise a first layer and a second layer, the second layer may be formed from a material that is different than a material of the first layer.

In an embodiment, a laminate article comprising two or more layers in combination with the adhesive composition of the present invention may further comprise a releasing paper or releasing agent present on a surface layer. A laminate article comprising two or more layers in combination with the adhesive composition of the present invention may also include a laminate structure produced by any one of spraying, extrusion molding, fusion bonding, injecting the polymer, and hot-melt adhesion techniques.

In an embodiment, a laminate article comprising two or more layers in combination with the adhesive composition of the present invention may further comprise at least one of layer comprising a combination of the adhesive composition of the present invention, and one or more materials such as wood, plastic, paper, rubber, thermoplastic, cardboard, metal, metal foil, metallized surfaces, cloth, non-wovens, spun-bonded fibers, stone, plaster, glass, rock, ceramics, films, and foams.

In a preferred embodiment, a laminate article may comprise two or more layers in combination with the adhesive composition of the present invention, wherein the adhesive composition has an open time of 60 seconds or less, wherein open time is determined according to ASTM D 4497. In a preferred embodiment the adhesive composition of the present invention, when used in a laminate article comprising two or more layers in may have a set time of 3 seconds or more, when determined by one of skill in the art.

In a preferred embodiment, a laminate article comprising two or more layers in combination with the adhesive composition of the present invention, may include the adhesive having a percent substrate fiber tear of from 75% to 100% at 22° C., when determined according to the methods described herein. In a preferred embodiment, a laminate article comprising two or more layers in combination with the adhesive composition of the present invention is a consumer good.

The adhesive compositions described above may also be applied as a laminate to any substrate, including polar substrates (e.g., cardboard, Mylar (polyester)), non-polar substrates (e.g. iPP), or both (e.g., between) polar substrates and non-polar substrates. Preferred substrates include wood, paper, cardboard, plastic, thermoplastic, rubber, metal, metal foil (such as aluminum foil and tin foil), metallized surfaces, cloth, non-wovens (particularly polypropylene spun bonded fibers or non-wovens), spunbonded fibers, cardboard, stone, plaster, glass (including silicon oxide (SiOx) coatings applied by evaporating silicon oxide onto a film surface), foam, rock, ceramics, films, polymer foams (such as polyurethane foam), substrates coated with inks, dyes, pigments, PVDC and the like or combinations thereof. Additional preferred substrates include polyethylene, polypropylene, polyacrylates, acrylics, polyethylene terephthalate, or any of the polymers listed above as suitable for blends.

Any of the above substrates, and/or the adhesive composition of this invention, may be corona discharge treated, flame treated, electron beam irradiated, gamma irradiated, microwaved, or silanized before or after the substrate and the adhesive composition are combined.

The adhesive composition of the present invention or formulations thereof may be applied directly to a substrate and/or may be sprayed or otherwise disposed thereon. The composition may be molten, or heated to a semisolid state prior to, or during application. Spraying is defined to include atomizing, such as producing an even dot pattern, spiral spraying such as Nordson Controlled Fiberization or oscillating a stretched filament may be done in the ITW Dynafiber/Omega heads or Summit technology from Nordson. The adhesive composition of may also be melt blown. Melt blown techniques are defined to include the methods described in U.S. Pat. No. 5,145,689 or any process where air streams are used to break up filaments of the extrudate and then used to deposit the broken filaments on a substrate. In general, melt blown techniques are processes that use air to spin hot melt adhesive fibers and convey them onto a substrate for bonding. Fibers sizes can easily be controlled from 20-200 microns by changing the melt to air ratio. Few, preferably no, stray fibers are generated due to the inherent stability of adhesive melt blown applicators. Under UV light the bonding appears as a regular, smooth, stretched dot pattern. Atomization may also be defined as a process that uses air to atomize hot melt adhesive into very small dots and convey them onto a substrate for bonding.

Non Wovens/Fibers

In a particular embodiment, the adhesives of this invention can be used in fiber products. Fiber products consist of fibrous materials having an adhesive composition applied thereto. The fibrous material can include a single-component fiber, a multi-component fiber, or a combination thereof. Several types of fibrous materials can be used to form fiber products and are generally distinguished based on fiber organization within the fiber product. For example, one type of fibrous material is an isotropic assembly in which individual fibers are arranged in a completely random fashion with no preferred orientation in any of the three principal spatial axes. Another example of fibrous materials is textile yarns, having a high degree of fiber orientation with respect to the principal axis of the material. Textile yarns are produced from staple (finite length) fibers by a combination of processing steps referred to collectively as yarn spinning. After preliminary fiber alignment, the fibers are locked together by twisting the structure to form the spun yarn, which is continuous in length and substantially uniform. Yarns are typically used in the formation of textile fabrics, either by weaving or knitting.

The fibrous materials can include cotton, kapok, coir, flax, hemp, ramie, jute, sisal, abaca, cellulose, wool, mohair, cashmere, human hair, common goat hair, camel hair, llama hair, alpaca hair, vicun wool, silk, nylon, aramid, Kevlar, nomax, polyamides, polyacrylates, polyolefin polymers, such as propylene, butene-1, polyethylene, polypropylene, and ethylene-vinyl acetate, polyester, such as polyethylene terephthalate, polybutylene terephthalate, polyethylene terephthalate, and poly-ethyleneoxybenzonate, asbestos, polyamides, polycarbonate, polystyrene, thermoplastic elastomers, flouropolymers, vinyl polymers, minerals, acrylics, polyvinylchloride, organic binders, glass, metal, alumina, silicon carbide, boron nitride, boron carbide, and combinations thereof.

Exemplary fiber products include nonwovens, carpet, carpet backing, diapers, swimwear, child training pants, adult incontinence garments, feminine care products, medical garments, bed pads, surgical drapes, cloth linings, scrubbing pads, automotive interior parts, garments, tapes, face masks and respirators, air filters, vacuum bags, oil and chemical spill sorbents, thermal insulation, first aid dressings, medical wraps, fiberfill, outerwear, bed quilt stuffing, furniture padding, filter media, scrubbing pads, wipe materials, and combinations thereof.

In a preferred embodiment, a carpet comprises the adhesive composition of the present invention. In another preferred embodiment, a tape comprises the adhesive composition of the present invention.

As used herein, "nonwoven" refers to a textile material that has been produced by means other than weaving. In nonwoven fabrics, the fibers are processed directly into a planar sheetlike fabric structure by passing the intermediate one-dimensional yarn state, and then are either bonded chemically or interlocked mechanically (or both) to achieve a cohesive fabric. The nonwoven article may include natural or synthetic fibers or mixtures thereof. Materials commonly used in forming nonwoven articles include rayon, polyester, polypropylene, polyethylene, nylon, and others. The individual fibers are usually staple fibers or continuous filaments. Exemplary fibers may include polypropylene fibers, rayon fibers, polyester fibers, polyethylene fibers, nylon fibers, cellulose fibers, viscose fibers, ethylene-propylene copolymer fibers, polyolefin fibers, polyamide fibers, polycarbonate fibers, polystyrene fibers, thermoplastic elastomer fibers, fluoropolymer fibers, vinyl polymer fibers, carbon fibers, glass fibers, mineral fibers, wool fibers, acrylic fibers, polyvinylchloride fibers, polyurethane fibers, organic binder fibers, and combinations thereof.

In an embodiment a fiber product comprising one or more fibrous materials in combination with the adhesive composition of the present invention may comprise a primary backing material, wherein the fibrous materials are attached to the primary backing material and the adhesive is disposed on at least a portion of the fibrous materials. A fiber product may also comprise or more fibrous materials in combination with the adhesive composition of the present invention, and include a primary backing material and a second backing material adhered to the adhesive.

A fiber product may also comprise one or more fibrous materials in combination with the adhesive composition of the present invention, wherein a primary backing material is woven jute, woven slit polypropylene film, burlap, needle punched materials, non-woven polypropylene, and combinations thereof.

In an embodiment, a fiber product comprising one or more fibrous materials in combination with the adhesive composition of the present invention may include a fibrous material having a cross-sectional shape that is circular, elliptic, T-shaped, Y-shaped, +-shaped, hollow, square, multilobal, ribbon, and/or polygonal.

Accordingly, a fiber product comprising one or more fibrous materials in combination with the adhesive composition of the present invention may include clothing, rugs, insulation, carpet, composite materials, printed circuitboard prepegs, wigs, or combinations thereof.

Furthermore, in an embodiment wherein a fiber product comprises one or more fibrous materials in combination with the adhesive composition of the present invention the adhesive composition may further include one or more additives such as surfactants, foaming agents, polymer compatibilizers, fire retardants and water.

In a preferred embodiment, a fiber product comprising one or more fibrous materials in combination with the adhesive composition of the present invention, may include anyone of the above described adhesive compositions having a percent substrate fiber tear from 75% to 100% at 22° C. In a preferred embodiment, a fiber product comprising one or more fibrous materials in combination with the adhesive composition of the present invention is a consumer good.

Films

In a particular embodiment, the polymer components described herein can be used in a monolayer film. Alternatively, the polymer components can be applied to at least an outer portion of a monolayer film. Monolayer films are planar forms which are thick enough to be self-supporting but thin enough to be flexed, folded, or creased without cracking. The thickness of the film depends on the application and manufacturing, but is generally 125 μm or less. The monolayer film, which may be unoriented, uniaxially oriented, or biaxially oriented, is formed from applying a polymer component to at least a portion of a film substrate. Alternatively, the polymer component may be blended with a film substrate to alter the properties thereof.

The film substrate may include paper, foil, metal, metal alloys, polyethylene, polypropylene, polyester, polyethylene terephthalate, polyvinyl chloride, polyvinylidine chloride, polyvinyl acetate, polyamides, homo polymers thereof, and combinations and copolymers thereof.

The monolayer film may further include additional polymer components selected from polyethylene, polypropylene, polyester, polyethylene terephthalate, polyvinyl chloride, polyvinylidine chloride, polyvinyl acetate, polyamides, homo polymers thereof, combinations and copolymers thereof.

In an embodiment, a film comprising the adhesive composition of the present invention preferably comprises a layer of polypropylene and/or a layer of oriented polypropylene, and/or a layer of biaxially oriented polypropylene.

Hot Melt Adhesives

In a particular embodiment, the adhesives of this invention can be used in a hot melt adhesive composition. Hot melt adhesives exist as a solid at ambient temperature and can be converted into a tacky liquid by the application of heat. Hot melt adhesives are typically applied to a substrate in molten form.

In an embodiment, a hot melt adhesive composition comprising the adhesive composition of the present invention may include an adhesive composition having a percent substrate fiber tear of from 75% to 100% at 25° C., preferably a percent substrate fiber tear of from 95% to 100% at 25° C. In a preferred embodiment, the hot melt adhesive composition comprising the adhesive composition of the present invention is a consumer good.

Pressure Sensitive Adhesives

In a particular embodiment, the adhesive compositions described herein can be used in pressure sensitive adhesive compositions. As used herein, "pressure sensitive adhesive compositions" are adhesive compositions that have the ability at, or at about, room temperature (about 25° C.) to sufficiently wet a substrate under gentle pressure and to form a useful bond. As used here, the term "useful bond" differs depending on the substrate application and refers to a corresponding balance of adhesive and cohesive strength. In an embodiment, a pressure sensitive adhesive comprising the adhesive composition of the present invention may have a set time of 30 minutes or less.

Tapes

In a particular embodiment, the adhesives of this invention can be used in tapes. Tapes are generally configured to adhere two or more substrates together. Tapes include an adhesive composition applied to a backing element. The backing element can be selected from the group including polymeric films, polyester films, polyolefin-based films, polyurethane films, polyvinylchloride foams, polyethylene foams, nonwoven polyurethane, nonwoven polyester, fabric, face stock, paper, synthetic polymeric material, plastic, polyolefin polymers, such as polyethylene and polypropylene, polyester, polyethylene terphthalate, polyvinyl chloride, kraft paper, polymers, laminates, latex saturated papers, foil, litho stock, lightweight stock, styrene foam, expanded polystyrene foam, woven fabric, non-woven fabric, cloth, crepe paper, thermoplastic elastomers, and combinations thereof. A typical backing element has a variable thickness within a range of 1 micron to several centimeters. Particularly preferred backing elements include oriented polypropylene, biaxially oriented polypropylene and polyvinylchloride polymers. Films of oriented polypropylene, biaxially oriented polypropylene and polyvinylchloride polymers are particularly preferred backing elements.

The tapes can be either single or double-sided, i.e., the adhesive material is applied to either one or two opposing sides of the backing material. The tape may include an adhesive composition and a release material applied to opposite sides of a backing element. A double-sided tape may include a first adhesive composition and a second adhesive composition applied to opposite sides of a backing element. At least one of the first adhesive composition or the second adhesive composition include the adhesive composition described herein, e.g., either or both adhesive compositions include the inventive adhesive composition.

Tapes can be configured to adhere a variety of substrates to one another, such as a first substrate to a second substrate, or tapes can be configured to adhere to a single substrate. The first substrate can be the same material as the second substrate, or the substrates can be formed of different materials. Either or both substrates can include plastic, polyolefin polymers, stainless steel, paper, paperboard, containerboard, tagboard, corrugated board, chipboard, kraft paper, cardboard, fiberboard, plastic resin, metal, metal alloys, foil, skin, film, plastic film, laminates, clothing, containers, surgical instruments, medical devices, glass and sheeting.

Tapes can be supplied in the form of rolls, sheets, pads or other shapes determined by the specific use requirements, to protect the adhesive composition adhered to the backing element from unintended adhesion to surfaces other than the intended substrate. For example, the adhesive composition applied to the backing material may be applied to a release material until use. Release materials are generally applied to the tape to retain the adhesive strength of the adhesive composition and are configured to allow release of the tape therefrom. Release materials are generally used when the tape is supplied as a sheet or a roll. The release material typically comprises a release coating, such as silicon. Tapes that are provided in a roll form can be used with a tape dispenser or be torn by hand. Tapes that are provided in pad form can include an adhesive composition between two release liners, at least one release liner being coated with a release coating composition.

The adhesive composition may be applied to at least a portion of at least one side of the backing material. Generally, the adhesive composition has the ability, at or at about room temperature, to sufficiently wet a substrate under gentle pressure to form a useful bond. As used herein, a "useful bond" refers to a balance of adhesive (adhesive to substrate failure) and cohesive (internal adhesive failure) strengths, which is optimized according to the application of the tape. For example, the adhesive composition in removable tapes can have relative a relatively low adhesive strength in comparison to cohesive strength, resulting in a tape that can be removed without leaving a residue (e.g., adhesive) on the substrate. In contrast, high performance tapes, e.g., tapes used for shipping and packaging, can exhibit both high adhesive and cohesive strength, resulting in failure of the substrate or backing element.

Packaging Adhesive

In an embodiment, a packaging adhesive may comprise the adhesive composition of the present invention. A package may also comprise the adhesive composition of the present invention, wherein the adhesive as disclosed herein is applied to at least a portion of one or more packaging elements including paper, paperboard, containerboard, tagboard, corrugated board, chipboard, kraft, cardboard, fiberboard, plastic resin, metal, metal alloys, foil, film, plastic film, laminates, and sheeting.

In an embodiment, the present invention may include a package comprising the adhesive composition as described herein, wherein the adhesive is applied to at least a portion of one or more packaging elements including cartons, containers, crates, cases, corrugated cases, and trays.

A package may also comprise the adhesive composition of the present invention, wherein the adhesive is applied to at least a portion of one or more packaging elements used in packaging of cereal products, cracker products, beer packaging, frozen food products, paper bags, drinking cups, milk cartons, juice cartons, drinking cups, and containers for shipping produce.

Wood Working

In a particular embodiment, the adhesives described herein can be used in woodworking processes. A woodworking process involves forming a woodworking article by applying an adhesive composition to at least a portion of a structural element. The structural element can include a variety of materials, which include, but are not limited to wood or plywood, or plastic or veneer. For example, the structural element can also include lumber, wood, fiberboard, plasterboard, gypsum, wallboard, plywood, PVC, melamine, polyester, impregnated paper and sheetrock. A woodworking process can be used to form indoor furniture, outdoor furniture, trim, molding, doors, sashes, windows, millwork and cabinetry, for example. Accordingly, a preferred embodiment is a wooden consumer article comprising the adhesive composition of the present invention.

Labels

In a particular embodiment, the adhesive compositions described herein can be used in labels. In general, labels are intended to merely adhere themselves to a substrate. As such, labels are not intended to be structural components. As a result, labels may have high internal strength and low adhesive strength.

Labels comprise a layer of an adhesive composition coated on a backing element, which may have a releasable surface on the side opposite the adhesive composition. A release liner of a label is intended to adhere to the label until the label is applied to its intended substrate. Label backing elements are well known in the label art. Any suitable backing element can be utilized in the present invention. Backing elements may include polymeric film, polyester film, polyolefin-based film, polyurethane film, polyvinylchloride foam, polyethylene foam, nonwoven polyurethane, nonwoven polyester, knitted fabric, paper, synthetic polymeric material, plastic, polyolefin, polyethylene, polypropylene, polyester, polyethylene terphthalate, polyvinyl chloride, kraft paper, polymers, laminate, latex saturated paper, foil, litho stock, lightweight stock, styrene foam, laminated foam, expanded polystyrene foam, woven fabric, non-woven fabric, cloth, creped paper, thermoplastic, and mixtures of polyethylene and polypropylene, for example.

Suitable substrates may include plastic, polyolefins, stainless steel, paper, paperboard, containerboard, tagboard, corrugated board, chipboard, kraft paper, cardboard, fiberboard, plastic resin, metal, metal alloys, foil, skin, film, plastic film, laminates, clothing, containers, surgical instruments, medical devices, glass, and sheeting, for example.

Labels may be in the form of rolls, sheets or other shapes determined by the specific use requirements, so that they are protected from unintended adhesion to other surfaces. As described above, labels may be laminated to a release liner to prevent their accidental adhesion to other surfaces. The release liner of the label is supplied with a release coating such as silicone to permit the easy removal of the release liner from the label. Release liners are sheets that are coated with release material for use in labels. The release liner is expected to reproducibly provide an appropriate level of release to the adhesive of interest, to not deleteriously affect the adhesive, and to be resistant to aging so that the release level remains relatively predictable with time.

A label may comprise a backing element, an adhesive composition, and a release liner. The adhesive composition may be applied to the backing element, while the release liner may be applied to the adhesive composition. Alternatively, the adhesive composition may be applied to the release liner, and then the backing element may be applied to the adhesive composition. The release liner may then be removed from the adhesive composition prior to application of the label to a substrate.

Bookbinding

In a particular embodiment, the adhesives of this invention can be used in bookbinding. For purposes of convenience, the word "bookbinding" will be used to describe the process by which books having a binder element, wherein an adhesive composition is applied to at least a portion of the binder element, are produced. However, the embodiments described herein are not limited to adhesive compositions suitable for binding only books. As used herein the term "books" is intended to include other articles containing pages bound with adhesive compositions such as paperback books, soft cover books, instruction manuals, magazines, catalogs, trade journals, directories, and the like.

In an embodiment, a bookbinding article comprising the adhesive composition of the present invention may include a binder element comprises paper or heavy stock paper. In an embodiment, the adhesive of the present invention may have a percent substrate fiber tear of from 75% to 100% at 22° C. Preferably, a bookbinding article comprising the adhesive composition of the present invention is a consumer good.

Road Markings

In a particular embodiment, the adhesive compositions described herein can be used in a roadmarking composition. Roadmarking compositions generally include a binder composition and one or more fillers applied to one or more substrates. The one or more substrates can include asphalt, concrete, metal, brick, cobbles, ceramics, polymeric materials, cinder blocks, soft sports surfaces, playground surfaces, runways, tartan substitutes, concrete, metals, asphalt, bitumen, bricks, cobbles, tiles, steel plates, wood, ceramics, polymeric materials, glass, concrete blocks, porcelain, stone, wood panels, particle board, wooden vehicle parts, cinder blocks, scrims, and combinations thereof.

The roadmarking composition includes the one or more fillers to increase weatherability, visibility, covering power, abrasion resistance, adhesion, and/or reflectivity of the roadmarking composition. In addition, certain fillers may be added to improve the overall rheological properties of the thermoplastic road marking, prevent segregation of the roadmarking, provide friction for the binder composition to the substrate to which it is being applied, and/or reduce the cost of the roadmarking composition. Fillers that may be used for this purpose include sand, pigments, glass beads, polymer-based beads, calcium carbonate, crushed marble, aggregate, dolomite, talc, glass pearls, prismatic reflectors, lens reflectors, calcite spar, silica sand, graphite, fly ash, cement dust, clay, feldspar, nepheline, fumed silica, alumina, magnesium oxide, zinc oxide, barium sulfate, aluminum silicate, calcium silicate, tianates, chalk, reflective inorganic fillers, extending fillers, beads, calcium sulfate, calcium metasilicate, quartz powder, calcined flint powder, mica, calcium silicate glass fibers, dyes, granite, plaster, slaked lime, alumina, diatomaceous earth, reflecting agents, modifiers, white lead, lithopone, chrome yellow, cadmium yellow, resin beads, polymeric gels, polymers, ceramic materials, crushed glass, stone, corundum, aluminum hydroxide, silicon oxide, glass bubbles, and zinc neodecanoate. Exemplary pigments include titanium dioxide, zinc oxide, magnesium oxide, lead chromate, and mixtures thereof. The type and content of the pigment is selected according to the specific purpose for the roadmarking, which is readily ascertainable by a person skilled in the art. In addition, one or more fillers may be added to the roadmarking composition to impart color, opacity, or hue to the roadmarking composition.

A key characteristic of roadmarking compositions is visibility under all environmental conditions. Therefore, the roadmarking composition can include one or more reflective fillers. The incorporation of one or more reflective fillers into the roadmarking composition maximizes the visibility of road markings in rain and darkness by reflecting light from a vehicle's lamps. One or more reflective fillers can be included in the roadmarking composition in an amount sufficient to provide enhanced visibility to the composition by reflecting light. Suitable reflective fillers include but are not limited to glass beads, polymeric beads, sand, silica compounds, ceramic materials, and/or any other reflective filler normally used for such purpose in roadmarking compositions. Beads are the preferred reflective filler, including but not limited to polymer-based beads or glass beads. Glass beads are most preferred. The beads should not adversely affect the cohesive strength of the cooled binder, so strong bonding must occur between the binder and the beads. The primary requirement is that the beads are stable to heat applied during the preparation, mixing, and application of the road marking. Preferably, the beads should remain stable when subjected to a heat above at least 200° C. for a period of about 20 minutes.

Beads prepared from polymers should be able to withstand the pressure applied from normal traffic without breaking or crushing. Furthermore, the reflective filler should be evenly distributed throughout the binder to give uniformity of properties and to provide longevity to the reflective character of the roadmarking. An even distribution of the reflective filler causes exposure of new reflective fillers to the surface when traffic wear and weathering remove an upper layer of the roadmarking. Increasing the amount of reflective filler added to the roadmarking composition also helps maintain satisfactory reflective properties over time while increasing the reflectivity of the roadmarking. If the amount of reflective filler present in the roadmarking composition is small, the reflective ability is deteriorated when the reflective fillers interspersed in the composition are decreased due to abrasion by tires, whereas if the amount of reflective filler added is too large, the roadmarking composition is reduced in strength.

In a preferred embodiment, a roadmarking composition comprising a binder comprising the adhesive composition of the present invention and one or more fillers includes a binder further comprising a copolymer having a Mw of from 100,000 to 250,000.

In an embodiment, a roadmarking composition comprising a binder comprising the adhesive composition of the present invention may also include one or more waxes such as polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, maleic anhydride grafted, polyethylenes with pendant acid functionality moieties, paraffin waxes, microcrystalline waxes, and combinations thereof.

In an embodiment, a roadmarking composition comprising a binder comprising the adhesive composition of the present invention may also include one or more roadmarking additives such as plasticizers, oils, stabilizers, antioxidants, pigments, dyestuffs, polymeric additives, defoamers, preservatives, thickeners, rheology modifiers, humectants, extenders, hindered phenolics, phosphates, antiblock additives, lubricants, photo stabilizers, ultraviolet absorbents, dispersants, thickeners, bases, wetting agents, fire retardants, crosslinking agents, curing agents, opacifiers, and water. Other such additives include oils such as aliphatic oils, naphthenic oils, white oils, soya oils, combinations thereof, and derivatives thereof.

Roadmarking compositions comprising a binder comprising the adhesive composition of the present invention may further include one or more plasticizers including mineral oils, polybutenes, phthalates, hydrocarbon oils, soybean oils, phthalate esters, elastomers, olefin oligomers, vegetable oils, cyclohexane dimethanol dibenzoate, and combinations thereof, and/or sand, pigments, glass beads, polymer-based beads, calcium carbonate, crushed marble, aggregate, dolomite, talc, glass pearls, prismatic reflectors, lens reflectors, calcite spar, silica sand, graphite, fly ash, cement dust, clay, feldspar, nepheline, fumed silica, alumina, magnesium oxide, zinc oxide, barium sulfate, aluminum silicate, calcium silicate, tianates, chalk, reflective inorganic fillers, extending fillers, beads, calcium sulfate, calcium metasilicate, quartz powder, calcined flint powder, mica, calcium silicate glass fibers, dyes, granite, plaster, slaked lime, alumina, diatomaceous earth, reflecting agents, modifiers, white lead, lithopone, chrome yellow, cadmium yellow, resin beads, polymeric gels, polymers, ceramic materials, crushed glass, stone, corundum, aluminum hydroxide, silicon oxide, glass bubbles, and zinc neodecanoate.

In a preferred embodiment, a roadmarking composition comprising a binder comprising the adhesive composition of the present invention, and one or more fillers, comprises a binder that includes one or more modifiers including succinic anhydride modified polymers and metal oxides.

When used in the roadmarking compositions, fillers are effective in increasing the strength of the roadmarking and in retaining the thickness of the roadmarking; however, the use of the fillers in unduly large amounts may result in the production of brittle road markings. As a result, the roadmarking composition includes from 20 to 90 percent by weight of the one or more fillers. In one aspect, the one or more fillers include 50 percent by weight or less, or from 10 to 40 percent by weight, or from 15 to 30 percent of the one or more beads. In yet another aspect, the one or more fillers include 20 percent by weight or less, or from 2 to 15 percent by weight or from 3 to 10 percent by weight of the one or more pigments.

In one aspect, the roadmarking composition includes from 10 to 80 percent by weight of the binder, wherein the binder composition includes the inventive polymer described herein.

Preferably, a roadmarking composition comprising a binder comprising the adhesive composition of the present invention comprises a binder having 30 percent or less by weight of one or more waxes, and/or 80 percent by weight or less of one or more tackifiers, and/or 20 percent by weight or less of one or ore plasticizers, and/or 5 percent by weight or less of one or more acid-modified tackifiers or polymers, and/or 5 percent by weight or less of one or more stabilizers, and/or 40 percent by weight or less of one or more polymeric additives, and/or 10 percent by weight or less of one or more opacifiers, and/or 1 percent by weight or less of one or more antioxidants. In a preferred embodiment, a roadmarking composition comprising a binder comprising the adhesive composition of the present invention has a luminance of 70 or more.

Sealants

In a particular embodiment, the adhesive compositions described herein can be used in a sealant composition. The purpose of a sealant is to maintain a seal between two surfaces of a single substrate, thus repairing the substrate, or in the alternative, to establish and maintain a seal between a pair of substrates. Thus a sealant composition comprising a mixture comprising the adhesive composition of the present invention includes wherein the mixture is applied to at least a portion of a substrate surface to be sealed.

The substrates can include concrete, roofing, marble, anodized aluminum, brick, mortar, granite, limestone, porcelain, glass, painted surfaces, wood, polyvinylchloride, polyacrylate, polycarbonate, polystyrene, fabrics, gaskets, plastic, stone, masonry materials, pipes, hoses, metal, wiring, skis, polyethylene, polypropylene, polyester, acrylic, PVDC, paper, ethylene vinyl acetate, automobiles, buildings, aircraft, panels, decks, bones, pavement, tailgates, door panels, wheel houses, rocker panels, firewalls, floor hem flanges, trunks, and floor pans. For example, sealant compositions may be used for repairing leaky pipes or cracked windshields on automobiles. Sealants further produce load bearing elastic joints between two or more surfaces and to prevent the passage of air, water and dirt there through.

Sealant compositions are useful not only in filling gaps and thus bonding the surfaces of a substrate in a repair operation, but also may be used to bond a first substrate to another substrate. The automotive industry, in particular, is a major user of sealants for this purpose. Automobiles are assembled from several structural components that are joined together in various fashions depending on the particular components and the degree of stress that will have to be endured by the components. For example, sealants are utilized in the assemblies of door panels, quarter panels, tailgates and roofs. Still other automobile assemblies that are welded or bolted together use sealant compositions in their seams. The wheel house, shock lower, rocker panel, firewall, floor hem flange, floor plan, and trunk are further examples of automotive applications which employ sealants.

Regardless of the purpose of its use, a sealant composition is a gap-filling material. Consequently, at the time of seal formation, sealant compositions should have an elasticity that is sufficiently low such that the sealant composition is able to flow into and fill gaps in the substrate to which it is applied and, after the sealant has solidified and thus cured, still sufficiently fill the gaps so as to seal the substrate. In the uncured state, the sealant composition should remain tacky and possess a low enough viscosity to ensure adequate wetting of the substrate.

Sealant compositions are preferably essentially not tacky to the touch once they have solidified or cured. Upon cure, sealants should have sufficient durability to withstand normal weather and user exposure in several applications. Primarily, a sealant should provide an effective barrier against oxygen, water, and air. Cured sealants should possess crack resistance and shrink resistance to mechanical stresses such as expansion in the substrate at elevated temperatures, so that the sealant does not sag or flow over time. Particularly with glass substrates, high levels of stress can cause the glass to crack. While the sealant should be sufficiently rigid to retain its general shape and dimension, it must also remain sufficiently flexible to exhibit substantial recovery upon stretching. Therefore, a balance of high adhesive strength along with high elongation percent and low tensile modulus is desirable for the mixture used as a sealant. High adhesive strength compositions generally provide effective seals, as the higher the adhesive strength, the greater the force that is required to remove the substrate from the mixture. Elongation percent of the mixture refers to the ability of the composition to return to about its original configuration after being subject to the designated extend of elongation. High percent elongation is desirable to provide sealants with a highly advantageous self-repairing property. That is, the sealants will deform to accommodate stress exerted on the sealed portion of the substrate.

In a preferred embodiment, the sealant mixture further comprises one or more waxes including polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, amorphous waxes, carnauba waxes, castor oil waxes, microcrystalline waxes, beeswax, carnauba wax, castor wax, spermaceti wax, vegetable wax, candelilla wax, japan wax, ouricury wax, douglas-fir bark wax, rice-bran wax, jojoba wax, bayberry wax, montan wax, peat wax, ozokerite wax, ceresin wax, petroleum wax, paraffin wax, polyethylene wax, chemically modified hydrocarbon wax, substituted amide wax, and combinations and derivatives thereof.

In an embodiment, a sealant composition comprising a mixture comprising the adhesive composition of the present invention may further comprise one or more additives including plasticizers, oils, stabilizers, antioxidants, pigments, antiblock additives, processing aids, neutralizing agents, water, dyestuffs, polymeric additives, defoamers, preservatives, thickeners, rheology modifiers, humectants, fillers, water, crosslinking agents, thixotropic agents, surfactants, adhesion promoters, reinforcing agents, chain extenders, ultraviolet stabilizers, colorants, organic solvents, stabilizers, dryers, wetting agents, nucleating agents, accelerators, curing agents, and combinations or derivatives thereof.

In an embodiment, a sealant composition comprising a mixture comprising the adhesive composition of the present invention may further comprise one or more fillers including silica, diatomaceous earth, calcium carbonate, iron oxide, hydrogenated castor oil, fumed silica, precipitated calcium carbonate, hydrophobic treated fumed silicas, hydrophobic precipitated calcium carbonates, talc, zinc oxides, polyvinyl chloride powders, fungicides, graphite, carbon black, asphalt, carbon fillers, clay, mica, fibers, titanium dioxide, cadmium sulfide, asbestos, wood flour, polyethylene powder, chopped fibers, bubbles, beads, thixotropes, bentonite, calcium sulfate, calcium oxide, magnesium oxide, and combinations or derivates thereof.

In an embodiment, a sealant composition comprising a mixture comprising the adhesive composition of the present invention may further comprise one or more adhesion promoters including silanes, titanates, organosylane, acrylics, acids, anhydrides, epoxy resins, hardening agents, polyamides, methylacrylates, epoxies, phenolic resins, polyisobutylene, aminoalkyl, mercaptoalkyl, epoxyalkyl, ureidoalkyl, carboxy, acrylate and isocyanurate functional silanes, mercaptopropyltrimethoxysilane, glycidoxypropyltrimethoxysilane, aminopropyltriethoxysilane, aminoethylaaminopropyltrimethoxysilane, ureidopropyltrimethyloxysilane, bis-.gamma.-trimethoxysilyl-propylurea, 1,3,5-tris-.gamma.-trimethoxysilylpropylisocyanurate, bis-.gamnma.-trimethoxysilylpropylmaleate, fumarate and gamma.-methacryloxypropyltrimethoxysilane, aminopropyltriethoxysilane, and combinations and derivatives thereof.

In an embodiment, a sealant composition comprising a mixture comprising the adhesive composition of the present invention may further comprise one or more crosslinking agents including oxime crosslinkers, alkoxysilanes, epoxyalkylalkoxysilanes, amido silanes, aminosilanes, enoxysilanes, tetraethoxysilanes, methyltrimethoxy silane, vinyl trimethoxysilane, glycidoxypropyltrimethoxsilane, vinyl trisisopropenoxysilane, methyl tris-isopropenoxysilane, methyl tris-cyclohexylaminosilane, methyl tris-secondarybutylaminosilane, polyisocyanates, and combinations or derivatives thereof.

In an embodiment, a sealant composition comprising a mixture comprising the adhesive composition of the present invention may further comprises one or more organic solvents including aliphatic solvents, cycloaliphatic solvents, mineral spirits, aromatic solvents, hexane, cyclohexane, benzene, toluene, xylene, and combinations or derivatives thereof.

In an embodiment, a sealant composition comprising a mixture comprising the adhesive composition of the present invention may further comprises one or more surfactants including vinyl-containing or mercapto-containing polyorganosiloxanes, macromonomers with vinyl terminated polydimethyl siloxane, and combinations or derivatives thereof.

In an embodiment, a sealant composition comprising a mixture comprising the adhesive composition of the present invention may further comprises one or more chain extenders including amino silanes, amido silanes, acetoxy silanes, and aminoxy silanes, methylvinyl bis-N,-methylacetamidosilane, methylhydrogendiacetoxysilane, dimethylbis-diethylhydroxylaminosilane, dimethylbis-secondarybutylaminosilane, polyisocyanates, and combinations or derivatives thereof.

In an embodiment, a sealant composition comprising a mixture comprising the adhesive composition of the present invention may further comprises one or more antioxidants including thioesters, phosphates, hindered phenols, tetrakis (methylene 3-(3',5'-di-t-butyl-4 hydroxyphenyl)pro-pionate) methane, 2,2'-ethyldenebis (4,6-di-tertiarybutylphenol), 1,1-3-tris (2-methyl-4-hydroxy-5-t-butylephenyl) butane, 1,3,5-trimethyl2,4,6,tris (3,5-tertbutyl-4-hydroxybenzyl)benzene, dilaurylthiodipropionate, pentaerythritol tetrakis (beta-laurylthiopropionate), alkyl-aryldi- and polyphosphates, thiophosphites, and combinations or derivatives thereof In an embodiment, a sealant composition comprising a mixture comprising the adhesive composition of the present invention may comprise 30 percent or less by weight of one or more waxes.

Paving Compositions

In a particular embodiment, the adhesive compositions described herein can be used in paving compositions. Typically, paving compositions include asphalt, aggregate and an adhesive composition. The term "asphalt" as used herein refers to any of a variety of solid or semi-solid materials at room temperature which gradually liquify when heated, and in which the predominant constituents are naturally occurring bitumens of which are obtained as residue in petroleum refining. Asphalt is further defined by Kirk-Othmer, Encyclopedia of Chemical Technology, Vol. 3, Third Ed. (1978) pp. 284-327, John Wiley & Sons, New York. An additional discussion appears in the publication entitled "A Brief Introduction to Asphalt and some of its Uses", Manual Series No. 5 (MS-5), The Asphalt Institute, 7th Ed., September, 1974.

Exemplary naturally occurring bitumens include naturalasphalts or petroleum-refined asphalts, asphaltites, pyrogenous distillates, bottom stock, as well as other pyrogenous residues such as pyrogenous asphalts, petroleum pitch, coal tar pitch and mixtures thereof, for example. Such material is often characterized by a penetration value of from 0-300 or higher (ASTM D-5-51), preferably about 40-300, with a softening point in the range of about 32 to 120° C. (ASTM D-36-26), preferably between 38 to 65° C.

Useful sources of asphalt include many of those which are presently commercial available. For example, natural asphalts and petroleum asphalts are generally known for roofing and paving applications may be used. The natural asphalts include, for example, asphaltite such as gilsonite, grahamite and glance pitch; lake asphalt such as trinidad asphalt; and rock asphalt. The petroleum asphalts include straight asphalt obtained by distillation of a crude oil (unblown and substantially unoxidized), blown asphalt produced by blowing an oxygen-containing gas into a straight asphalt in the presence or absence of a catalyst, solvent-extracted asphalt obtained when asphaltic material is separated from the petroleum fraction containing it by the use of propane or other solvents, and cut-back asphalt which is a mixture of straight asphalt and a light petroleum solvent. The asphalts may also include petroleum tar and asphalt cement. Petroleum tars include oil gas tar obtained as a by-product when gases are produced from petroleum fractions, such tar in refined form, cut-back tar obtained by mixing a light petroleum fraction with such tar, and tar-pitch obtained as a residue by removing the volatile fraction from such tar. Any of these kinds of asphalt may be used alone or in combination. For example, straight asphalt is useful for paving applications, and oxidized and blown asphalts are useful for roofing applications.

The paving compositions of the present invention are particularly useful for preparing asphalt coating compositions. These include aggregate-containing asphalts such as employed in the paving of roads, bridges, airport runways, and sidewalks, as well as the localized repair or patching of the same. The paving compositions of the present invention may be mixed with aggregate while in a fluid or molten condition. Typically, the paving composition is mixed with preheated, predried aggregates to form a homogeneous mixture of uniformly coated aggregates. The aggregate may be heated under conditions of time and temperature that are sufficient to drive off essentially all free moisture prior to mixing. During mixing, the paving composition is typically at temperatures of about 100° C. to about 160° C. Before the resulting composition is cooled to a temperature at which it loses its workability, it may be spread on a road bed, for example, and then compacted and permitted to cure. After curing, the resulting paving composition comprises aggregate bound by a matrix of asphalt binder.

The term "aggregate" as used herein is intended to include solid particles having a range of sizes including fine particles such as sand to relatively coarse particles such as crushed stone, gravel or slag. Typically, such aggregate used in the preparation of paving compositions are primarily inorganic materials, i.e., such as crushed rock, stone, and in certain instances, sand. The size of aggregates depends in part upon the desired end use application of a particular paving composition. For example, larger aggregate is typically used in laying down of a new or resurfaced roadway, as compared to crack repairing compositions which typically have a aggregate of lower average particle sizes. Of course, the aggregate, particularly when it is ground or crushed, can be highly irregular. Exemplary aggregate materials include inorganic materials including sand, gravel, crushed stone and the like; certain organic materials including recycled tire materials and thermoplastics, as well as mixtures of one or more inorganic and organic materials. Other inorganic as well as organic materials known to be useful as aggregates, although not elucidated here, may also be used in the present inventive compositions.

The paving composition of the present invention may also be useful for preparing improved seal coats. A seal coat is generally applied as a hot asphalt, cutback asphalt, or emulsified asphalt. The molten or fluid asphalt is generally sprayed from a truck, and the aggregate is placed on top of the asphalt followed by rolling or compacting the aggregate into the asphalt to finish the application.

The paving compositions of the present invention, after formation, may be handled by conventional techniques to maintain them in fluid or molten form under, for example, road-building conditions. For example, the asphalts may be formed into a cutback by fluxing the asphalt with a suitable volatile solvent or distillate. The asphalt cutback may then be directly mixed with aggregate and applied as a paving composition in fluid form, possibly at ambient temperatures. Another conventional technique for fluidizing the asphalt prior to mixing with aggregate and forming into a paving composition is to emulsify the asphalt by known techniques. An advantage of this method of fluidizing is that after mixing with the aggregate, it may be applied as a paving composition at ambient temperature.

A key technical consideration in the production of a paving composition is to insure the chemical compatibility of both the asphalt cement as well as the intended end-use application of the paving composition. With regard to chemical compatibility, factors such as the presence of undesired salts within the aggregate must be considered, in order to minimize that the likelihood of breakdown of either the asphalt paving compositions.

Additionally, it is also a requirement that good adhesion of the aggregate and the asphalt cement contained in a paving composition exists to ensure that thorough "wetting" of the asphalt composition, and good mixing of these materials occurs, both prior to, and subsequent to the placement of the asphalt paving compositions on to a surface. Further, the physical characteristics of the aggregate must also be taken into consideration, i.e., under certain conditions where high levels of traffic, and/or heavy loads are expected to be encountered, and are a mixture appropriate to the expected usage patterns, can be selected.

As such, the paving composition includes an adhesive comprising the inventive polymer described herein. Preferably, a paving composition comprising asphalt, aggregate, and the adhesive composition of the present invention comprises one or more natural asphalts, petroleum asphalts, or any combinations thereof, and/or asphaltite, gilsonite, grahamite, glance pitch, lake asphalt, trinidad asphalt, or rock asphalt, and/or clay, stone, sand, rock, gravel, and slag, and/or carbon black, mine chatt, mine tailings, clinkers, cinders, ash, ground tires, clay, and glass.

In a preferred embodiment, a paving composition comprising asphalt, aggregate, and the adhesive composition of the present invention comprises 95 percent by weight or less of the aggregate.

In another embodiment, a paving composition comprising asphalt, aggregate, and the adhesive composition of the present invention comprises from 90 to 96 percent by weight of the aggregate.

In another embodiment, a paving composition comprising asphalt, aggregate, and the adhesive composition of the present invention comprises from 80 to 99 percent by weight of the asphalt.

Glue Sticks

In a particular embodiment, the adhesive compositions described herein can be used in a glue stick. Glue sticks are sold in a variety of forms, one of which is hot melt adhesive glue sticks. Hot melt adhesive glue sticks are typically designed for use in glue guns. Glue guns are adapted to be held in the hand of an operator with a melt chamber in which an end portion of a glue stick is received and melted by heat supplied to the melt chamber. Progressive melting of the hot melt adhesive glue stick may be achieved by pressing the hot melt adhesive glue stick into the melt chamber. Melted adhesive is dispensed from a nozzle of the gun as the hot melt adhesive glue stick is fed into the melt chamber and melted therein. Therefore, the hot melt adhesive glue stick is heated to an application temperature sufficient to provide glue to a substrate in molten form. The substrate can include paper, paperboard, containerboard, tagboard, corrugated board, chipboard, kraft, cardboard, fiberboard, plastic resin, metal, metal alloys, foil, film, plastic film, laminates, sheeting, wood, plastic, polystyrene, nylon, polycarbonate, polypropylene, styrofoam, porous substrates, polyvinylchloride, walls, polyester, or combinations thereof.

The application temperature of the hot melt adhesive glue stick is adjusted to provide a low enough adhesive melt viscosity to ensure good wetting of the substrates and provide an adequate open time to position substrates after glue is applied thereto. It is desirable that the adhesive composition becomes substantially non-tacky after cooling to about room temperature or below. Adhesives for use in hot melt adhesive glue sticks should also have the ability to bond to a variety of substrates.

Another type of glue stick is a pressure sensitive adhesive glue stick. Pressure sensitive adhesive glue sticks are commercially available products comprising a body of solid adhesive contained within a housing. Conventionally, a removable cap closes the housing, the housing having an opening on its bottom. The opening is in a plane perpendicular to the axis of the pressure sensitive adhesive glue stick. The cap can be removed when one wishes to use the pressure sensitive adhesive glue stick.

Pressure sensitive adhesive glue sticks do not require heating for application to a substrate, but produce an adhesive deposition upon the substrate merely upon application of pressure. Similarly, the substrate may be subsequently attached adhesively to another substrate upon application of mere pressure, because the applied glue from the glue stick is tacky at room temperature.

For pressure sensitive adhesives, at least one component of the adhesive composition is liquid at ambient temperature. The liquid component imparts pressure sensitivity or surface tackiness to the pressure sensitive adhesive glue stick at ambient temperature. Often polymeric additives, tackifiers, and/or plasticizers are added to the adhesive composition so that the glue stick is tacky and a portion thereof remains on the substrate upon contact.

Glue sticks can be composed of a mixture of adhesive polymer, tackifier, and wax. The component amounts are altered to provide an adequate blend of melting point, application temperature, open time, bond strength, durability and heat resistance in the adhesive composition, depending on the application. It is desirable to have adhesive compositions that are good at accepting stress without failing adhesively, which is measured by bond strength and time to bond failure. Both bond strength and time to bond failure are preferably high for a glue stick composition. Longer time to bond failure increases flexibility of the glue.

In a preferred embodiment, a glue stick comprising an elongated member includes the adhesive composition of the present invention, wherein the adhesive further comprises one or more additives including plasticizers, oils, stabilizers, antioxidants, synergists, pigments, dyestuffs, polymeric additives, defoamers, preservatives, thickeners, rheology modifiers, humectants, fillers, water, fragrances, fire retardants, colorants, antibiotics, antiseptics, antifungal agents, inorganic salts, gelling agents, binders, surfactants, bases, antimicrobial agents, and anti-foaming agents, and/or one or more fillers including polyethylene, titanium oxide, and calcium carbonate.

In a preferred embodiment, a glue stick comprising an elongated member that includes the adhesive composition of the present invention comprises from 5 to 30 percent by weight of the one or more inorganic salts.

In a preferred embodiment, a glue stick comprising an elongated member that includes the adhesive composition of the present invention comprises 5 percent by weight or less of the one or more colorants, dyes, antioxidants, fragrances, or pigments.

In a preferred embodiment, a glue stick comprising an elongated member that includes the adhesive composition of the present invention comprises 1 percent by weight or less of the one or more antimicrobial agents.

In a preferred embodiment, a glue stick comprising an elongated member that includes the adhesive composition of the present invention wherein the adhesive has a percent substrate fiber tear of from 75% to 100% at 25° C.

Pipe Wrapping

In a particular embodiment, the adhesives of this invention can be used in pipe wrapping articles. Pipe wrapping articles or pipe wrap may be used to insulate or repair leaks to pressure vessels, industrial vessels, transformers, pipes, fittings, tanks, vessels, and containers. In addition, pipe wrapping articles may be used on various types of surfaces including flat faced surfaces, circular joints and other mechanical components. The pipe wrapping articles described herein may be used in any type of industry, such as architectural, building, construction, food, beverage, mining, petrochemical, oil, gas, and water treatment, for example.

Pipe wrapping articles are generally formed by applying an adhesive composition to at least a portion of a wrapping element. The wrapping element can include fiberglass, fibers, wovens, nonwovens, fabric, cloth, polyethylene, polypropylene, acrylic rubber, EPDM, nitrile rubber, nylon, epichlorohydrin elastomer, polysulfide, acrylic elastomer, or butyl rubber, poltisobutylene, for example. The pipe wrapping article can be formed of wood, cement, concrete, nonwoven fabric, woven fabric, aluminum, stainless steel, brass, nickel, glass, glazed ceramics, unglazed ceramics, tiles, polyvinyl chloride, polyethylene terephthalate, plaster, stucco, asphaltic coatings, roofing felts, synthetic polymer membranes, and foamed polyurethane insulation, for example. The wrapping element may have any thickness. For example, a typical wrapping element for use in civil construction may have a minimum thickness of 1.27 mm.

Accordingly, a pipe wrapping article comprising the adhesive composition of the present invention, and a wrapping element, may include the adhesive at least partially disposed on or within the wrapping element.

In a preferred embodiment, a pipe wrapping article comprising the adhesive composition of the present invention comprises one or more polymeric additives including butyl rubber and polyisobutylene. Still more preferably a pipe wrapping article comprising the adhesive composition of the present invention is a consumer good.

Safety Glass

In a particular embodiment, the adhesives described herein can be used in safety glass. There are two kinds of safety glass, laminated and tempered safety glass. Laminated safety glass generally reduces the transmission of high frequency sound and blocks 97 percent of ultraviolet radiation. Tempered safety glass is a single piece of glass that is tempered by quickly heating and cooling the glass to harden it, thereby increasing the strength of the glass.

As used herein, "safety glass" is an article having a transparent pane. An important function of safety glass is that the adhesive composition used therein is not affected by temperature variations and that, in the case of breaking of the glass, the adhesive composition holds the glass pieces. Furthermore, the adhesive composition absorbs shearing stresses applied to the safety glass due to different expansion rates of the glass components, such as when the safety glass includes a first layer of glass and a second layer of polycarbonate. Safety glass generally includes layers of materials, with an adhesive layer either applied to the outside of one layer, or applied in between two or more layers to adhere them to one another. The transparent pane is formed by applying an adhesive composition to one or more transparent panels, the adhesive composition possibly forming a film on the one or more transparent panels. The one or more transparent panels can be formed of polyvinylbutyral, polyurethane, vinyl acetate, polyethylene, polypropylene, polycarbonate, glass, silicate glass, or a combination thereof.

In an embodiment, a article having a transparent pane comprises one or more transparent panels; and the adhesive composition of the present invention applied to at least a portion of the one or more panels. More preferably, the article has a transparent pane comprising one or more transparent panels; and the adhesive composition of the present invention, applied to at least a portion of the one or more panels, wherein the one or more transparent panels comprises polyvinylbutyral, polyurethane, vinyl acetate, polyethylene, polypropylene, polycarbonate, glass, silicate glass, or a combination thereof. In a preferred embodiment, the article is bulletproof glass, soundproofing glass, and/or safety glass. In addition, the adhesive composition of the present invention may form a film on the one or more transparent panels.

Roofing Shingles

In a particular embodiment, the adhesives of this invention can be used in shingles. Roofing shingles are generally formed of a roofing element and an adhesive to bind the roofing element to a roof. The roofing element is generally formed of a sheet metal, such as copper, terne-coated stainless steel, zinc, aluminum, or alloys thereof.

Important criteria for shingles include resistance to crush when the shingles are packed in stacks for shipment, a relatively low melting temperature to permit self-sealing without the application of heating equipment and a strong bond between the joined surfaces, which has high wind resistance and good low temperature stability. Other important considerations include good resistance to photo-oxidation; in particular, the ability to retain adhesive properties after exposure of the adhesive to sunlight for more than two hours.

In addition, the adhesive composition should exhibit a "migrating" property at low temperatures of 32° C. to 37° C. in order to provide stronger bonds and better wind resistance. As used herein, "migrating" refers to when the adhesive composition flows partially into the contacting face of the roofing material.

Accordingly, in an embodiment, a shingle comprises a roofing element having a first side and a second side, wherein the adhesive composition of the present invention is applied to at least a portion of the second side. In another embodiment, the roofing element comprises sheet metal, copper, steel, zinc, aluminum, combinations thereof, and alloys thereof, roofing asphalt, fabric, aggregate, and combinations thereof. In addition, either side of the roofing element may include rubber, fiberglass, aramid, carbon, polyester, nylon, asphalt, and/or sheet metal, wherein the sheet metal comprises copper, aluminum, combinations thereof, or alloys thereof.

In a preferred embodiment, a roofing element having a first side and a second side, wherein the adhesive composition of the present invention is applied to at least a portion of the second side, the adhesive composition further comprises one or more bituminous materials, preferably wherein the one or more bituminous materials comprise asphalt, more preferably the adhesive composition comprises 80 percent by weight or less of the one or more bituminous materials.

Reflective Coating

In a particular embodiment, the adhesives of this invention can be used in reflective articles. Reflective articles are formed by applying a reflective material to a substrate surface to provide reflectivity to a portion of the substrate. The reflective material can include any material known to one skilled in the art. For example, the reflective material can include prisms and glass beads. The substrate surface can include roads, bicycle lanes, traffic signs, soft sports surfaces, playground surfaces, ships, runways, pedestrian crosswalks, buildings, tennis courts, driving courses, tartan substitutes, oil rigs, tunnels, concrete, metals, asphalt, bitumen, bricks, cobbles, tiles, steel plates, wood, ceramics, polymeric materials, glass, bridge abutments, traffic barricades, barriers, pipes, poles, guard rails, concrete blocks, curbs, parking lots, porcelain, stone, wood panels, particle board, wooden vehicle parts, cinder blocks, glass windows, traffic drums, traffic cones, scrims, liquid crystal displays, lights, copy machines, electronic backboards, diffuse white standards, and photographic lights.

An adhesive composition is applied to at least a portion of the reflective material to adhere the reflective material to the substrate. The adhesive composition includes the inventive polymer described herein.

The reflective article may include a substrate surface selected from the group consisting of roads, bicycle lanes, traffic signs, soft sports surfaces, playground surfaces, ships, runways, pedestrian crosswalks, buildings, tennis courts, driving courses, tartan substitutes, oil rigs, tunnels, concrete, metals, asphalt, bitumen, bricks, cobbles, tiles, steel plates, wood, ceramics, polymeric materials, glass, bridge abutments, traffic barricades, barriers, pipes, poles, guard rails, concrete blocks, curbs, parking lots, porcelain, stone, wood panels, particle board, wooden vehicle parts, cinder blocks, glass windows, traffic drums, traffic cones, scrims, liquid crystal displays, lights, copy machines, electronic backboards, diffuse white standards, and photographic lights.

In a preferred embodiment, a reflective article comprises a reflective material at least partially applied to a substrate surface with the adhesive composition of the present invention wherein the reflective article has a luminance of 70 or more.

Other Articles

In an embodiment, the polymer of the present invention may be an article that has been injection molded, is a film, is an extruded film, is a cast film, or is a combination thereof. The article preferably comprises amorphous syndiotactic rich polypropylene and/or amorphous syndiotactic rich polypropylene functionalized with maleic anhydride. The article may also comprise the amorphous syndiotactic rich polyolefin disposed on a non-polar substrate, on a polar substrate, or both. Accordingly, the article of the present invention may comprise the amorphous syndiotactic rich polyolefin and/or the functionalized amorphous syndiotactic rich polyolefin disposed on wood, paper, cardboard, plastic, thermoplastic, rubber, metal, metal foil, metallized surfaces, cloth, nonwoven fibers, spunbonded fibers, stone, plaster, glass, SiOx coatings applied by evaporating silicon oxide onto a film surface, foam, rock, ceramics, films, polymer foams, substrates coated with inks, substrates coated with dyes, substrates coated with pigments, PVDC, polyethylene, polypropylene, polyacrylates, acrylics, polyethylene terephthalate, corona discharge treated substrates, flame treated substrates, electron beam irradiated substrates, gamma irradiated substrates, microwave treated substrates, silanized substrates, and combinations thereof.

Master Batch

The present invention may also include a master batch process for providing the polymer of the present invention for the production of various polymeric materials including articles, films and the like, comprising melt blending under high shear conditions the polyolefin of the present invention with at least one additional additive to produce a concentrate containing from 10 to 90 wt. % of the polymer of the present invention, which may then be subsequently blended with other components of the final product. Examples of suitable additives include the additives described herein. The amorphous syndiotactic rich polyolefin, preferably amorphous syndiotactic rich polypropylene, functionalized amorphous syndiotactic rich polyolefin, preferably amorphous syndiotactic rich polyolefin grafted with maleic anhydride, of the present invention, may be utilized in the master batch as both the diluent, and as the concentrated material that is subsequently let down into the final product. In an embodiment, a process of the producing the master batch may include a step wherein the amorphous syndiotactic rich polyolefin is functionalized simultaneously with the formation of the concentrate.

EXAMPLES

Preparation of a-srPP

Polymerization of the samples a-srPP-1-, a-srPPr-3, a-srPPr-4, a-srPPr-5, and a-srPPr-6 were carried out in a liquid filled, single-stage 0.5 liter stainless steel autoclave continuous reactor using diphenylmethylene(fluorenyl)(cyclopentadienyl)hafnium dimethyl pre-activated with N,N-dimethylanilinium tetrakis(pentafluorophenyl) borate. The reactor is equipped with a stirrer, a water cooling/steam-heating element with a temperature controller, and a pressure controller. Solvent and propylene were purified by passing through a three-column purification system prior to pumping into the reactor. All catalyst solutions were kept in an inert atmosphere with <1.5 ppm water content and fed into reactor by metering pumps. Catalyst and monomer contacts took place in the reactor.

The reactor was first cleaned by continuously pumping hexane and scavenger through the reactor system for at least one hour at a maximum allowed temperature (about 150° C.). After cleaning, the reactor was heated/cooled to the desired temperature using water/steam mixture flowing through the reactor jacket and controlled at a set pressure with controlled solvent flow. Monomers and catalyst solutions were then fed into the reactor when a steady state of operation was reached. An automatic temperature control system was used to control and maintain the reactor at a set temperature. Beginning of polymerization activity was deduced from observation of a viscous discharge product and lower temperature of the water-steam mixture. Once activity was established and system reached equilibrium, the reactor was lined out by continuing operating the system under the established condition for a time period of at least five times of mean residence time prior to sample collection. The resulting mixture, containing mostly solvent, polymer and unreacted monomers, was collected in a collection box after the system reached a steady state operation. Methanol was used as catalyst deactivation agent. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of about 350 psig and in the temperature range of 80 to 120° C. Detailed experimental condition and polymer properties are listed in the following table.

In the examples, polymerization temperatures were changed to vary the molecular weight and tacticity of the polymer. The polymers produced have % [r] dyads of about 58 to 75%. Each also demonstrate an essentially amorphous polymer.

Functionalization of a-srPP

The amorphous syndiotactic rich polypropylene samples were then functionalized by dissolving about 120 g of the polymer in toluene to produce a polymer solution having a polymer concentration of about 20 wt %. 15 wt % maleic anhydride (based on the particular a-srPPr used) was then added to the solution, along with 2.5 wt % of the radical initiator, 2,5-dimethyl-2,5-di(t-butylperoxy)hexane. The reaction temperature was 139° C. for about 4 hours time. The amide functional group was provided by using 1-vinyl-2-pyrrolidinone, and the acid functional group was provided by using acrylic acid.

The data is shown below.

| Polymer | a-srPPr-1 | a-srPPr-3 | a-srPPr-4 | a-srPPr-5 | a-srPPr-6 | Comparative iPP-g-MA |
|---|---|---|---|---|---|---|
| Catalyst feed rate (mole/min) | 1.75E−06 | 1.75E−06 | 1.75E−06 | 1.75E−07 | 8.76E−06 | |
| Propylene feed rate (g/min) | 14 | 14 | 14 | 14 | 14 | |
| Hexane feed rate (ml/min) | 90 90 90 | 90 | 90 | 90 | 90 | |
| Polymerization temp ° C. | 110 | 120 | 107 | 94 | 90 | |
| Mn (kg/mol) | 23 | 17 | 34 | 74 | 128 | |
| Mw (kg/mol) | 62 | 43 | 86 | 188 | 311 | |
| Mz (kg/mol) | 148 | 80 | 177 | 385 | 606 | |
| $g'_{vis}$ | 1.08 | 0.98 | 1.05 | 1.11 | 1.19 | |
| Triad mole fraction C13 NMR | | | | | | |
| Mm | | 0.152 | 0.133 | 0.114 | 0.0922 | |
| mr + rm | | 0.483 | 0.464 | 0.435 | 0.399 | |
| Rr | | 0.365 | 0.403 | 0.451 | 0.509 | |
| Diad mole fraction from C13 NMR | | | | | | |
| M | | 0.394 | 0.365 | 0.331 | 0.292 | |
| R | | 0.606 | 0.635 | 0.669 | 0.708 | |
| Functionalized Polymer | | | | | | |
| Functional Group | Maleic Anhydride (MA) | 1-vinyl-2-pyrrolidinone | Acrylic acid (AA) | Maleic Anhydride (MA) | Maleic Anhydride (MA) | Maleic Anhydride (MA) | Maleic Anhydride (MA) | Maleic Anhydride (MA) |
| Mn (kg/mol) | 8 | 8 | 8 | 17 | 23 | 29 | 60 | 3.7 |
| Mw (kg/mol) | 20 | 20 | 20 | 33 | 44 | 68 | 135 | 9.8 |
| Mz (kg/mol) | 38 | 38 | 38 | 55 | 71 | 116 | 263 | 18 |
| Wt % FG | 3.20 | 1.00 | 1.00 | 1.92 | 1.00 | 1.00 | 1.12 | 5.24 | iPP-g-MA is a maleic modified polypropylene with acid number of 50, viscosity of 300 cps @ 190° C. available from Chusei, in Pasedena, Texas Characterization and Tests For purposes of this invention and the claims thereto, the following tests are used, unless otherwise indicated:

Tensile strength (tensile strength at break and elongation at break) are measured by ASTM D 1708. Elongation at break is also referred to herein as strain at break or percent elongation.

Peel strength (also referred to as Peel adhesion at 180° peel angle, 180° peel strength, 180° peel adhesion, T-Peel strength, T-Peel.) is measured according to a modified version of ASTM D-1876. (modified to use a 0.5 inch wide sample, and a 2" per minute separation speed.)

Tensile Strength Modulus at 100% elongation and Young's Modulus are determined according to ASTM E-1708.

Dynamic Storage modulus (also called storage modulus) is G' and is determined as follows. Typically, samples are tested using a three point bending configuration (TA Instruments DMA 2980). A solid rectangular compression molded bar is placed on two fixed supports; a movable clamp is applied a periodic deformation to the sample midpoint at a frequency of 1 Hz and an amplitude of 20 μm. The sample is initially cooled to −130° C. then heated to 60° C. at a heating rate of 3° C./min. In some cases, compression molded bars may be tested using other deformation configurations, namely dual cantilever bending and tensile elongation (Rheometrics RSAII). The periodic deformation under these configurations is applied at a frequency of 1 Hz and strain amplitude of 0.05%. The sample is cooled to −130° C. and then heated to 60° C. at a rate of 2° C./min.

Creep resistance is determined using ASTM D-2293, and sag is also referred to as creep.

Rolling Ball Tack is determined using PSTC 6.

Hot Shear Strength is determined by suspending a 1000 gram weight from a 25 mm wide strip of MYLAR (polyester) film coated with the polymer or adhesive formulation which is adhered to a stainless steel plate with a contact area of 12.5 mm×25 mm. The sample is placed in a ventilated oven at 40° C. The time is recorded until stress failure occurs.

Probe tack (also called Polyken probe tack) is determined according to ASTM D 2979.

Holding Power is determined according to PSTC 7, and is also called Shear adhesion or Shear strength.

Density is determined according to ASTM D792 at 25° C.

Gardner color is measured according to ASTM D 1544-68.

Luminence is the reflectance "Y" in the CIE color coordinates as determined by ASTM D 1925 divided by 100.

Needle penetration is measured by ASTM D5.

Bond strength is measured by ASTM D3983.

Adhesion to road surface is measured by ASTM D4541.

Set time is defined for use herein as the time it takes for a compressed adhesive substrate construct to fasten together with enough adhesion so as to give substrate fiber tear when pulled apart. These set times were measured by placing a molten dot of adhesive on to a file folder substrate taped to a flat table. A file folder tab (1 inch by 3 inch (2.5 cm×7.6 cm)) was placed upon the dot 3 seconds later and compressed with a 500 gram weight. The weight was allowed to sit for about 0.5 to about 10 seconds. The construct thus formed was pulled apart to check for a bonding level sufficient to produce substrate fiber tear. The set time was recorded as the minimum time required for this bonding to occur. Standards of commercially available adhesives were used to calibrate this process.

Molecular weights (number average molecular weight (Mn), weight average molecular weight (Mw), and z-average molecular weight (Mz)) were determined using a Waters 150 Size Exclusion Chromatograph (SEC) equipped with a differential refractive index detector (DRI), an online low angle light scattering (LALLS) detector and a viscometer (VIS). The details of the detector calibrations have been described elsewhere [Reference: T. Sun, P. Brant, R. R. Chance, and W. W. Graessley, Macromolecules, Volume 34, Number 19, 6812-6820, (2001)]; The SEC with three Polymer Laboratories PLgel 10 mm Mixed-B columns, a nominal flow rate 0.5 cm3/min, and a nominal injection volume 300 microliters was common to both detector configurations. The various transfer lines, columns and differential refractometer (the DRI detector, used mainly to determine eluting solution concentrations) were contained in an oven maintained at 135° C.

The LALLS detector was the model 2040 dual-angle light scattering photometer (Precision Detector Inc.). Its flow cell, located in the SEC oven, uses a 690 nm diode laser light source and collects scattered light at two angles, 15° and 90°. Only the 15° output was used in these experiments. Its signal was sent to a data acquisition board (National Instruments) that accumulates readings at a rate of 16 per second. The lowest four readings were averaged, and then a proportional signal was sent to the SEC-LALLS-VIS computer. The LALLS detector was placed after the SEC columns, but before the viscometer.

The viscometer was a high temperature Model 150R (Viscotek Corporation). It consists of four capillaries arranged in a Wheatstone bridge configuration with two pressure transducers. One transducer measures the total pressure drop across the detector, and the other, positioned between the two sides of the bridge, measures a differential pressure. The specific viscosity for the solution flowing through the viscometer was calculated from their outputs. The viscometer was inside the SEC oven, positioned after the LALLS detector but before the DRI detector.

Solvent for the SEC experiment was prepared by adding 6 grams of butylated hydroxy toluene (BHT) as an antioxidant to a 4 liter bottle of 1,2,4 Trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/0.22 micron Teflon filter assembly between the high pressure pump and SEC columns. The TCB was then degassed with an online degasser (Phenomenex, Model DG-4000) before entering the SEC.

Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples.

Prior to running each sample the DRI detector and the injector were purged. Flow rate in the apparatus was then increased to 0.5 ml/minute, and the DRI was allowed to stabilize for 8-9 hours before injecting the first sample. The argon ion laser was turned on 1 to 1.5 hours before running samples by running the laser in idle mode for 20-30 minutes and then switching to full power in light regulation mode.

The g' index was measured using SEC with an on-line viscometer (SEC-VIS) and are reported as g' at each molecular weight in the SEC trace. The g' index is defined as:

$$g' = \frac{\eta_b}{\eta_l}$$

where $\eta_b$ is the intrinsic viscosity of the branched polymer and $\eta_l$ is the intrinsic viscosity of a linear polymer of the same viscosity-averaged molecular weight (Mv) as the branched polymer. $\eta_l = KM_v^\alpha$, K and α were measured values for linear polymers and should be obtained on the same SEC-DRI-LS-VIS instrument as the one used for g' index measurement. For polypropylene samples presented in this invention, K=0.0002288 and α=0.705 were used. The SEC-DRI-LS-VIS method obviates the need to correct for polydispersities, since the intrinsic viscosity and the molecular weight were measured at individual elution volumes, which arguably contain narrowly dispersed polymer. Linear polymers selected as standards for comparison should be of the same viscosity average molecular weight, monomer content and composition distribution. Linear character for polymer containing C2 to C10 monomers is confirmed by Carbon-13 NMR the method of Randall (Rev. Macromol. Chem. Phys., C29 (2&3), p. 285-297). Linear character for C11 and above monomers is confirmed by GPC analysis using a MALLS detector. For example, for a copolymer of propylene, the NMR should not indicate branching greater than that of the co-monomer (i.e. if the comonmer is butene, branches of greater than two carbons should not be present). For a homopolymer of propylene, the GPC should not show branches of more than one carbon atom. When a linear standard is desired for a polymer where the comonomer is C9 or more, one can refer to T. Sun, P. Brant, R. R. Chance, and W. W. Graessley, Macromolecules, Volume 34, Number 19, 6812-6820, (2001) for protocols on determining standards for those polymers. In the case of syndiotactic polymers, the standard should have a comparable amount of syndiotacticity as measured by Carbon 13 NMR. The viscosity averaged g' was calculated using the following equation:

$$g'_{vis} = \frac{\Sigma C_i \eta_{bi}}{\Sigma C_i KM_i^\alpha}$$

Maleic anhydride (MA) contents of the maleated polymers were determined as follows. Approximately 0.5 g of the polymer was dissolved in 150 ml of toluene at boiling temperature. A potentiometric titration with TBAOH (tetra-butylammonium hydroxide) using bromothymol blue as the color indicator was performed on the heated solution in which the polymers did not precipitate during titration.

Mooney viscosity was determined ML 1+4@125° C. according to ASTM D1646-90.

Peak melting point (Tm), peak crystallization temperature (Tc), heat of fusion and crystallinity were determined using the following procedure according to ASTM E 794-85. Differential scanning calorimetric (DSC) data was obtained using a TA Instruments model 2920 machine. Samples weighing approximately 7-10 mg were sealed in aluminum sample pans. The DSC data was recorded by first cooling the sample to −50° C. and then gradually heating it to 200° C. at a rate of 10° C./minute. The sample was kept at 200° C. for 5 minutes before a second cooling-heating cycle was applied. Both the first and second cycle thermal events were recorded. Areas under the curves were measured and used to determine the heat of fusion and the degree of crystallinity. The percent crystallinity is calculated using the formula, [area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999. A value of 189 J/g (B) was used as the heat of fusion for 100% crystalline polypropylene. For polymers displaying multiple melting or crystallization peaks, the highest melting peak was taken as peak melting point, and the highest crystallization peak was taken as peak crystallization temperature.

The glass transition temperature (Tg) was measured by ASTM E 1356 using a TA Instruments model 2920 machine.

Melt Viscosity (ASTM D-3236) (also called "viscosity", "Brookfield viscosity") Melt viscosity profiles were typically measured at temperatures from 120° C. to 190° C. using a Brookfield Thermosel viscometer and a number 27 spindle.

Adhesive Testing

Functionalized a-srPPr or iPPr were mixed thoroughly and then degassed in a vacuum oven at 180° C. and subsequently cooled down to 25° C. This was performed before molding and bonding to eliminate the possibility of air bubbles in the subsequent fabrication of the adhesive layer. Each of the functionalized a-srPPr samples were then molded into a thin sheet of material with thickness about 0.4 mm at 180° C. for 10 s. For the preparation of the T-peel specimens, this thin sheet of adhesive sample was laminated between two pieces of Mylar substrate (0.003"=0.076 mm thickness; used as received) in a positive pressure, Teflon-coated mold at a temperature of 180° C. and a pressure of 0.67 MPa for 10 s. For the iPP substrate a 3-mil thick cast film of a metallocene homopolypropylene of Melt Flow Rate ~9, and a melting point of 150-151° C. was used, along with a lower bonding temperature of 150° C. All these adhesive/substrate laminates were cut into ½"=1.3 cm wide specimens. The adhesive thickness was ~0.2-0.3 mm. T-peel measurements using triplicate samples were performed according to a modified version of ASTM-1876, wherein a 0.5" wide sample was used due to limited sample availability, at room temperature, and at a separation speed of 2"/min=850 μm/s instead of 10"/min as specified by the method, on an Instron Tester. Adhesion was measured by the average peel strength:

Peel Strength=$F/w$ where F is the peel force and w is the width of the test specimen. AIF and CF denote apparent interfacial failure (debonded adhesive left only on one Mylar substrate) and cohesive failure (debonded adhesive left on both Mylar substrates), respectively, as observed visually. Because each T-peel measurement employs triplicate samples, AIF/CF means two samples fail in AIF mode and one sample fails in CF mode. On the other hand, CF/AIF means two samples fail in CF mode and one sample fails in AIF mode. The data are shown below for a number of functionalized polyolefins:

| Sample | T-Peel to Mylar (lb/in) | Failure Mode | T-Peel to iPP (lb/in) | Failure Mode |
|---|---|---|---|---|
| iPPr-g-MA | 0.005 | AIF | 3.65 | CF |
| a-srPPr-3-g-MA | 6.60 | CF | 5.72 | CF |
| a-srPPr-4-g-MA | 8.13 | CF | 7.80 | CF |
| a-srPPr-5-g-MA | 1.66 | AIF | 11.17 | CF |
| a-srPPr-6-g-MA | 2.59 | AIF | >5.96 | Substrate Broken |

All the functionalized srPPr polymers have higher adhesion to both Mylar and iPP compared to MA-iPPr. Therefore, a-srPPr-g-MA improves adhesion to Mylar without sacrificing adhesion to iPP.

In the following tables, some compositions are blends of a-srPPr or functionalized a-srPPr with a propylene-based polymer (POA) in the presence or absence of a tackifier and/or a wax. The POA homopolypropylenes (listed as aPP-iPP in the tables) were produced according to the general procedures described in U.S. Ser. No. 10/868,951, filed Oct. 15, 2003. The catalysts used were di(p-triethylsilylphenyl) methylene(cyclopentadienyl)(3,8-di-t-butylfluorenyl) hafnium dimethyl (catalyst #1) and rac-dimethylsilyl bis(2-methyl-4-phenylindenyl)zirconium dimethyl (catalyst #2) the activator used was N,N-dimethylaniliniumtetrakis(pentafluorophenyl)borate. The detailed polymerization conditions and polymer properties are listed in the following tables.

| | aPP-iPP-1 | aPP-iPP-2 | aPP-iPP-3 |
|---|---|---|---|
| Catalyst #1 feed rate (mole/min) | 1.65E−06 | 1.65E−06 | 1.65E−06 |
| Catalyst #2 feed rate (mole/min) | 9.45E−08 | 9.45E−08 | 9.45E−08 |
| Propylene (g/min) | 14 | 14 | 14 |
| Hexane (ml/min) | 90 | 90 | 90 |
| Polymerization temperature (° C.) | 125 | 120 | 115 |
| Mn (kg/mol) | 17.8 | 19.2 | 21.3 |
| Mw (kg/mol) | 35.5 | 44.4 | 54.9 |

-continued

| | | | |
|---|---|---|---|
| Mz (kg/mol) | 63.8 | 83.7 | 112.8 |
| Tc (° C.) | 88.1 | 90.2 | 91.8 |
| Tm (° C.) | 127.1 | 138.1 | 140.8 |
| Tg (° C.) | −5.8 | −4.7 | −4.2 |
| Heat of fusion (J/g) | 37.4 | 38.3 | 38.0 |
| Viscosity @ 190° C. (cp) | 1890 | 3970 | 11450 |

| Polymer | aPP-iPP-4 | aPP-iPP-5 | aPP-iPP-6 |
|---|---|---|---|
| Catalyst #1 in catalyst mixture (mol. %) | 86 | 86 | 86 |
| Polymerization temperature in leading reactor (° C.) | 132 | 130 | 135 |
| Polymerization temperature in trailing reactor (° C.) | 132 | 131 | 135 |
| Scavenger concentration in feed (wppm) | 24 | 24.5 | 25 |
| Catalyst concentration in feed (wppm) | 4.6 | 4.1 | 4.2 |
| Activator concentration in feed (wppm) | | 73.5 | 4.7 |
| Propylene concentration in feed (wt. %) | 30 | 28.6 | 29.2 |
| Quench water (gram/hour) | 2.72 | 2.72 | 4.54 |
| Viscosity @ 190° C. (cp) | 2400 | 1600 | 1500 |
| Mw (kg/mol) | 41.4 | 41.1 | 29.3 |
| Mn (kg/mol) | 19.4 | 19.6 | 13.1 |
| Mz (kg/mol) | 76.6 | 76 | 62.6 |
| Tc (° C.) | 79.9 | 77.8 | 68 |
| Tm (° C.) | 139 | 132 | 136 |
| Heat of fusion (J/g) | 31.5 | 28.7 | 22 |

Adhesion to Mylar for Compositions without Tackifier

| | T-peel, lb/in | Failure mode |
|---|---|---|
| aPP-iPP-1 | 0.03 | AF |
| aPP-iPP-1 + 20 Wt % a-srPPr-3 | 0.10 | AF |
| aPP-iPP-1 + 20 Wt % iPPr-g-MA | 0.19 | CF |
| aPP-iPP-1 + 20 Wt % a-srPPr-1-g-amide | 0.10 | AF |
| aPP-iPP-1 + 20 Wt % a-srPPr-1-g-MA | 0.48 | AF |
| aPP-iPP-2 | 0.03 ≡ $P_1$ | AF/CF |
| aPP-iPP-2 + 20 Wt % a-srPPr-3 | 0.04 | AF |
| aPP-iPP-2 + 20 Wt % iPPr-g-MA | 0.20 | CF |
| aPP-iPP-2 + 20 Wt % a-srPPr-1-g-acid | 0.05 | AF |
| aPP-iPP-2 + 20 Wt % a-srPPr-1-g-amide | 0.08 | CF |
| aPP-iPP-2 + 20 Wt % a-srPPr-1-g-MA | 1.21~40$P_1$ | AF |
| aPP-iPP-2 + 20 Wt % a-srPPr-3-g-MA | 1.83 | CF/AF |
| aPP-iPP-2 + 20 Wt % a-srPPr-4-g-MA | 2.12 | AF |
| aPP-iPP-2 + 20 Wt % a-srPPr-5-g-MA | 6.28~200$P_1$ | CF/AF |
| aPP-iPP-2 + 20 Wt % a-srPPr-6-g-MA | 4.58 | AF |
| aPP-iPP-3 | 0.001 | AF |
| aPP-iPP-3 + 20 Wt % a-srPPr-3 | 0.02 | AF |
| aPP-iPP-3 + 20 Wt % iPPr-g-MA | 0.32 | CF |
| aPP-iPP-3 + 20 Wt % a-srPPr-1-g-amide | 0.09 | AF |
| aPP-iPP-3 + 20 Wt % a-srPPr-1-g-MA | 0.40 | AF |

The symbol, "≡", denotes "is defined as".

Adhesion to Mylar for Compositions with Tackifier (aPP-iPP/E-5380/Polymer Modifier = 72/8/20 Wt. Ratio)

| | T-peel, lb/in | Failure mode |
|---|---|---|
| aPP-iPP-2/E-5380 (9 to 1 Wt. Ratio) | 0.04 ≡ $P_2$ | AF |
| aPP-iPP-2/E-5380/a-srPPr-3 | 0.04 | AF |
| aPP-iPP-2/E-5380/iPPr-g-MA | 0.14 | CF |
| aPP-iPP-2/E-5380/a-srPPr-1-g-acid | 0.06 | AF |
| aPP-iPP-2/E-5380/a-srPPr-1-g-amide | 0.22 | AF |
| aPP-iPP-2/E-5380/a-srPPr-1-g-MA | 2.15~50 $P_2$ | CF/AF |

(aPP-iPP/E-5380/Polymer Modifier = 72/8/20 Wt. Ratio)

| | T-peel, lb/in | Failure mode |
|---|---|---|
| aPP-iPP-2/E-5380/a-srPPr-3-g-MA | 2.56 | CF |
| aPP-iPP-2/E-5380/a-srPPr-4 | 0.05 | AF |
| aPP-iPP-2/E-5380/a-srPPr-4-g-MA | 5.83 | CF |
| aPP-iPP-2/E-5380/a-srPPr-5 | 0.13 | AF |
| aPP-iPP-2/E-5380/a-srPPr-5-g-MA | 12.02 | AF/CF |
| aPP-iPP-2/E-5380/a-srPPr-6 | 0.02 | AF |
| aPP-iPP-2/E-5380/a-srPPr-6-g-MA | 13.77~350 $P_2$ | CF |

E-5380 is ESCOREZ® 5380, which is a hydrogenated dicyclopentadien based hydrocarbon resin having a Ring and Ball softening point of about 85° C., available from ExxonMobil Chemical Co. in Houston, Tex.

Bonding to Mylar and iPP of Modified POA's

| | T-peel to Mylar (lb/in) | Failure mode | T-Peel to iPP (lb/in) | Failure mode |
|---|---|---|---|---|
| aPP-iPP-2/iPPr-g-MA | 0.2 | CF | 2.9 | CF |
| aPP-iPP-2/E-5380/ iPPr-g-MA | 0.14 | CF | 2.87 | CF |
| aPP-iPP-2/E-5380 | 0.04 | AF | 3.09 | CF |
| aPP-iPP-2/E-5380/a-srPPr-3 | 0.09 | AF | >10.31 | Substrate broken |
| aPP-iPP-2/E-5380/a-srPPr-1-g-MA | 2.15 | CF/AF | >8.53 | Substrate broken |

POA's Modified by Tackifier and Wax

| | Formulated PP-1 | Formulated PP-2 |
|---|---|---|
| aPP-iPP-4 | 79.4 | — |
| aPP-iPP-5 | — | 81.6 |
| E-2203 ($T_g$ = 47° C.) | 13.4 | — |
| E-5690 ($T_g$ = 45° C.) | — | 9.02 |
| Paraflint C80 | 6.7 | 8.68 |
| Irganox 1010 | 0.50 | 0.69 |
| T-Peel to Mylar, lb/in | 0.23 | 0.45 |
| Failure Mode | AIF | CF |

E-2203 is ESCOREZ® 2203, which is an aliphatic-aromatic based hydrocarbon resin having a Ring and Ball softening point of about 93° C. E-5690 is ESCOREZ® 5690, which is a hydrogenated dicyclopentadiene-aromatic based hydrocarbon resin having a Ring and Ball softening point of about 89° C. Both are available from ExxonMobil Chemical Co. in Houston, Tex. In the absence of functionalized polyolefin, both Formulated PP-1 and PP-2 show low adhesion to Mylar.

Adhesion to Mylar for Compositions Based on aPP-iPP-6

(aPP-iPP/E-5380/Polymer Modifier = 72/8/20 Wt. Ratio)

| | T-peel, lb/in | Failure mode |
|---|---|---|
| aPP-iPP-6 | 0.07 | CF |
| aPP-iPP-6/E-5380 (9 to 1 Wt. Ratio) | 0.19 | CF |
| aPP-iPP-6/E-5380/a-srPPr-3-g-MA | 4.32 | CF |
| aPP-iPP-6/E-5380/a-srPPr-4-g-MA | 6.94 | CF |
| aPP-iPP-6/E-5380/a-srPPr-5-g-MA | 11.1 | CF |
| aPP-iPP-6/E-5380/a-srPPr-6-g-MA | 12.0 | CF |

As the data shown in the above tables, the functionalized a-srPPr provides a benefit to the T-peel strengths to Mylar of these compositions. Clearly, functional groups improve adhesion of propylene-based polymer to Mylar with the MA group showing the better results. Also, viscosity (or molecular weight) of the propylene-based polymer may affect adhesion, with the medium molecular weight polymer, aPP-iPP-2, showing better results.

As the examples also show, the compositions of the present invention provide enhanced adhesion to both polar and non-polar substrates. They can be applied to various areas, such as adhesives, tie layers, paint primer, adhesion promoter, interfacial agent, compatibilizer, and the like. As above, some inventive formulations were prepared by blending component 1, the aPP-iPP polymer, and a functionalized polyolefin, such as a-srPPr-g-MA, with other ingredients, such as tackifier, wax, antioxidant, plasticizer oil, liquid resin tackifier, and the like under low or high shear mixing at elevated temperatures to form a fluid melt. Mixing temperatures varied from about 130° C. to about 190° C.

Aliphatic-Solvent Based Functionalization of a-srPP

Amorphous or low crystallinity propylene based homopolymers and copolymers have been prepared and functionalized in cyclohexane, hexane or mixture of aliphatic solvents. Following functionalization, the product optionally can be left in solution for delivery as a primer for e.g. TPO bumper paint adhesion, or dried for melt blending or extrusion in other applications such as tie layers, skin layers for films and molded objects, components in adhesive formulations, and the like. Key inventive steps include functionalization in aliphatic solvent: a) thus avoiding use of aromatic solvent and the environmental and process issues accompanying aromatic solvent, and opening the possibility that the base polymer can be made, functionalized, and delivered for use all in the same solvent and b) the direct use of polymer solution from polymerization reactor for functionalization-avoiding finishing and re-dissolving steps.

Functionalization Examples

Comparative Example F1

5.1 g: amorphous syndiotactic rich polypropylene was dissolved in 500 ml xylene at 130 'C. 1.2 ml Luperox P (TERT-BUTYL PEROXYBENZOATE, AtoFina Inc., Ontario Canada) and 4 mls 1-vinyl-2-pyrrolidinone were added to the solution. The solution was stirred for 2.5 hrs. The product was precipitated into acetone and then further washed with acetone. The product was dried under vacuum overnight at 120° C.

Comparative Example F2

50 g amorphous syndiotactic rich polypropylene was melted in brander mixer at 190° C. 2.0 g dicumylperoxide and 4 ml vinyl-2-pyrrolidinone were added and the mixture stirred for 2.5 hrs. The product was precipitated into acetone and product was further washed with acetone. The product was dried under vacuum overnight at 120° C.

Example F3

100 g of amorphous syndiotactic rich polypropylene was dissolved in 700 ml cyclohexane at 130° C. 3 g dicumylperoxide 10 g maleic anhydride was added to the solution. The solution was stirred for 2.5 hrs. The product was precipitated into acetone and product was then further washed with acetone. The product was dried under vacuum overnight at 120° C.

Example F4

100 g of amorphous syndiotactic rich polypropylene was dissolved in 700 ml cyclohexane at 130° C. 3 g dicumylperoxide and 4 ml 1-vinyl-2-pyrrolidinone was added to the solution. The solution was stirred for 2.5 hrs. The product was precipitated into acetone and product was then further washed with acetone. The product was dried under vacuum overnight at 120° C.

Example F5

100 g of amorphous syndiotactic rich polypropylene was dissolved in 700 ml cyclohexane at 130° C. 3 g dicumylperoxide and 8 ml 1-vinyl-2-pyrrolidinone was added to the solution. The solution was stirred for 2.5 hrs. The product was precipitated into acetone and product was then further washed with acetone. The product was dried under vacuum overnight at 120° C.

The results are shown below:

| Sample | Functional Group | Solvent | Mn | Mw | Mz |
|---|---|---|---|---|---|
| SrPPr (starting material) | N/A | N/A | 46 | 82.4 | 142.8 |
| Comparative F1 | 1-vinyl-2-pyrrolidinone | xylene | 43.2 | 82.1 | 12.8 |
| Comparative F2 | 1-vinyl-2-pyrrolidinone | Melt | 27.8 | 56.4 | 91.0 |
| F3 | Maleic anhydride | cyclohexane | 28.5 | 57.7 | 92.0 |
| F4 | 1-vinyl-2-pyrrolidinone | cyclohexane | 28.9 | 59.6 | 94.2 |
| F5 | 1-vinyl-2-pyrrolidinone | cyclohexane | 31.1 | 60.5 | 96.1 |

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An amorphous syndiotactic rich polyolefin comprising greater than about 50 wt % $C_3$-$C_{40}$ alpha olefins and having:
    about 50% to less than about 80% r dyads, based on the total number of r and m dyads present in the polymer;
    at least about 6.25% r pentads to about 31.6% r-pentads, based on the total number of r and m-pentads present in the polymer;
    a heat of fusion of 10 joules/g or less; and
    an ash content of 1 wt % or less, wherein the amorphous syndiotactic rich polyolefin has no discernable crystallization temperature (Tc).

2. The polymer of claim 1 having at least about 55% r dyads.

3. The polymer of claim 1 having at least about 9.15% r pentads to about 31.6% r-pentads, based on the total number of r and m-pentads present in the polymer.

4. The polymer of claim 1 comprising greater than about 60 wt % propylene.

5. The polymer of claim 1, further comprising at least 0.5 wt % ethylene, based on the total weight of the polymer.

6. The polymer of claim 1, wherein the heat of fusion is not detectable.

7. The polymer of claim 1 having an ash content of 0.1 wt % or less.

8. The polymer of claim 1, having a density of about 0.85 to about 0.88 g/ml.

9. The polymer of claim 1 having a melt flow rate of 0.2 g/10 min or greater.

10. The polymer of claim 1, wherein at least about 95 wt % of the polymer is soluble in hexane, cyclohexane, xylene or toluene at 25° C., based on the total weight of the polymer present.

11. The polymer of claim 1, having a weight average molecular weight of about 5000 to about 5,000,000 g/mole.

12. The polymer of claim 1, having a number average molecular weight of about 5000 to about 3,000,000 g/mole.

13. The polymer of claim 1, having a z average molecular weight of about 10,000 to about 10,000,000 g/mole.

14. The polymer of claim 1, having g' index of about 1.2 to about 1.5, as determined at Mw of the polymer.

15. The polymer of claim 1, having no discernable melting point.

16. A polymer blend comprising:
an amorphous syndiotactic rich polyolefin having greater than about 50 wt % $C_3$-$C_{40}$ alpha olefins, about 50% to less than about 80% r dyads, based on the total number of r and m dyads present in the polymer, at least about 6.25% r pentads to about 31.6% r-pentads, based on the total number of r and m-pentads present in the polymer, a heat of fusion of 10 joules/g or less, and an ash content of 1 wt % or less; wherein the amorphous syndiotactic rich polyolefin has no discernable crystallization temperature (Tc); and
at least one additive comprising a C2-C40 polymer, a C2-C40 copolymer, an elastomer, a random copolymer, an impact copolymer, a fluctional polymer, a tackifier, a crossliniking agent, an antioxidant, a neutralizing agent, a nucleating agent, a filler, an adhesion promoter, an oil, a plasticizer, a wax, an ester polymer, a rubber toughened composition, a recycled polymer, a block, an antiblock, a pigment, a dye, a processing aid, a UV stabilizer, a lubricant, an adjuvant, a surfactant, a color masterbatch, a flow improver, a crystallization aid, a polyalphaolefin, a Group III basestock, or a combination thereof.

17. The polymer blend of claim 16, wherein the additive is selected from the group consisting of a homopolypropylene, a propylene copolymerized with up to 50 wt % of ethylene or a C4 to C20 alpha-olefin, an isotactic polypropylene, a random copolymer of propylene and ethylene, a random copolymer of polypropylene and butene or hexene, a polybutene, an ethylene vinyl acetate, a polyethylene having a density of 0.915 to less than 0.935 g/cm3, a linear polyethylene, a polyethylene having a density of 0.86 to less than 0.90 g/cm3, a polyethylene having a density of 0.90 to less than 0.915 g/cm3, a polyethylene having a density of 0.935 to less than 0.945 g/cm3, a polyethylene having a density of 0.945 to 0.98 g/cm3, an ethylene methyl acrylate, a copolymers of acrylic acid, a polymethylmethacrylate, a polyvinylchloride, a polybutene-1, an isotactic polybutene, an ABS resins, an ethylenepropylene rubber, a vulcanized EPR, an EPDM, a SBS elastomer, a polyamide, a polycarbonate, a PET resin, a crossliniked polyethylene, a copolymer of ethylene and vinyl alcohol, a polystyrene, a poly-1 ester, a polyacrylonitrile homopolymer, a polyacrylonitrile copolymer, a thermoplastic polyamide, a polyacetal, a polyvinylidine fluoride, a polyethylene glycol a polyisobutylene, and a combination thereof.

18. The polymer blend of claim 16, wherein the additive comprises an elastomer prepared by polymerizing propylene with ethylene in the presence of a chiral metallocene catalyst with an activator and optionally a scavenger, the elastomer having an average propylene content on a molar basis of from about 68% to about 92%.

19. The polymer blend of claim 16, wherein the additive comprises a semi-crystalline propylene copolymers having:
A. a heat of fusion from about 0.5 J/g to about 25 J/g,
B. a crystallinity of about 0.25% to about 15%,
C. a single broad melting point from about 0.25° C. to about 75° C.,
D. a weight average molecular weight of 10,000 to 5,000,000 g/cc,
E. a MWD (Mw/Mn) between 1.5 to 40.0, and/or
F. a Mooney viscosity ML (1+4)@125° C. of less than 100.

20. The polymer blend of claim 16, wherein the additive comprises a rubber toughened composition, wherein the rubber is an ethylene propylene rubber, an ethylene propylene diene monomer rubber, a neoprene rubber, and/or a styrenic block copolymer rubber, and wherein the rubber is a discontinuous phase within a continuous phase comprising the functionalized amorphous syndiotactic rich polyolefin.

21. The polymer blend of claim 16, wherein the additive comprises a random copolymer produced by copolymerizing propylene in a single reactor process with ethylene, such that the random copolymer comprises about 3 to about 17 % ethylene.

22. The polymer blend of claim 16, wherein the additive comprises a random copolymer having a narrow compositional distribution, such that 75 wt % of the random copolymer is isolated as one or two adjacent, soluble fractions with the balance of the polymer in immediately preceding or succeeding fractions as determined by thermal fractionation in a saturated hydrocarbon.

23. The polymer blend of claim 16, wherein the additive comprises a fluctional polymer comprising a linear isotactic polymer comprising C2 to C20 olefins, of which the isotacticity due to statistic distribution of stereoscopic errors in the polymer chain has a 25 to 60% [mmmm] pentad concentration, a weight average molecular weight of 100,000 to 800,000 g/mol, a glass transition temperature of from −50 to 30° C., an [rmrm] pentad concentration having a maximum of 2.5% of the entire pentad area, a [rrrr] and a [rrrm] pentad concentration that when combined, have a pentad concentration which is greater than the concentration of [rmrm] pentad, and is essentially soluble in toluene at a 20 to 80% C.

24. The polymer blend of claim 16, wherein the additive comprises a tackifier selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, and hydrogenated rosin esters.

25. The polymer blend of claim 16, wherein the additive comprises a crossliniking agent selected from the group consisting of alcohols, multiols, amines, diamines, and triamines.

26. The polymer blend of claim 16, wherein the additive comprises a polar wax, a non-polar wax, a polypropylene wax, a polyethylene wax, a Fischer-Tropsch wax, an oxidized Fischer-Tropsch wax, a hydroxystearamide wax, a functionalized wax, an amorphous wax, carnauba wax, castor oil wax, microcrystalline wax, beeswax, carnauba wax, castor wax, spermaceti wax, vegetable wax, candelilla wax, japan wax, ouricury wax, douglas-fir bark wax, rice-bran wax, jojoba wax, bayberry wax, montan wax, peat wax, ozokerite wax, ceresin wax, petroleum wax, paraffin wax, polyethylene wax, chemically modified hydrocarbon wax, substituted amide wax, and/or combinations and derivatives thereof.

27. The polymer blend of claim 16, wherein the additive includes a crystallization aid.

28. The polymer blend of claim 16, comprising from 10 to 90 wt % additive, based upon the weight of the polymer blend.

29. The polymer blend of claim 16, wherein the additive is an organo-clay present in the blend at from 0.1 to 50 wt %, based on the total weight of the blend, and wherein the organo-clay selected from the group consisting of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, florine mica, and a combination thereof.

30. The polymer blend of claim 16, wherein the polymer blend is a master batch melt blended under high shear conditions with at least one additive, to produce a concentrate containing from 10 to 90 wt. % of the polymer blend.

31. An amorphous syndiotactic rich polyolefin that has been functionalized with a functional group;
wherein prior to being functionalized, the amorphous syndiotactic rich polyolefin comprises:
greater than about 50 wt % $C_3$-$C_{40}$ alpha olefins
about 50% to less than about 80% r dyads, based on the total number of r and m dyads present in the polymer;
at least about 6.25% r pentads to about 31.6% r-pentads, based on the total number of r and m-pentads present in the polymer;
a heat of fusion of 10 joules/g or less according to the procedure described in ASTM E 794-85; and
an ash content of 1 wt % or less, wherein the amorphous syndiotactic rich polyolefin has no discernable crystallization temperature (Tc).

32. The polymer of claim 31 having at least about 9.15% r pentads to about 31.6% r-pentads, based on the total number of r and m-pentads present in the polymer.

33. The polymer of claim 31, comprising greater than about 50 wt % propylene.

34. The polymer of claim 31, further comprising at least 0.5 wt % ethylene, based on the total weight of the polymer.

35. The polymer of claim 31, wherein the heat of fusion is not detectable.

36. The polymer of claim 31 having an ash content of 0.1 wt % or less.

37. The polymer of claim 31 having a melt flow rate of 0.2 g/10 min or greater.

38. The polymer of claim 31, wherein at least about 95 wt % of the polymer is soluble in hexane, cyclohexane, xylene or toluene at 25° C., based on the total weight of the polymer present.

39. The polymer of claim 31, having a weight average molecular weight (Mw) of about 5000 to about 5,000,000 g/mole.

40. The polymer of claim 31, having a number average molecular weight (Mn) of about 5,000 to about 3,000,000 g/mole.

41. The polymer of claim 31, having a z average molecular weight (Mz) of about 5,000 to about 10,000,000 g/mole.

42. The polymer of claim 31, having no discernable melting point.

43. The polymer of claim 31, wherein the functional group comprises a compound having a weight average molecular weight of 1000 or less, and a carbon-carbon double bond, a carbon-carbon triple bond, and/or a heteroatom.

44. The polymer of claim 31, wherein the functional group comprises B, N, O, Si, P, F, Cl, Br, I, S, or a combination thereof.

45. The polymer of claim 31, wherein the functional group is an aromatic compound, a vinyl compound, an organic acid, an organic amide, an organic amine, an organic ester, an organic di-ester, an organic imide, an organic anhydride, an organic alcohol, an organic acid halide, an organic peroxide, and/or salts thereof.

46. The polymer of claim 31, wherein the functional group is maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride, 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo(2.2.2)oct-5-ene-2,3-dicarboxylic acid anhydride, 1,2,3,4,5, &6, octahydronaphthalene-2,3-dicarboxylic acid anhydride, 2-oxa-1,3-diketospiro(4.4)non-7-ene, bicyclo (2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, x-methyl-bicyclo(2.2.1)hept-5-ene-2,3-dicarboxylic acid anhydride, methyl acrylate, ethyl acrylate, butyl acrylate, methyl methacrylate, ethyl methacrylate, butyl methacrylate, vinyltrichlorosilane, vinyltris(beta-methoxyethoxy)silane, vinyltriethoxysilane, vinyltrimethoxysilane, gamma-methacryloxypropyltrimethoxysilane monovinylsilane, monoallylsilane, vinyl chloride, or vinylidene chloride.

47. The polymer of claim 31, wherein the functional group is present in the functionalized amorphous syndiotactic rich polyolefin at 1 to 5 wt %, based on the total weight of the functionalized polyolefin.

48. The polymer of claim 31, wherein the functionalized amorphous syndiotactic rich polyolefin is heat stable.

49. The polymer of claim 31, wherein the functionalized amorphous syndiotactic rich polyolefin is amorphous syndiotactic rich polypropylene grafted with maleic anhydride, and wherein maleic anhydride is present in the functionalized syndiotactic rich polypropylene at a concentration of about 0.005 to 10 wt % maleic anhydride, based upon the weight of the functionalized amorphous syndiotactic rich polypropylene.

50. The polymer of claim 49, wherein the functionalized amorphous syndiotactic rich polypropylene comprises less than about 1000 ppm free acid groups, based on the total weight of the polypropylene, and wherein the functionalized amorphous syndiotactic rich polypropylene comprises less than about 100 ppm phosphite, based on the total weight of the polypropylene.

51. A polymer blend comprising:
an amorphous syndiotactic rich polyolefin that has been functionalized with a functional group;
wherein prior to being functionalized, the amorphous syndiotactic rich polyolefin comprises:
greater than about 50 wt % $C_3$-$C_{40}$ alpha olefins, about 50% to less than about 80% r dyads, based on the total number of r and m dyads present in the polymer, at least about 6.25% r pentads to about 31.6% r-pentads, based on the total number of r and m-pentads present in the polymer, a heat of fusion of 10 joules/g or less, and an ash content of 1 wt % or less; wherein the amorphous syndiotactic rich polyolefin has no discernable crystallization temperature (Tc); and
at least one additive comprising a C2-C40 polymer, a C2-C40 copolymer, an elastomer, a random copolymer, an impact copolymer, a fluctional polymer, a tackifier, a crosslinking agent, an antioxidant, a neutralizing agent, a nucleating agent, a filler, an adhesion promoter, an oil, a plasticizer, a wax, an ester polymer, a rubber toughened composition, a recycled polymer, a block, an antiblock, a pigment, a dye, a processing aid, a UV stabilizer, a lubricant, an adjuvant, a surfactant, a color masterbatch, a flow improver, a crystallization aid, or a combination thereof.

52. The polymer of claim 51, wherein the functionalized amorphous syndiotactic rich polyolefin is amorphous syndiotactic rich polypropylene grafted with maleic anhydride, and wherein maleic anhydride is present in the functionalized syndiotactic rich polypropylene at a concentration of about 0.005 to 10 wt % maleic anhydride, based upon the weight of the functionalized amorphous syndiotactic rich polypropylene.

53. The polymer blend of claim 51, wherein the additive is selected from the group consisting of a homopolypropylene, a propylene copolymerized with up to 50 wt % of ethylene or a C4 to C20 alpha-olefin, an isotactic polypropylene, a random copolymer of propylene and ethylene, a random copolymer of polypropylene and butene or hexene, a polybutene, an ethylene vinyl acetate, a polyethylene having a density of 0.915 to less than 0.935 g/cm3, a linear polyethylene, a polyethylene having a density of 0.86 to less than 0.90 g/cm3, a polyethylene having a density of 0.90 to less than 0.915 g/cm3, a polyethylene having a density of 0.935 to less than 0.945 g/cm3, a polyethylene having a density of 0.945 to 0.98 g/cm3, an ethylene methyl acrylate, a copolymers of acrylic acid, a polymethylmethacrylate, a polyvinylchloride, a polybutene-1, an isotactic polybutene, an ABS resins, an ethylene-propylene rubber, a vulcanized EPR, an EPDM, a SBS elastomer, a polyamide, a polycarbonate, a PET resin, a crosslinked polyethylene, a copolymer of ethylene and vinyl alcohol, a polystyrene, a poly-1 ester, a polyacrylonitrile homopolymer, a polyacrylonitrile copolymer, a thermoplastic polyamide, a polyacetal, a polyvinylidine fluoride, a polyethylene glycol a polyisobutylene, and a combination thereof.

54. The polymer blend of claim 51, wherein the additive comprises a semi-crystalline propylene copolymers having:
A. a heat of fusion from about 0.5 J/g to about 25 J/g,
B. a crystallinity of about 0.25% to about 15%,
C. a single broad melting point from about 25° C. to about 75° C.,
D. a weight average molecular weight of 10,000 to 5,000,000 g/cc,
E. a MWD (Mw/Mn) between 1.5 to 40.0, and/or
F. a Mooney viscosity ML (1+4)@125° C. of less than 100.

55. The polymer blend of claim 51, wherein the additive comprises a random copolymer produced by copolymerizing propylene in a single reactor process with ethylene, such that the random copolymer comprises about 3 to about 17 mole % ethylene, and wherein the random copolymer has a narrow compositional distribution, such that 75 wt % of the random copolymer is isolated as one or two adjacent, soluble fractions with the balance of the polymer in immediately preceding or succeeding fractions as determined by thermal fractionation in a saturated hydrocarbon.

56. The polymer blend of claim 51, wherein the additive comprises a tackifier selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, and hydrogenated rosin esters.

57. The polymer blend of claim 51, comprising from 10 to 90 wt % additive, based upon the weight of the polymer blend.

58. The contact product of an amorphous syndiotactic rich polyolefin, a functional group, and a functionalization catalyst, wherein the amorphous syndiotactic rich polyolefin comprises:
greater than about 50 wt % $C_3$-$C_{40}$ alpha olefins
about 50% to less than about 80% r dyads, based on the total number of r and m dyads present in the polymer;
at least about 6.25% r pentads to about 31.6% r-pentads, based on the total number of r and m-pentads present in the polymer;
a heat of fusion of 10 joules/g or less; and
an ash content of 1 wt % or less, wherein the amorphous syndiotactic rich polyolefin has no discernable crystallization point (Tc).

59. The contact product of claim 58, wherein the functionalization catalyst is an organic peroxide.

60. The contact product of claim 58, wherein the functionalization catalyst is selected from the group consisting of benzoyl peroxide, methyl ethyl ketone peroxide, cyclohexanone peroxide, t-butylperoxyisopropyl carbonate, di-ti-butyl perphthalate, 2,5-dimethyl-2,5-di(t-butylperoxy)hexene, 2,5-dimethyl-2,5-di(t-utylperoxy)hexene-3, di-t-butyl peroxide, cumene hydroperoxide, t-butyl hydroperoxide, dilauryl peroxide dicumyl peroxide, and a combination thereof.

61. The contact product of claim 58, wherein the functional group comprises a compound having a weight average molecular weight of 1000 or less, and a carbon-carbon double bond, a carbon-carbon triple bond, and/or a heteroatom.

62. The contact product of claim 58, wherein the functional group comprises B, N, O, Si, P, F, Cl, Br, I, S, or a combination thereof.

63. The contact product of claim 58, wherein the functional group is an aromatic compound, a vinyl compound, an organic acid, an organic amide, an organic amine, an organic ester, an organic di-ester, an organic imide, an organic anhydride, an organic alcohol, an organic acid halide, an organic peroxide, and/or salts thereof.

64. The contact product of claim 58, wherein the functional group is maleic anhydride, citraconic anhydride, 2-methyl maleic anhydride, 2-chloromaleic anhydride, 2,3-dimethyl-maleic anhydride, bicyclo[2,2,1]-5-heptene-2,3-dicarboxylic anhydride, 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo(2.2.2)oct-5-ene-2,3-dicarboxylic acid anhydride, 1,2,3,4,5,&g, 1o-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, x-methyl-bicyclo(2.2.1)hept-5-ene-2,3-dicarboxylic acid anhydride, methyl acrylate, ethyl acrylate, butyl acrylate, methyl methacrylate, ethyl methacrylate, butyl methacrylate, vinyltrichlorosilane, vinyltris(beta-methoxyethoxy)silane, vinyltriethoxysilane, vinyltrimethoxysilane, gamma-methacryloxypropyltrimethoxysilane monovinylsilane, monoallylsilane, vinyl chloride, or vinylidene chloride.

65. The contact product of claim 58, wherein the functional group is present in the contact product at 0.005 to 99 wt %, based on the total weight of the contact product.

66. The contact product of claim 58, wherein the functional group is present in the contact product at 1 to 5 wt %, based on the total weight of the contact product.

67. The contact product of claim 58, wherein the contact product is heat stable.

68. The contact product of claim 58, wherein the functionalized amorphous syndiotactic rich polyolefin is amorphous syndiotactic rich polypropylene, wherein the functional group is maleic anhydride, and wherein maleic anhydride is present in the contact product at a concentration of about 0.005 to 10 wt % maleic anhydride, based upon the weight of the contact product.

69. The contact product of claim 58, wherein the amorphous syndiotactic rich polyolefin is amorphous syndiotactic rich polypropylene, the functional group is maleic anhydride, and wherein the contact product comprises less than about 1000 ppm free acid groups, based on the total weight of the contact product.

70. The contact product of claim 58, wherein the amorphous syndiotactic rich polyolefin is amorphous syndiotactic rich polypropylene, the functional group is maleic anhydride, and wherein the contact product comprises less than about 100 ppm phosphite, based on the total weight of the contact product.

71. A polymer comprising amorphous syndiotactic rich polypropylene functionalized with maleic anhydride, wherein the functionalized polypropylene comprises about 50% to less than about 80% r dyads, based on the total number of r and m dyads present in the polymer;
at least about 6.25% r pentads to about 31.6% r-pentads, based on the total number of r and m-pentads present in the polymer;
a heat of fusion of 10 joules/g or less; and
an ash content of 1 wt % or less, wherein the amorphous syndiotactic rich polyolefin has and no discernable crystallization point (Tc).

72. The polymer of claim 71 having at least about 9.15% r pentads to about 31.6% r-pentads, based on the total number of r and m-pentads present in the polymer.

73. The polymer of claim 71, further comprising at least 0.5 wt % ethylene, based on the total weight of the polymer.

74. The polymer of claim 71, wherein the heat of fusion is not detectable.

75. The polymer of claim 71 having an ash content of 0.1 wt % or less.

76. The polymer of claim 71 having a melt flow rate of 0.2 g/10 min or greater.

77. The polymer of claim 71, wherein at least about 99 wt % of the polymer is soluble in hexane, cyclohexane, xylene or toluene at 25° C., based on the total weight of the polymer present.

78. The polymer of claim 71, having a weight average molecular weight (Mw) of about 5000 to about 5,000,000 g/mole.

79. The polymer of claim 71, having a number average molecular weight (Mn) of about 5,000 to about 3,000,000 g/mole.

80. The polymer of claim 71, having a z average molecular weight (Mz) of about 5,000 to about 10,000,000 g/mole.

81. The polymer of claim 71, having no discernable melting point.

82. The polymer of claim 71, wherein the maleic anhydride is present in the polymer at 0.005 to 10 wt %, based on the total weight of the polymer.

83. The polymer of claim 71, wherein the polymer is heat stable.

84. A polymer blend comprising amorphous syndiotactic rich polypropylene functionalized with maleic anhydride, and at least one additive, wherein the functionalized polypropylene comprises about 50% to less than about 80% r dyads, based on the total number of r and m dyads present in the polymer;
at least about 6.25% r pentads to about 31.6% r-pentads, based on the total number of r and m-pentads present in the polymer;
a heat of fusion of 10 joules/g or less; and
an ash content of 1 wt % or less, wherein the amorphous syndiotactic rich polyolefin has no discernable crystallization point (Tc), and wherein the additive is selected from the group consisting of a C2-C40 polymer, an elastomer, a random copolymer, an impact copolymer, a fluctional polymer, a tackifier, a crosslinking agent, an antioxidant, a neutralizing agent, a nucleating agent, a filler, an adhesion promoter, an oil, a plasticizer, a wax, an ester polymer, a block, an antiblock, a pigment, a dye, a processing aid, a UV stabilizer, a lubricant an adjuvant, a surfactant, a color masterbatch, a flow improver, a crystallization aid, and a combination thereof.

85. The polymer blend of claim 84, comprising from 10 to 90 wt % additive, based upon the weight of the polymer blend.

86. An adhesive composition comprising an amorphous syndiotactic rich polyolefin, an amorphous syndiotactic rich polyolefin that has been functionalized with a functional group, or a combination thereof, wherein the amorphous syndiotactic rich polyolefin comprises:
greater than about 50 wt % $C_3$-$C_{40}$ alpha olefins;
about 50% to less than about 80% r dyads, based on the total number of r and m dyads present in the polymer;
at least about 6.25% r pentads to about 31.6% r-pentads, based on the total number of r and m-pentads present in the polymer;
a heat of fusion of 10 joules/g or less; and
an ash content of 1 wt % or less, wherein the amorphous syndiotactic rich polyolefin has no discernable crystallization point (Tc),
and wherein the functional group, when present, comprises a compound having a weight average molecular weight of 1000 or less, and a carbon-carbon double bond, a carbon-carbon triple bond, and/or a heteroatom;
the adhesive composition having a peel strength to isotactic polypropylene of greater than about 3.5 lb/in, and a peel strength to polyester film of greater than about 0.5 lb/in.

87. The adhesive composition of claim 86 further comprising at least one additive selected from the group consisting of a C2-C40 polymer, a C2-C40 copolymer, an elastomer, a random copolymer, an impact copolymer, a fluctional polymer, a tackifier, a crosslinking agent, an antioxidant, a neutralizing agent, a nucleating agent, a filler, an adhesion promoter, an oil, a plasticizer, a wax, an ester polymer, a rubber toughened composition, a recycled polymer, a block, an antiblock, a pigment, a dye, a processing aid, a UV stabilizer, a lubricant, an adjuvant, a surfactant, a color masterbatch, a flow improver, a crystallization aid, and a combination thereof.

88. The adhesive composition of claim 86, wherein at least about 95 wt % of the adhesive is soluble in hexane, cyclohexane, xylene or toluene at 25° C., based on the total weight of the adhesive present.

89. The adhesive composition of claim 86 wherein the polyolefin comprises greater than about 60 wt % propylene.

90. The adhesive composition of claim 86 wherein the polyolefin comprises at least 0.5 wt % ethylene, based on the total weight of the polyolefin.

91. The adhesive composition of claim 86 wherein a heat of fusion of the polyolefin is not detectable.

92. The adhesive composition of claim 86 wherein the polyolefin comprises an ash content of 0.1 wt % or less.

93. The adhesive composition of claim 86 further comprising one or more tackifiers selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin esters, derivatives thereof, and combinations thereof.

94. The adhesive composition of claim 86, wherein the adhesive further comprises one or more waxes selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof.

95. The adhesive composition of claim 86 wherein the adhesive further comprises one or more additives selected from the group consisting of plasticizers, oils, stabilizers, antioxidants, pigments, dyestuffs, polymeric additives, defoamers, preservatives, thickeners, rheology modifiers, humectants, fillers and water.

96. The adhesive composition of claim 86, having a set time of 30 seconds or less.

97. A consumer good, an article of manufacture, a packaging adhesive, a package, a disposable article, a film, a pressure sensitive adhesive, a laminate article, a fiber product, a hot melt adhesive, a carpet, a tape, a shingle, a roofing element, a reflective article, a woodworking article, a consumer article, a label, a bookbinding article, a roadmarking composition, a sealant composition, a paving composition, a glue stick, a pipe wrapping article, an article having a transparent pane, or a combination thereof, comprising the adhesive composition of claim 1.

98. An amorphous syndiotactic rich polyolefin that has been functionalized with a functional group;
wherein the functionalized amorphous syndiotactic rich polyolefin comprises:
greater than about 50 wt % $C_3$-$C_{40}$ alpha olefins;
about 50% to less than about 80% r dyads, based on the total number of r and m dyads present in the polymer;
at least about 6.25% r pentads to about 31.6% r-pentads, based on the total number of r and m-pentads present in the polymer; and
a heat of fusion of 10 joules/g or less, wherein the amorphous syndiotactic rich polyolefin has no discernable crystallization point (Tc).

99. A process to make a polymeric material comprising the steps of:
melt blending an amorphous syndiotactic rich polyolefin and at least one additive under high shear conditions to produce a concentrate containing from 10 to 90 wt. % of the polyolefin, and
subsequently blending the concentrate with at least one additional material to produce a final product, wherein the amorphous syndiotactic rich polyolefin comprises:
greater than about 50 wt % C3-C40 alpha olefins;
about 50% to less than about 80% r dyads, based on the total number of r and m dyads present in the polyolefin;
at least about 6.25% r pentads to about 31.6% r-pentads, based on the total number of r and m-pentads present in the polymer;
a heat of fusion of 10 joules/g or less; and
an ash content of 1 wt % or less, wherein the amorphous syndiotactic rich polyolefin has no discernable crystallization point (Tc).

100. The process of claim 99, wherein the amorphous syndiotactic rich polyolefin has been functionalized with a functional group, the functional group comprising a compound having a weight average molecular weight of 1000 or less, and a carbon-carbon double bond, a carbon-carbon triple bond, and/or a heteroatom.

101. The process of claim 100, wherein the functionalized amorphous syndiotactic rich polyolefin is amorphous syndiotactic rich polypropylene functionalized with maleic anhydride.

102. The process of claim 101, wherein the amorphous syndiotactic rich polyolefin is functionalized simultaneously with the formation of the concentrate.

103. A method to produce a functionalized amorphous syndiotactic rich polyolefin comprising the steps of:
A. providing an olefin monomer, metallocene catalyst, and an activator to a reactor in an aliphatic solvent;
B. catalytic solution polymerization of said olefin monomer in said reactor to produce an amorphous syndiotactic rich polyolefin;
C. monomer stripping to remove unreacted olefin monomer;
D. solvent based functionalization; comprising combining said amorphous syndiotactic rich polyolefin with a functional group and with a free radical initiator in said aliphatic solvent, at a temperature and for a period of time sufficient to produce said functionalized amorphous syndiotactic rich polyolefin; and optionally
E. removal of said aliphatic solvent,
wherein the amorphous syndiotactic rich polyolefin comprises greater than about 50 wt % $C_3$-$C_{40}$ alpha olefins;
at least about 6.25% r pantads to about 31.6% r-pentads, based on the total number of r and m-pentads present in the polymer;
about 50% to less than about 80% r dyads, based on the total number of r and m dyads present in the polyolefin;
a heat of fusion of 10 joules/g or less, and
an ash content of 1 wt % or less, wherein the amorphous syndiotactic rich polyolefin has no discernable crystallization point (Tc).

104. The method of claim 103, wherein the functionalized amorphous syndiotactic rich polyolefin is amorphous syndiotactic rich polypropylene functionalized with maleic anhydride.

105. The method of claim 103, further comprising the addition of an organo-clay after said solvent based functionalization step D.

106. A method to produce a functionalized amorphous syndiotactic rich polyolefin comprising the steps of:
  A. providing a melt comprising an amorphous syndiotactic rich polyolefin, a functional group, and a free radical initiator to a mixing device;
  B. contacting said melt within said mixing device at a temperature and for a period of time sufficient to produce said functionalized amorphous syndiotactic rich polyolefin, wherein the amorphous syndiotactic rich polyolefin comprises greater than about 50 wt % $C_3$-$C_{40}$ alpha olefins;
  about 50% to less than about 80% r dyads, based on the total number of r and m dyads present in the polyolefin;
  at least about 6.25% r pentads to about 31.6% r-pentads, based on the total number of r and m-pentads present in the polymer; and
  a heat of fusion of 10 joules/g or less, and
  an ash content of 1 wt % or less, wherein the amorphous syndiotactic rich polyolefin has no discernable crystallization point (Tc).

107. The method of claim 106, wherein the functionalized amorphous syndiotactic rich polyolefin is amorphous syndiotactic rich polypropylene functionalized with maleic anhydride.

108. The method of claim 106, further comprising the addition of an organo-clay after said contacting step B.

109. The adhesive of claim 86, wherein the adhesive comprises a functionalized amorphous syndiotactic rich polyolefin ("f-asrPO").

110. The adhesive of claim 109 where the f-asrPO comprises functionalized amorphous syndiotactic polypropylene.

111. The adhesive of claim 109 where the functional group is maleic acid and/or maleic anhydride.

112. The adhesive of claim 110 where the functional group is maleic acid and/or maleic anhydride.

113. The adhesive of claim 109 further comprising semicrystalline propylene copolymer having a heat of fusion of 0.5 to 25 J/g.

114. The adhesive of claim 110 further comprising semicrystalline propylene copolymer having a heat of fusion of 0.5 to 25 J/g.

115. The adhesive of claim 111 further comprising semicrystalline propylene copolymer having a heat of fusion of 0.5 to 25 J/g.

116. The adhesive of claim 112 further comprising semicrystalline propylene copolymer having a heat of fusion of 0.5 to 25 J/g.

117. The composition of claim 109 further comprising polyalphaolefins, high purity hydrocarbon fluid compositions, or Group III hydrocarbon basestocks.

118. The composition of claim 110 further comprising polyalphaolefins, high purity hydrocarbon fluid compositions, or Group III hydrocarbon basestocks.

119. The composition of claim 111 further comprising polyalphaolefins, high purity hydrocarbon fluid compositions, or Group III hydrocarbon basestocks.

120. The composition of claim 112 further comprising polyalphaolefins, high purity hydrocarbon fluid compositions, or Group III hydrocarbon basestocks.

121. The composition of claim 113 further comprising polyalphaolefins, high purity hydrocarbon fluid compositions, or Group III hydrocarbon basestocks.

122. The composition of claim 114 further comprising polyalphaolefins, high purity hydrocarbon fluid compositions, or Group III hydrocarbon basestocks.

123. The composition of claim 115 further comprising polyalphaolefins, high purity hydrocarbon fluid compositions, or Group III hydrocarbon basestocks.

124. The composition of claim 116 further comprising polyalphaolefins, high purity hydrocarbon fluid compositions, or Group III hydrocarbon basestocks.

125. An amorphous syndiotactic rich polyolefin comprising greater than about 50 wt % $C_3$-$C_{40}$ alpha olefins and having:
  about 50% to less than about 80% r dyads, based on the total number of r and m dyads present in the polymer;
  at least about 13.0% r pentads to about 31.6% r-pentads, based on the total number of r and m-pentads present in the polymer;
  a heat of fusion of 10 joules/g or less; and
  an ash content of 1 wt % or less, wherein the amorphous syndiotactic rich polyolefin has no discernable crystallization temperature (Tc).

126. An amorphous syndiotactic rich polyolefin that has been functionalized with a functional group;
  wherein prior to being functionalized, the amorphous syndiotactic rich polyolefin comprises:
  greater than about 50 wt % $C_3$-$C_{40}$ alpha olefins
  about 50% to less than about 80% r dyads, based on the total number of r and m dyads present in the polymer;
  at least about 13.0% r pentads to about 31.6% r-pentads, based on the total number of r and m-pentads present in the polymer;
  a heat of fusion of 10 joules/g or less according to the procedure described in ASTM E 794-85; and
  an ash content of 1 wt % or less, wherein the amorphous syndiotactic rich polyolefin has no discernable crystallization temperature (Tc).

127. The polymer of claim 126 wherein the functional group is maleic anhydride, citraconic anhydride, 2-methyl maleic anhydride, 2-chloromaleic anhydride, 2,3-dimethyl-maleic anhydride, bicyclo[2,2,1]-5-heptene-2,3-dicarboxylic anhydride, 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo(2.2.2)oct-5-ene-2,3-dicarboxylic acid anhydride, 1,2,3,4,5,&6, octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, 2-oxa-1,3-diketosprio(4.4)non-7-ene, bicycle(2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, x-methyl-bicyclo (2.2.1)hept-5-ene-2,3- dicarboxylic acid anhydride, methyl acrylate, ethyl acrylate, butyl acrylate, methyl methacrylate, ethyl methacrylate, butyl methacrylate, vinyltrichlorosilane, vinyltris(beta-methoxyethoxy)silane, vinyltriethoxysilane, vinyltrimethoxysilane, gamma- methacryloxypropyltrimethoxysilane monovinylsilane, monoallylsilane, vinyl chloride, or vinylidene chloride.

* * * * *

UNITED STATES PATENT AND TRADEMARK OFFICE
CERTIFICATE OF CORRECTION

| | | |
|---|---|---|
| PATENT NO. | : 7,589,145 B2 | Page 1 of 1 |
| APPLICATION NO. | : 11/220114 | |
| DATED | : September 15, 2009 | |
| INVENTOR(S) | : Patrick Brant et al. | |

It is certified that error appears in the above-identified patent and that said Letters Patent is hereby corrected as shown below:

Title page, item (75) Inventor, delete "Patrict Brant" and replace it with "Patrick Brant".

Signed and Sealed this
Fourth Day of October, 2011

David J. Kappos
*Director of the United States Patent and Trademark Office*